United States Patent
Henry

(10) Patent No.: US 11,872,852 B2
(45) Date of Patent: Jan. 16, 2024

(54) ENHANCED TIRE INFLATION SYSTEM

(71) Applicant: Equalaire Systems, Inc., Corpus Christi, TX (US)

(72) Inventor: Dane Henry, Windcrest, TX (US)

(73) Assignee: Pressure Systems International, LLC, San Antonio, TX (US)

( * ) Notice: Subject to any disclaimer, the term of this patent is extended or adjusted under 35 U.S.C. 154(b) by 172 days.

(21) Appl. No.: 17/429,099

(22) PCT Filed: Feb. 7, 2020

(86) PCT No.: PCT/US2020/017374
§ 371 (c)(1),
(2) Date: Aug. 6, 2021

(87) PCT Pub. No.: WO2020/163832
PCT Pub. Date: Aug. 13, 2020

(65) Prior Publication Data
US 2022/0088976 A1    Mar. 24, 2022

Related U.S. Application Data

(60) Provisional application No. 62/802,643, filed on Feb. 7, 2019, provisional application No. 62/802,669, filed on Feb. 7, 2019.

(51) Int. Cl.
*B60C 23/00* (2006.01)
*B60G 17/052* (2006.01)

(52) U.S. Cl.
CPC .... *B60C 23/00354* (2020.05); *B60G 17/0526* (2013.01); *B60C 2200/06* (2013.01); *B60G 2202/152* (2013.01); *B60G 2204/4702* (2013.01); *B60G 2300/0262* (2013.01); *B60G 2600/18* (2013.01)

(58) Field of Classification Search
None
See application file for complete search history.

(56) References Cited

U.S. PATENT DOCUMENTS

| 4,619,303 | A | 10/1986 | Bryan et al. |
| 4,763,709 | A * | 8/1988 | Scholer ............... B60C 23/001 702/140 |
| 5,553,647 | A | 9/1996 | Jaksic |
| 7,331,221 | B2 | 2/2008 | Wise et al. |

(Continued)

FOREIGN PATENT DOCUMENTS

| DE | 10143888 A1 | 3/2003 |
| DE | 102005032219 A1 | 1/2007 |

(Continued)

OTHER PUBLICATIONS

International Search Report issued in International Patent Appl. No. PCT/US2020/017347 dated Jun. 9, 2020 (4 pages).

(Continued)

*Primary Examiner* — Faye M Fleming
(74) *Attorney, Agent, or Firm* — Pizarro Allen PC

(57) ABSTRACT

A vehicle fluid supply system includes a fluid supply valve configured to control fluid flow from a vehicle fluid supply to a trunk conduit in fluid communication with a vehicle tire inflation system; and a lift axle valve configured to control fluid flow from the trunk conduit to a lift axle deployment system.

20 Claims, 33 Drawing Sheets

(56) References Cited

U.S. PATENT DOCUMENTS

| | | | |
|---|---|---|---|
| 10,094,418 B2 | 11/2018 | Smith | |
| 11,535,068 B2 * | 12/2022 | Wilson | B60C 23/0408 |
| 2006/0053876 A1 | 3/2006 | Claussen et al. | |
| 2015/0096655 A1 | 4/2015 | Koulinitch et al. | |
| 2015/0329099 A1 | 11/2015 | Zawacki et al. | |
| 2016/0096042 A1 | 4/2016 | Taylor | |
| 2016/0167456 A1 | 6/2016 | Mozingo et al. | |
| 2016/0318354 A1 | 11/2016 | Trostle et al. | |
| 2017/0120697 A1 | 5/2017 | Hennig | |
| 2018/0319451 A1 | 11/2018 | Smith | |
| 2018/0370280 A1 | 12/2018 | Akbarian et al. | |
| 2021/0276222 A1 * | 9/2021 | Datema | B60R 16/023 |
| 2022/0088976 A1 * | 3/2022 | Henry | B60C 23/003 |

FOREIGN PATENT DOCUMENTS

| | | |
|---|---|---|
| WO | WO99/36850 | 7/1999 |
| WO | WO 2019/014640 | 1/2019 |

OTHER PUBLICATIONS

Written Opinion issued in International Patent Appl. No. PCT/US2020/017347 dated Jun. 9, 2020 (6 pages).
International Search Report issued in International Patent Appl. No. PCT/US2020/017374 dated May 4, 2020 (3 pages).
Written Opinion issued in International Patent Appl. No. PCT/US2020/017374 dated May 4, 2020 (11 pages).

* cited by examiner

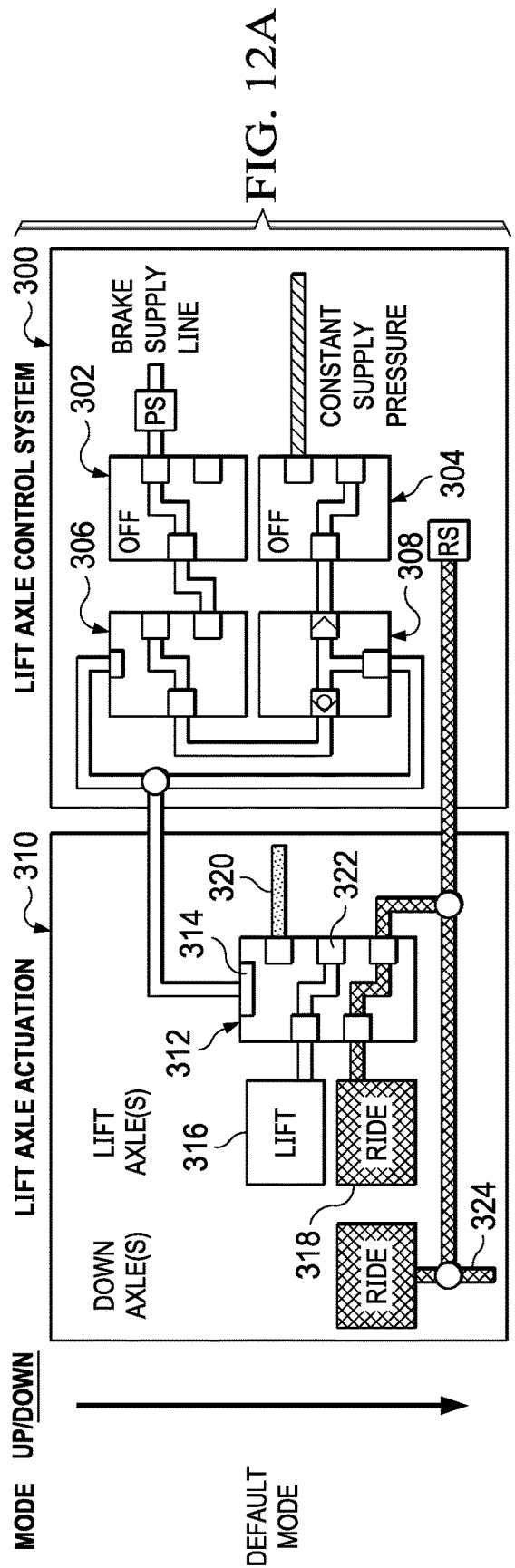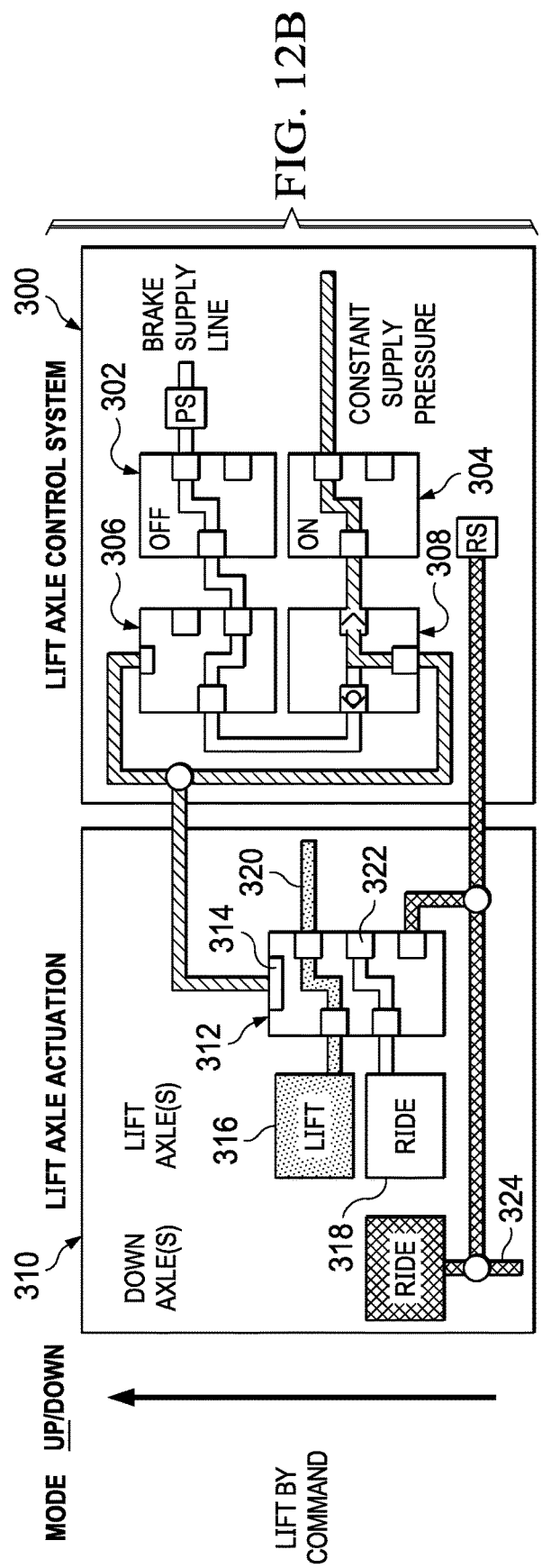

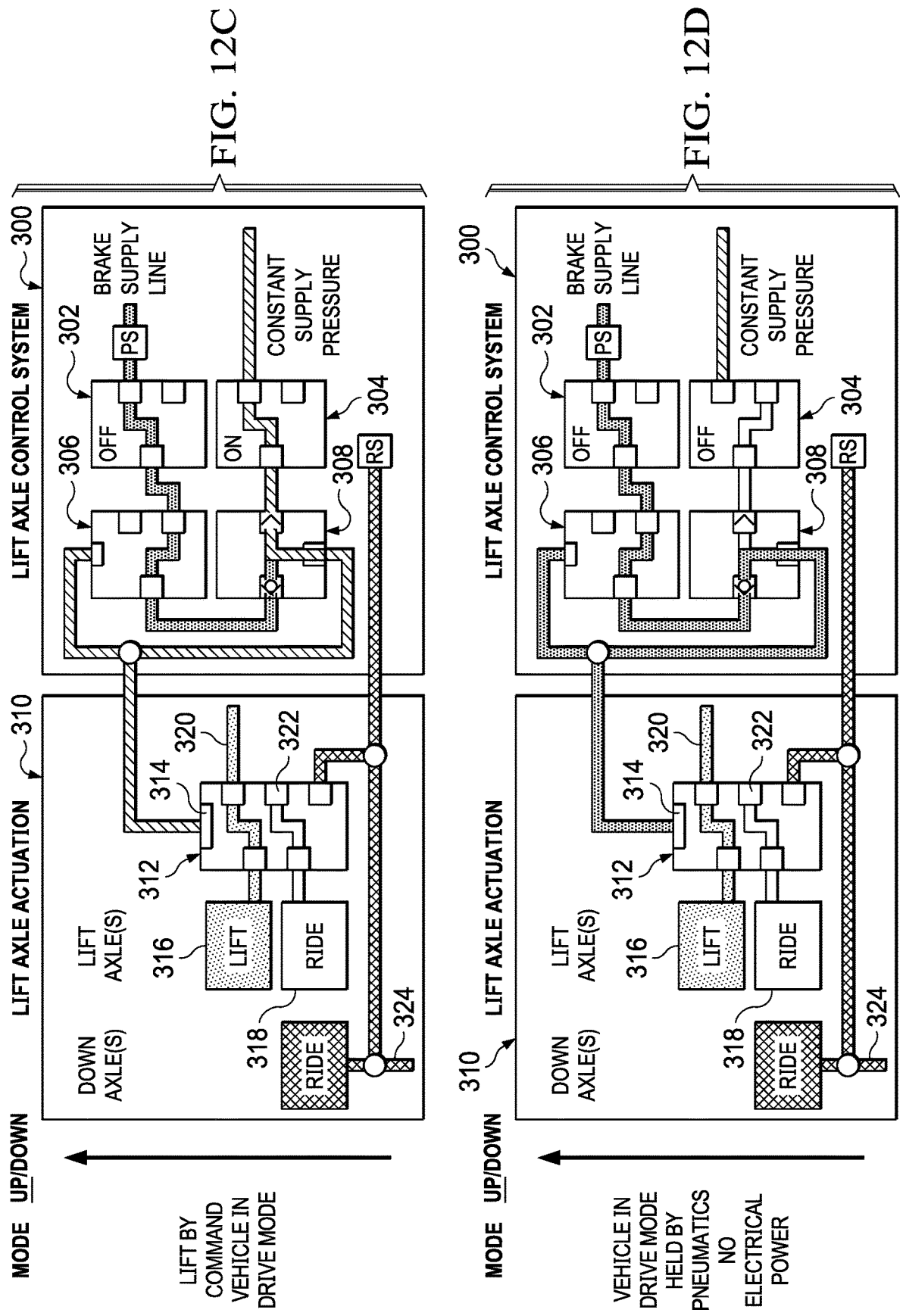

ENHANCED TIRE INFLATION SYSTEM

CROSS-REFERENCE TO RELATED APPLICATION

This application is a US national stage entry of International Patent Application No. PCT/US2020/017374 entitled "ENHANCED TIRE INFLATION SYSTEM filed Feb. 7, 2020," which claims priority to U.S. Provisional Patent Application 62/802,669 entitled "ENHANCED AUTOMATIC TIRE INFLATION SYSTEM" filed Feb. 7, 2019, and to U.S. Provisional Patent Application 62/802,643 entitled "LIFT AXLE SYSTEM" filed Feb. 7, 2019, each of which is hereby entirely incorporated herein by reference.

FIELD

This application relates generally to tire inflation systems and lift axle deployment systems.

BACKGROUND

Heavy vehicles may use tire inflation systems to maintain tire pressure, and may also use pneumatic lift axle systems for better roadway load distribution. Tire inflation systems and pneumatic lift axle systems both typically rely on heavy vehicle air brake systems, but are otherwise separate systems.

There exists a need for a system to integrate tire inflation and pneumatic lift axle systems.

SUMMARY

A vehicle fluid supply system may comprise a fluid supply valve configured to control fluid flow from a vehicle fluid supply to a trunk conduit in fluid communication with a vehicle tire inflation system; and a lift axle valve configured to control fluid flow from the trunk conduit to a lift axle deployment system.

BRIEF DESCRIPTION OF THE DRAWINGS

FIGS. 12A-E are simplified state diagrams of the pneumatic lift axle deployment system of FIG. 12 with respect to axle position and fluid flow path.

DETAILED DESCRIPTION

Figure 1:
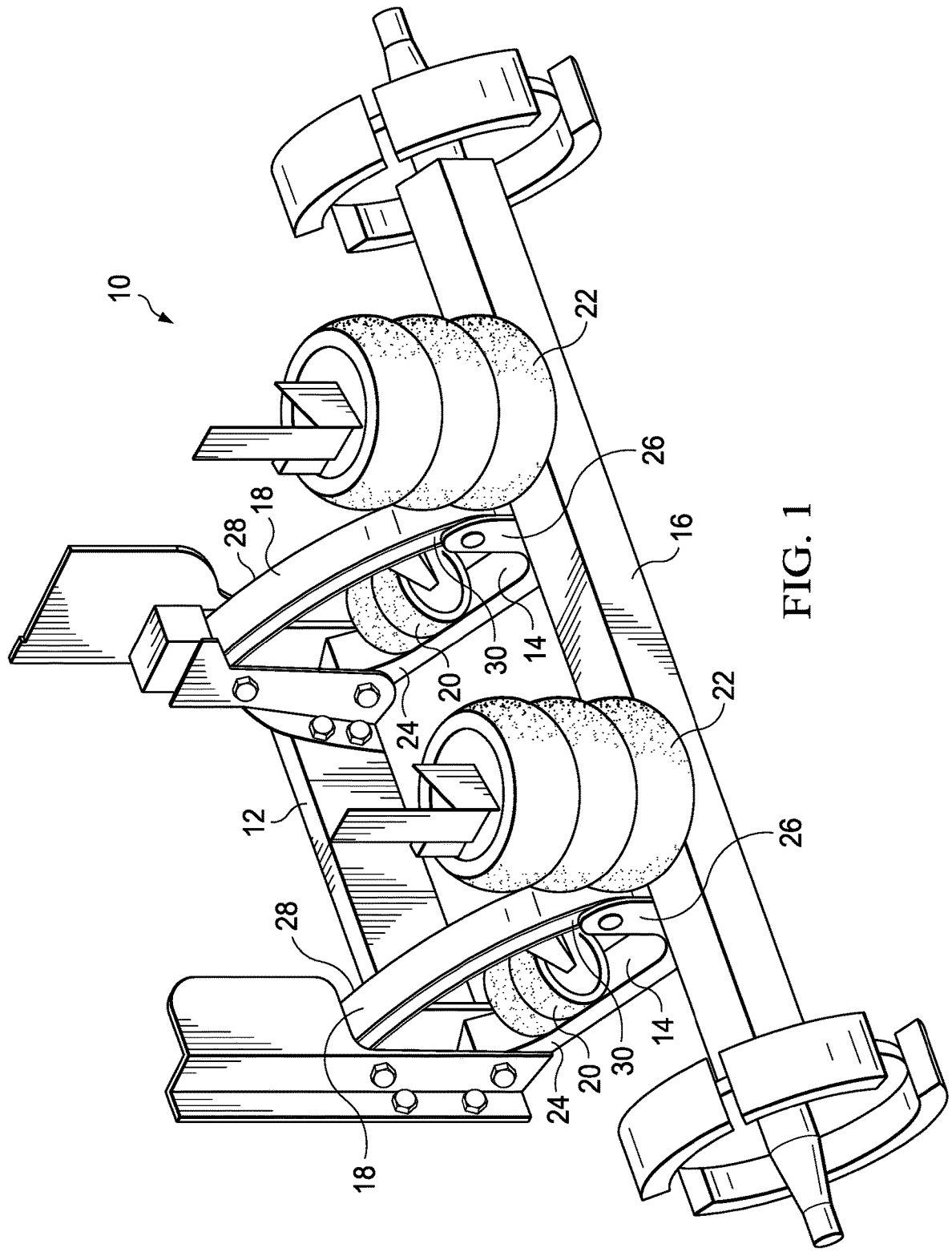
FIG. 1 is an example of a pneumatic lift axle system.

A vehicle may comprise a heavy truck and/or trailer, such as may be considered a class 7 or 8 vehicle. A heavy vehicle may include a lift axle that may be moved to a raised position when the vehicle is unloaded and deployed when the vehicle is loaded. That is, when the vehicle is empty, travel resistance decreases by moving the lift axle up to disengage the lift axle tires from the road. When the vehicle is loaded, the vehicle load may be supported by moving the lift axle downwards to place the lift axle tires in contact with the road, thus spreading the vehicle load across more tires.

The lift axle may also be provided with air hoses for tire inflation as with the tires of a non-lift or "down" axle.

A lift axle may be disposed in front of a down or fixed axle on a heavy truck or trailer. A lift axle in such a position is commonly referred to as a pusher axle. A lift axle may also be disposed behind a down axle on a heavy truck or trailer. A lift axle in such a position is commonly referred to as a tag axle. Lift axles may be steerable or non-steerable.

A vehicle may also include a tire inflation system. The tire inflation system may use pressurized air from the vehicle's air brake system or some other source of pressurized air to maintain the tires at a desired air pressure. The tire inflation system may be automatic, and be used to control air pressure in one or more of the vehicle tires.

Lift Axle Deployment System

In some embodiments, a lift axle may be deployed using a pneumatic deployment system. A pneumatic lift axle suspension system includes a pneumatic lift spring to move the lift axle up and down, and a pneumatic ride spring to absorb vibration from a road surface when the lift axle moves down to a deployed position. Depending on lift axle configuration, inflation of a lift spring may move a lift axle to an up position or to a down or deployed position. The disclosed embodiments utilize a trailing arm steerable lift axle as an exemplary representation and do not preclude the adaptation of the disclosed system or methodology to any other form of lift axle.

A heavy vehicle having a lift axle includes a ride air supply and a lift air supply, which may be the same or separate reservoirs or air supply sources. The lift air supply may provide air at a pressure suitable to inflate the lift spring and raise the lift axle. The ride air supply may provide air at one or more pressures suitable for the vehicle load state.

A heavy vehicle also typically includes a parking brake system. In the disclosed embodiment, the disclosed lift axle system relies on the parking brake system, which includes a brake air reservoir and a brake air supply. The brake air supply fills the brake air reservoir so that the parking brake system has a volume of air available for rapid use. Generally speaking, when the vehicle is turned off, the air may be released from the parking brake system, thus resulting in brake engagement to prevent vehicle movement. Similarly, when the vehicle is turned on but in park mode, the air may be released from the parking brake system, thus resulting in brake engagement to prevent vehicle movement.

When the vehicle is turned on and in drive mode, the parking brake air supply may be activated to provide air pressure to disengage the parking brakes. That is, the air brake supply line is pressurized, which fills the brake air reservoir and disengages the park brakes by caging a large return spring. The brake air pressure is used to keep the lift axle up while the vehicle is in motion (except for heavy load override). This prevents the axle from dropping while the vehicle is in motion. While caging of the return spring in the parking brake is described, said description is exemplary only and not meant to preclude other parking brake configurations. Regardless of parking brake configuration, the pressure in the brake systems may be used to indicate the status of the parking brake system.

Vehicle drivers will typically stop completely before applying the parking brakes. When the park brakes are applied the supply line pressure drops to zero and the axle can then be lowered.

One example of such a lift axle may be seen in the embodiment of FIG. 1.

FIG. 1 is a perspective view illustrating an embodiment of a pneumatically operated lift axle suspension system in which inflation of the lift spring and deflation of the ride spring moves the axle to the up position. However, the system described herein may be easily configured to such that deflation of the lift spring moves the axle to an up position. In some embodiments, the lift apparatus may not be pneumatically operated. In such situations, a pneumatic control signal generated by a pneumatic lift axle control system as described herein may be applied to control the state of a non-pneumatic (e.g., electrically- or hydraulically-operated) lift apparatus. The embodiment of FIG. 1 illustrates a trailing arm lift axle as an exemplary representation and does not preclude the adaptation of the disclosed system or methodology to any other configuration of lift axle.

Referring to FIG. 1, a lift axle suspension system 10 includes a front frame 12, an axle link arm 14, a lift axle 16, one or more lift arms 18, one or more lift springs 20, and one or more ride springs 22. The front frame 12 is mounted on a vehicle body (not shown) such as a truck or trailer. A front end 24 of the axle link arm 14 may be pivotably coupled to the front frame 12 through a mounting bushing (not shown), and a rear end 26 of the axle link arm 14 is attached to the lift axle 16 to which a wheel end assembly (not shown) may be mounted. A front end 28 of the lift arm 18 may be pivotably coupled to the front frame 12 through a mounting bushing (not shown), and a rear end 30 of the lift arm 18 may be pivotably coupled to the axle link arm 14 or lift axle 16.

In the embodiment of FIG. 1, the lift spring 20 is disposed between the front end 24 of the axle link arm 14 and the rear end 30 of the lift arm 18 so that when the lift spring 20 is inflated, the lift axle 16 moves to a raised or up position.

The ride spring 22 is disposed between the lift axle 16 and the vehicle body (not shown) to absorb vibration from a road surface when the lift axle 16 is deployed. The lift spring 20 and the ride spring 22 are each connected to a fluid supply (e.g., air) (not shown) through fluid pressure supply hoses (not shown). Air pressure in the lift springs 20 and ride springs 22 is controlled through an actuator valve. Accordingly, the lift spring 20 controls the up/down operations of the lift axle 16 through a lift axle deployment system, and the ride spring 22 absorbs vibration from the road surface as the tires of the lift axle 16 travel on the road. The lift axle deployment system comprises a lift axle control system and an actuator valve.

Figure 2A:
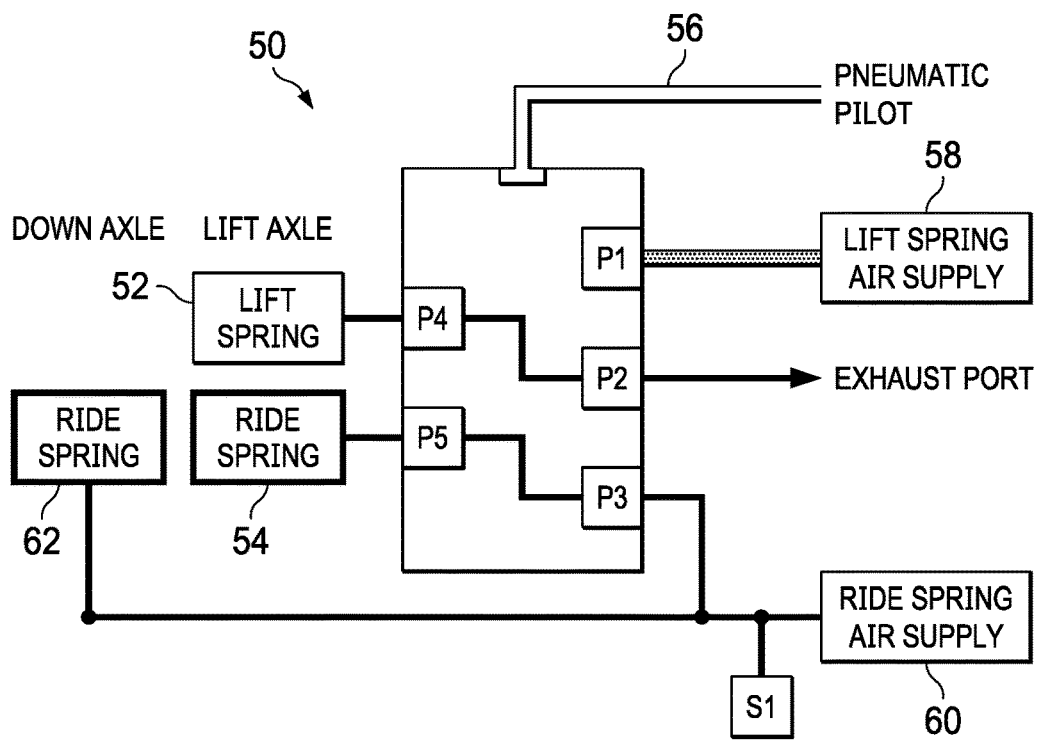
FIG. 2A is a schematic drawing of one embodiment of a first state of an actuator valve system for a pneumatic lift axle.
Figure 2B:
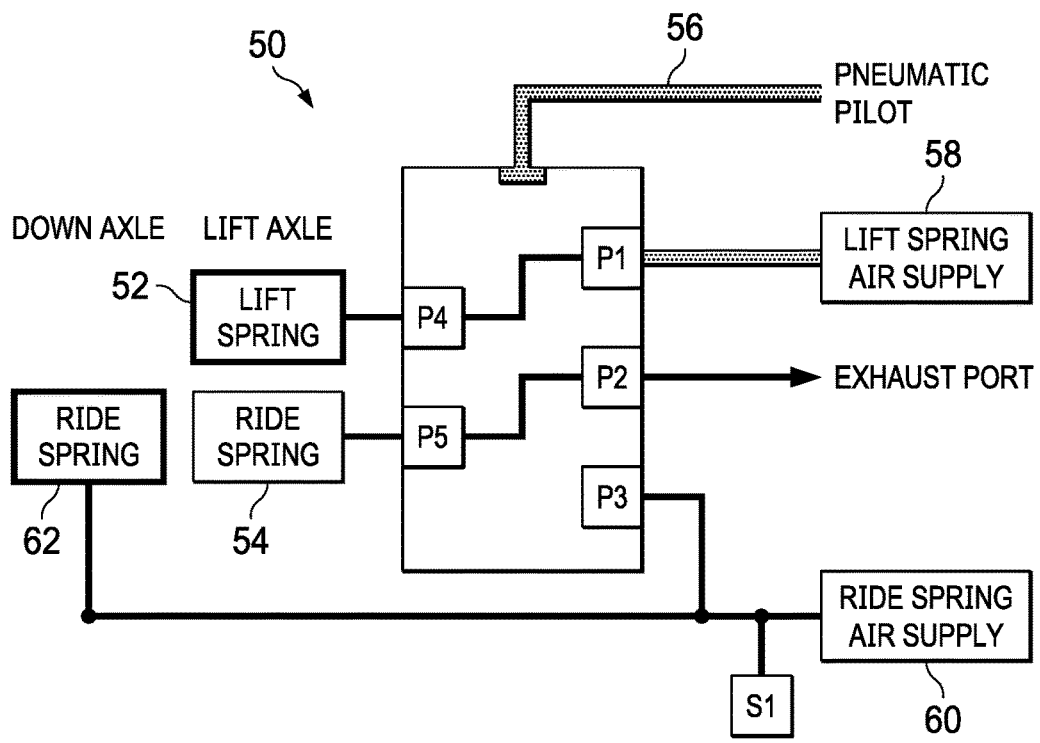
FIG. 2B is a schematic drawing of one embodiment of a second state of an actuator valve system for a pneumatic lift axle

FIGS. 2A and 2B illustrate one embodiment of an actuator valve 50 for controlling inflation and deflation of the lift spring 52 and ride spring 54 of a lift axle. In this embodiment, the actuator valve 50 comprises a 5/2 air pilot valve that may be activated by a pneumatic pilot 56. In other embodiments, the actuator valve 50 may be electrically activated upon receipt of a pneumatic signal from the lift axle control system. For example, a pneumatic pulse or pressure signal may be converted to an electrical signal for activation of the actuator. The actuator valve 50 comprises a plurality of actuator ports configured for fluid communication with one or more fluid supplies, exhaust vents and fluid springs. The actuator valve 50 is connected at lift supply port P1 to a lift spring air supply 58, at exhaust port P2 to exhaust port or atmosphere to exhaust fluid pressure, at ride spring supply port P3 to a ride spring air supply 60, at lift spring port P4 to a lift axle lift spring 52, and at ride spring port P5 to a lift axle ride spring 54. As may be seen in the embodiment of FIG. 2A, the ride spring air supply 60 may be further pneumatically connected to a ride spring 62 of a down axle, as well as to a load sensor 51 that is configured to sense pressure of fluid in the ride springs 54, 62. The load sensor 51 provides a load signal based on the air pressure in the ride springs 54, 62.

The actuator valve is configured to switch between an OFF state and an ON state. When the pilot 56 is not activated, as seen in FIG. 2A, the actuator valve 50 switch state is OFF such that the lift spring port P4 is fluidly connected to the exhaust port P2 and the ride spring port P5 is fluidly connected to the ride spring supply port P3. With the actuator valve 50 in such a configuration, the air pressure in the lift spring 52 exhausts to atmosphere, thus deflating the lift spring 52. The ride spring 54 simultaneously receives air pressure from the ride spring air pressure supply 60 and thus inflates. Deflation of the lift spring 52 results in movement of the lift axle to a deployed load-bearing position such that the tires of the lift axle contact the road.

When the pilot 56 is activated as shown in FIG. 2B, the actuator valve 50 switches to an ON state so that the lift spring port P4 is connected to the lift spring supply port P1 and the ride spring port P5 is connected to exhaust port P2. With the actuator valve 50 in such a configuration, the lift spring 52 inflates while the ride spring 54 deflates, resulting in movement of the lift axle to a raised position away from the road.

The actuator valve 50 thus has two states: a pilot-activated state which results in the lift axle being raised, and a pilot-inactive state in which the lift axle is deployed.

Figure 3:
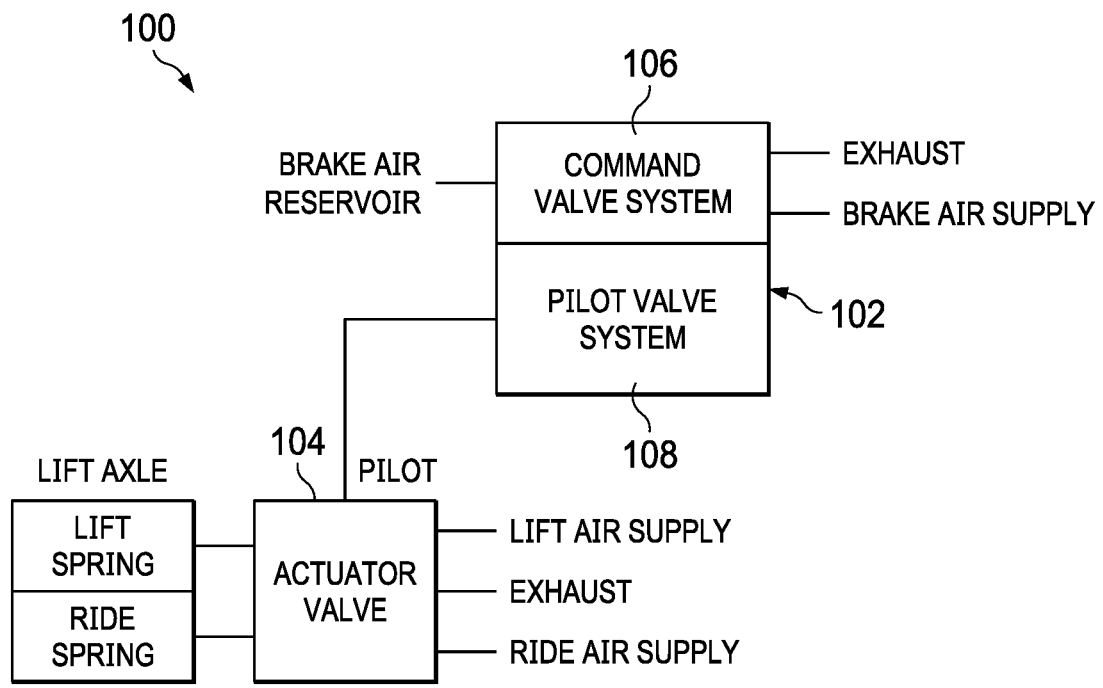
FIG. 3 is a schematic drawing of one embodiment of a lift axle deployment system for a pneumatic lift axle.

As seen in FIG. 3, a lift axle deployment system 100 includes a lift axle control system 102 and an actuator valve 104. The actuator valve 104 pilot may be activated by the lift axle control system 102 that includes a command valve system 106 and a pilot valve system 108. The command valve system 106 controls the flow of pressurized air between the brake air reservoir, the brake air supply, or other pressurized fluid source and the pilot valve system 108, and the flow of pressurized air from the pilot valve system 108 to exhaust (typically atmosphere). The pilot valve system 108 controls fluid flow from the brake air reservoir or brake air supply to the actuation valve pilot.

Figure 4:
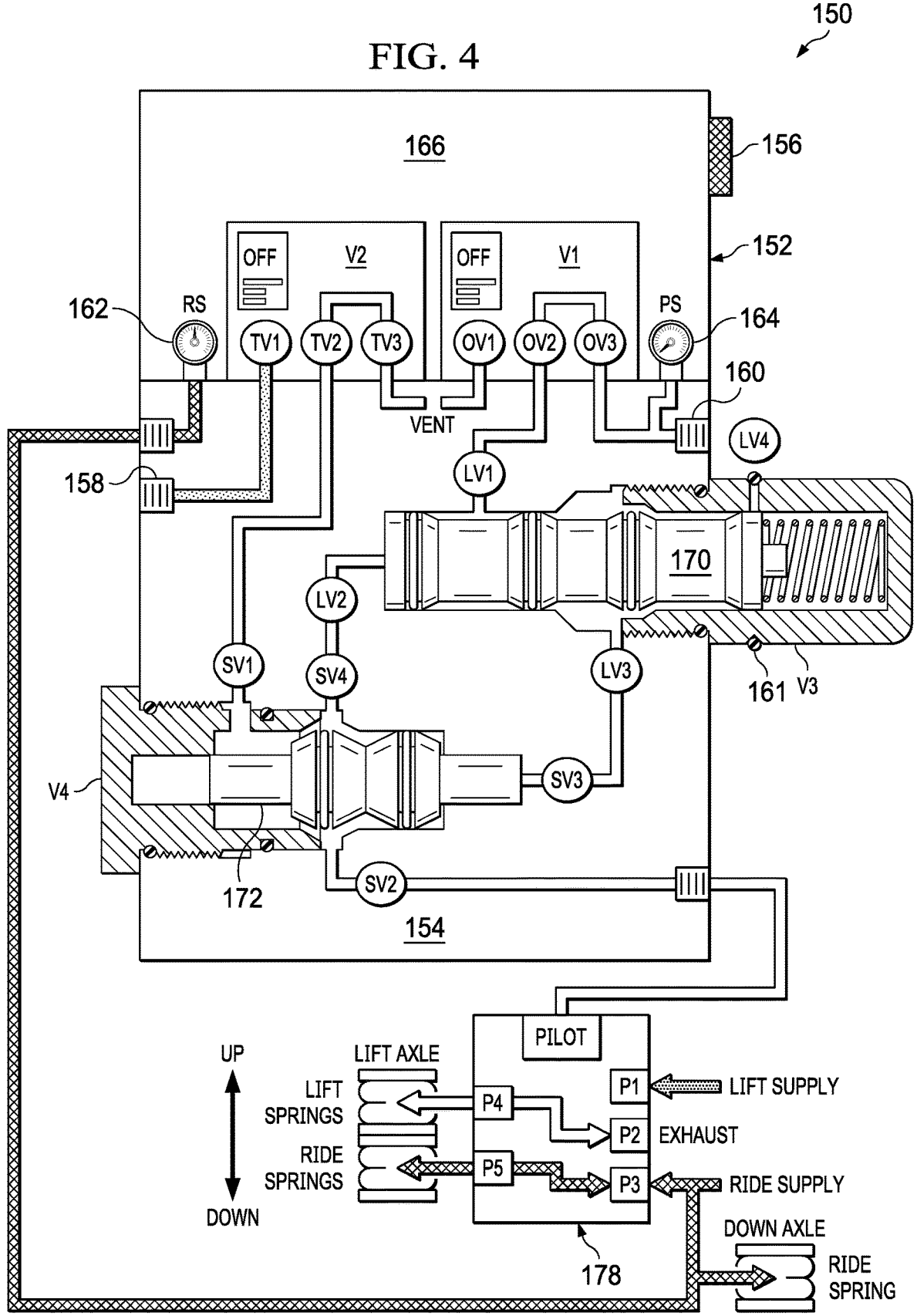
FIG. 4 is a partial section view illustrating an one embodiment of a pneumatic lift axle deployment system.
Figure 5:
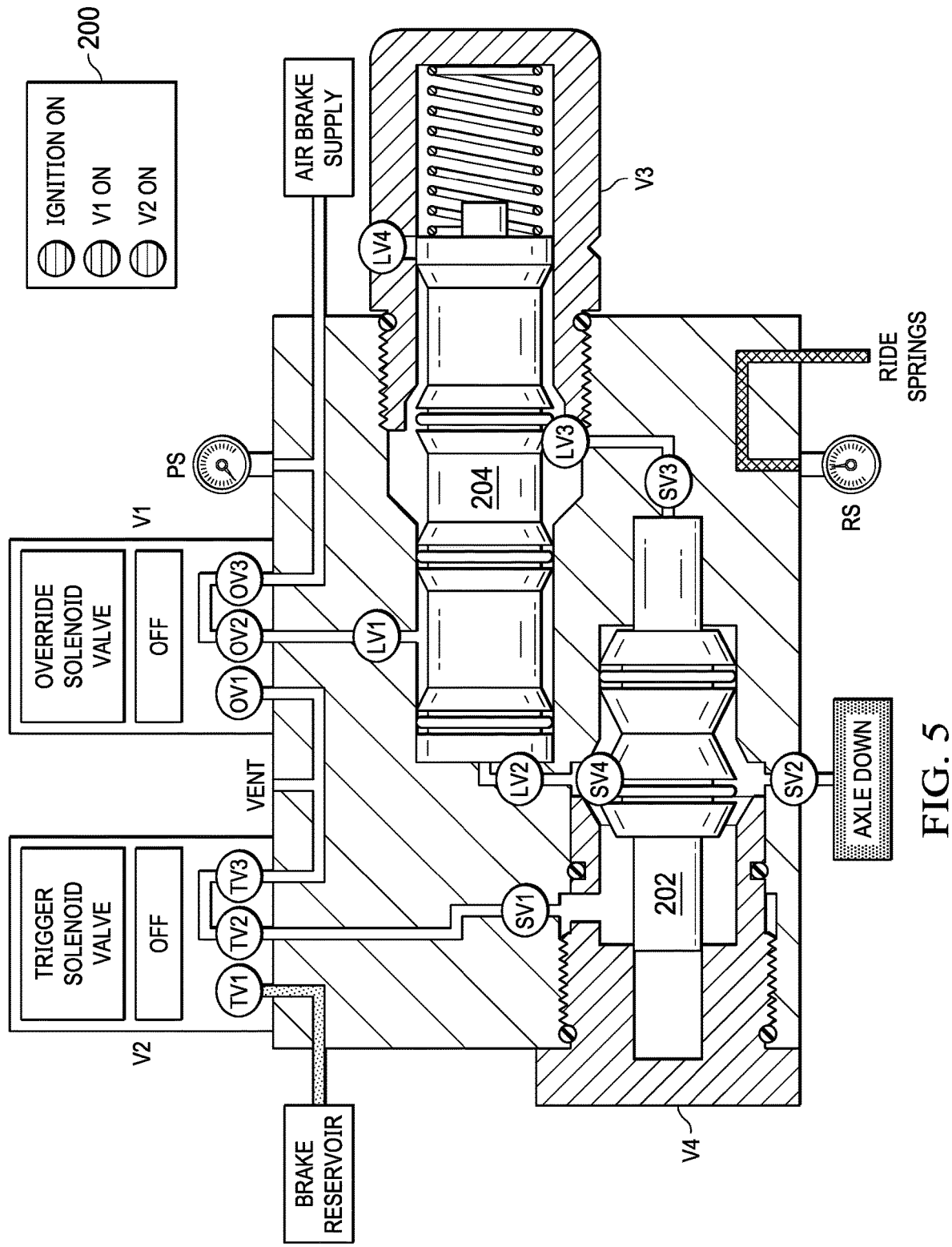
FIG. 5 is a partial section view illustrating the pneumatic lift axle control system of FIG. 4 in a first state.

As may be seen in the embodiment of FIG. 4, a lift axle control system 150 may comprise a command valve system 152 and a pilot valve system 154. The command valve system 152 and pilot valve system 154 may be formed as separate bodies or as a unitary body. In some embodiments, the command valve system may be made as part of an electronic control unit or ECU 166.

The command valve system 152 may itself comprise of one or more valves V1 and V2 for allowing pressurized fluid to flow to valves V3 and V4 of the pilot valve system 154. A command valve system 152 may further comprise pressure sensors, a housing, an electronic control unit, and other electronic control devices. The command valve system 152 may further comprise any other control circuitry and electronics as needed to capture, interpret, and send signals to and from sensors, valves, status lamps and other electronically controlled devices in or communicating with the lift axle control system. Such electronics and circuitry may be powered by a vehicle power supply through an electrical bus connector 156.

The pilot valve system 154 may include valves V3 and V4 that control the flow of fluid through the lift axle control system 150. These valves may be in a housing or body either with or separately from the command valve system 152.

The command valve system 152 may comprise a trigger valve V2 and an override valve V1. The trigger valve is a two-position solenoid valve having ports TV1, TV2 and TV3. In the OFF state of the trigger valve V2 (as shown), port TV1 is connected to an external air supply 158, typically the air brake reservoir, and to no other port of the trigger valve V1. Port TV2 is connected to the port TV3 which is in turn connected to an exhaust or vent port. The trigger valve may receive a trigger signal from an electronic control unit 166. The trigger signal causes the trigger valve V2 to switch states.

The override valve V1 is a two-position solenoid valve having ports OV1, OV2 and OV3. In the OFF state for override valve V1 (as shown), port OV1 is connected to a vent port and to no other port in the override valve V2. Ports OV2 and OV3 are connected so as to allow air flow through the override valve V1 from an air brake supply line 160 to the valve V3 of the pilot valve system 154. The override valve V1 may receive an override signal from an electronic control unit 166. The override V1 signal causes the override valve V1 to switch states.

The command valve system 152 may be coupled to or made part of an electronic control unit (ECU) 166 that further includes a ride spring air pressure sensor 162 RS and a brake supply pressure sensor 164 PS. The ECU 166 may receive ride spring pressure data from the ride spring air pressure sensor 162 RS and calculate vehicle load data based on the ride spring pressure data. The vehicle load data may be used to trigger the override valve V1 or trigger valve V2 to an ON state. Thus, the lift axle control system 150 can automatically set the lift axle position based upon the amount of load on the vehicle.

The loads may be categorized for use in determining deployment state. For example, a vehicle load falling into a Level One category may represent tare weight or a minimal cargo load, and the lift axle control system 150 may ensure that the lift axle is in the raised position unless the system or driver chooses to deploy the lift axle. A vehicle load weight falling into a Level Two category may represent a minimum threshold weight for lowering or deploying the lift axle. A Level Three category load weight may represent a maximum threshold weight at which the lift axle must deploy no matter the disposition of any other deployment criteria. In some embodiments, the vehicle operator may have the ability to override the system and deploy the lift axle. In other embodiments, the ability of the vehicle operator to manually control or override the deployment of the lift axle may be limited by the ECU and only available in limited situations such as emergencies or maintenance operations. In yet other embodiments, such as in highly-regulated driving environments, there may be no method for the vehicle operator to override or manually control axle deployment.

In the disclosed embodiment, the ride spring pressure sensor 162 RS sends an RS load signal to the ECU 166 so that the ECU 166 can monitor the weight of the vehicle load. The ECU 166 calculates the weight of the cargo load based on the RS load signal to determine whether the lift axle should be deployed. For a vehicle containing an air suspension, the ride spring pressure sensor 162 RS may monitor the increases and decreases in pressure of the suspension system and thus determine the weight of the cargo load. Alternately, a ride spring pressure sensor 162 RS may measure the level of deflection created by a cargo load as referenced from the vehicle position at tare weight only. Other sensor modalities for measuring weight may also be utilized in place of, or in combination with, the above-mentioned ride spring pressure sensor modalities.

As discussed, the lift axle may only be raised and lowered under certain conditions. For example, for safety reasons, the axle may not lower with a Level Two load weight and the vehicle in drive mode. Also, the axle may not lower when the vehicle carries a Level One load and the vehicle is in drive mode. The axle may be lowered with a Level Three load independent of the whether the vehicle is in drive or park mode. In some embodiments, the axle may be able to be raised when the vehicle is in motion, regardless of the weight of the load and may automatically lower when the vehicle is in park mode. In other embodiments, the axle will not lower from the raised position when there is no electrical power being supplied from a vehicle power supply to the lift axle control system 150, thus the axle will not accidentally lower in the event of vehicle power loss while the vehicle is in drive mode. Axle position as a function of load weight and vehicle state may be seen in the vehicle condition list embodiment of Table 1.

TABLE 1

Axle Position Matrix

| Condition | Load Level | Elec. Power | Vehicle Mode | Axle Position | Prev. Position |
|---|---|---|---|---|---|
| 1 | All | None | Park | Down | Down |
| 2 | All | None | Park | Down | Up |
| 3 | Lvl 1 | On | Park | Up | Down |
| 4 | Lvl 1 | On | Drive | Up | Up |
| 5 | Lvl 1 | On | Drive | Down | Down |
| 6 | Lvl 1 | Off | Drive | Up | Up |
| 7 | Lvl 2 | On | Drive | Up | Up |
| 8 | Lvl 2 | On | Drive | Down | Down |
| 9 | Lvl 2 | Off | Drive | Up | Up |
| 10 | Lvl 2 | Off | Park | Down | Up |
| 11 | Lvl 3 | On | All | Down | Up |
| 12 | Lvl 3 | On | All | Down | Down |
| 13 | Lvl 3 | Off | All | Down | Down |
| 14 | Lvl 3 | Off | Drive | Up | Up |

Lift axle position may be determined based on vehicle load level, whether the vehicle ignition is on or off, and the vehicle drive or park state. As may be seen from Table 1, at any load level, when the vehicle is in park and turned off, the lift axle will stay down if it was in the down position when the vehicle was placed in park and turned off (condition 1), and will drop down if it was in the up position when the vehicle was placed in park and turned off (condition 2).

At load level 1, when the vehicle power is off but is still in drive mode (such as may happen if the vehicle loses power while being driven), the lift axle will remain in the up position (condition 6). If the vehicle power is on but the vehicle is in park mode, the axle will move to the raised position (condition 3). When the vehicle is placed in drive mode, the axle will stay in the up position while at load level 1 (condition 4) unless the ECU otherwise determines that the lift axle is to be deployed (condition 5). In some embodiments, in condition 5, the operator may be provided the ability to override the system and deploy the lift axle. In other embodiments, the ability of the operator to manually control or override the deployment of the lift axle may be limited by the ECU and only available in limited situations such as emergencies or maintenance operations. In yet other embodiments, there may be no method for the operator to override or manually control axle deployment.

At load level 2, when the vehicle power is on and the vehicle is in drive mode, the lift axle may be raised (condition 7) or deployed (condition 8) by the system. However, if the vehicle power is off but is still in drive mode, the lift axle will move to or remain in the up position (condition 9). When the vehicle is placed in park and turned off, the lift axle will drop if in an up position (condition 10). In some embodiments in condition 8, the operator may be provided the ability to override the system and deploy the lift axle. In other embodiments, the ability of the operator to manually control or override the deployment of the lift axle may be limited by the ECU and only available in limited situations such as emergencies or maintenance operations. In yet other embodiments, there may be no method for the operator to override or manually control axle deployment.

At load level 3, when the vehicle power is on, then the lift axle will deploy (condition 11) or remain deployed (condition 12) if the vehicle is in drive or park mode. If the vehicle power is off, then the lift axle will remain deployed (condition 13) in drive or park mode. However, if the lift axle is in the up position at load level 3 and the vehicle is in drive mode but the power is off, then the lift axle will stay in the up position (condition 14). In some embodiments in condition 14, the operator may be provided the ability to override the system and deploy the lift axle. In other embodiments, the ability of the operator to manually control or override the deployment of the lift axle may be limited by the ECU and only available in limited situations such as emergencies or maintenance operations. In yet other embodiments, there may be no method for the operator to override or manually control axle deployment.

With reference again to FIG. 4, the ECU 166 may receive brake air pressure data from the brake supply pressure sensor 164 PS and determine from the brake air pressure data whether the brake air supply is activated or inactive, i.e., whether the brake air supply 160 is providing pressurized air or not. The brake air pressure data may then be applied for determining whether the vehicle is in park mode or drive mode. The ECU 166 may also determine from the brake air pressure data the adequacy of the air supplied from the brake air supply 160.

The pilot valve system 154 comprises a latching valve V3 and a shuttle valve V4. The latching valve V3 includes a latch shuttle 170 configured to move between a first shuttle position and a second shuttle position, and includes latch ports LV1, LV2, LV3, and LV4. Port LV4 vents to atmosphere and serves to maintain a generally constant pressure in the end cap of the latching valve as the latch shuttle 170 translates between positions. Port LV4 may be sealed by a gland 161, such as an o-ring, disposed so as to prevent contaminants from entering port LV4 from the outside environment, but release pressure buildup from the latching valve V3. In the embodiment of FIG. 4, the latching valve V3 is an air pilot 3-way latching valve. The latching valve V3 moves the latch shuttle 170 from a first latch position to a second latch position when receiving a pilot signal at pilot port LV2 and stays in the second latch position when the pilot signal discontinues. The first latch position may be generally seen as the closed position of the latching valve V3 as fluid from the override valve V1 cannot flow from the override port LV1 past the latch shuttle 170. The second latch shuttle position may be generally seen as the open position as flow past the latch shuttle 170 from override port LV1 to latch pass port LV3 is made possible. In other embodiments, the latching valve V3 may be electronically piloted and controlled by the ECU 166.

The shuttle valve V4 includes a shuttle 172 configured to move between a first shuttle position and a second shuttle position, and includes ports SV1, SV2, SV3 and SV4. In the embodiment of FIG. 4, the shuttle valve V4 is pneumatically actuated by pressurized air supplied at port SV1 or SV3. The shuttle 172 prevents fluid communication between trigger port SV1 and latch port SV3. In one shuttle position, flow from trigger valve V2 is blocked at port SV1, but flow to the pilot of actuator valve 178 is possible from the override valve V1 by way of the latching valve V3. In another shuttle position, flow is possible through the shuttle valve V4 when said flow originates from the trigger valve V2. In other embodiments, the shuttle valve may be electronically actuated under control by the ECU 166.

The latching valve V3 and shuttle valve V4 may be separately provided or may be provided in unitary body as shown in the embodiment of FIG. 4.

The trigger valve V2 controls the flow of pressurized air from the brake air reservoir to the shuttle valve V4, and from the shuttle valve V4 to atmosphere via an exhaust vent connected to port TV3. Port TV1 is connected to the brake air reservoir. Port TV2 is connected to port SV1 of the shuttle valve. Port TV3 is connected to the exhaust vent. In some embodiments, port TV1 may be connected to sources of pressurized fluid other than the brake air reservoir, such as a pressure tank of an onboard air compressor.

Override valve V1 controls the flow of pressurized air from the brake air supply 160 to the latching valve V3, and from the latching valve V3 to atmosphere via exhaust vent. Port OV1 is connected to the exhaust vent. Port OV2 is connected to port LV1 of the latching valve V3. Port OV3 is connected to the brake air supply 160.

As seen in the embodiment of FIG. 4, port SV4 of the shuttle valve V4 is connected to port LV2 of the latching valve V3. Port SV3 of the shuttle valve V4 is connected to port LV3 of the latching valve V3. Port SV2 of the shuttle valve V4 is connected to the pilot of the actuator valve 178.

The lift axle control system is configured to lower the lift axle to a deployed position such that the tires of said axle are in contact with the travel surface. Generally, the lift axle is lowered when the vehicle is turned off and is in park mode, or when the vehicle load exceeds a threshold weight. The lift axle control system is generally configured to raise the lift axle and maintain the lift axle in a raised state when the vehicle is in drive mode, even if the ECU loses power, except in overweight conditions in which load weight requires that the axle be in the lowered position. The system may also raise the axle when in park mode with a light load if the vehicle ignition is on. Of course, the deployment mode may be overridden or restricted as described above.

FIGS. 5-11 provide a simplified view of the embodiment of FIG. 4 in various deployment states. Turning first to operation of the lift axle control system when the vehicle ignition is OFF as in FIG. 5, when the vehicle is in park, the brake air supply does not supply pressurized air at port OV3. An indicator light panel 200 may show that the ignition is on (power on), and that override valve V2 and trigger valve V2 are OFF. All of the lights are dark. The supply sensor PS detects the lack of pressurized air and the ECU sets the trigger valve and the override valve to remain in the OFF state or to transition to the OFF state, thus exhausting air from shuttle valves of the pilot valve system. As may be seen in FIG. 5, when the trigger valve is off, port TV2 is connected to the exhaust vent through port TV3. With the trigger valve off, pressurized air from the brake air reservoir at port TV1 cannot pass to the shuttle valve V4. When the override valve V1 is off, port OV2 is connected to the brake air supply through port OV3. With the shuttle valve V4 exhausted and without fluid flow through the override valve V1, no pneumatic pilot signal is sent to the actuator valve from port SV2. The inactive actuator valve (not shown) thus defaults to a deployed position by exhausting the lift spring and allowing the ride spring to fill and the axle will be in the lowered position.

Figure 6:
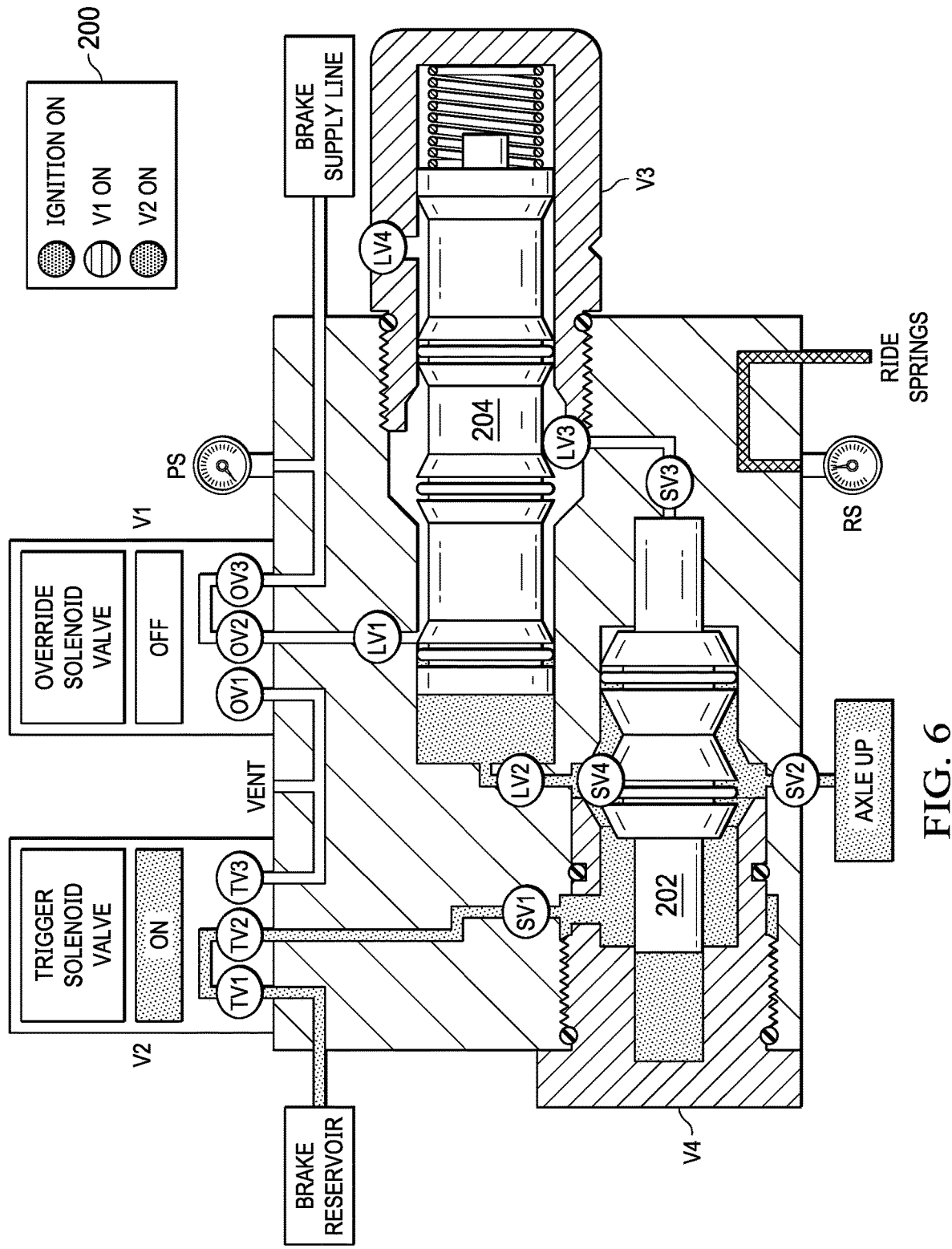
FIG. 6 is a partial section view illustrating the pneumatic lift axle control system of FIG. 4 in a second state.

As seen in FIG. 6, when the vehicle ignition is ON but the vehicle is still in park mode and the vehicle is not under a heavy weight load, the trigger valve V2 transitions to ON while the override valve V1 remains OFF. The indicator light panel 200 shows the Ignition ON and V2 ON lights illuminated. Turning the trigger valve V2 ON connects port TV1 and port TV2 of the trigger valve V2 and thus permits fluid to flow from the brake air reservoir to the shuttle valve V4 at port SV1, which then actuates the shuttle valve from a first shuttle position to a second shuttle position or has the shuttle 202 remain in the second position, as the case may be. With the shuttle 202 in the second position, fluid communication is now possible between ports SV1 as an inlet to the valve and ports SV4 and SV2 as outlets while closing port SV3. Thus, when the shuttle 202 is in the second shuttle position, fluid may flow from the brake air reservoir to the pilot of an actuator valve (not shown) and to the pilot port LV2 of the latching valve V3. When the fluid flows to the pilot port LV2 of the latching valve V3, the latch shuttle 204 moves from a first latch position to a second latch position. With reference to FIG. 2B, when fluid flows to the pilot 56 of an actuator valve 50, port P3 of the actuator valve 50 disconnects from port P5 and closes while port P1 then connects to port P4. At the same time, port P5 connects to exhaust port P2. These actions terminate fluid flow to the ride spring 62 and connect the ride spring 62 to the exhaust port P2 of the actuator valve 50. Concurrently, these actions connect the lift spring 52 to the lift spring supply 58 and thus raise the lift axle.

Figure 7:
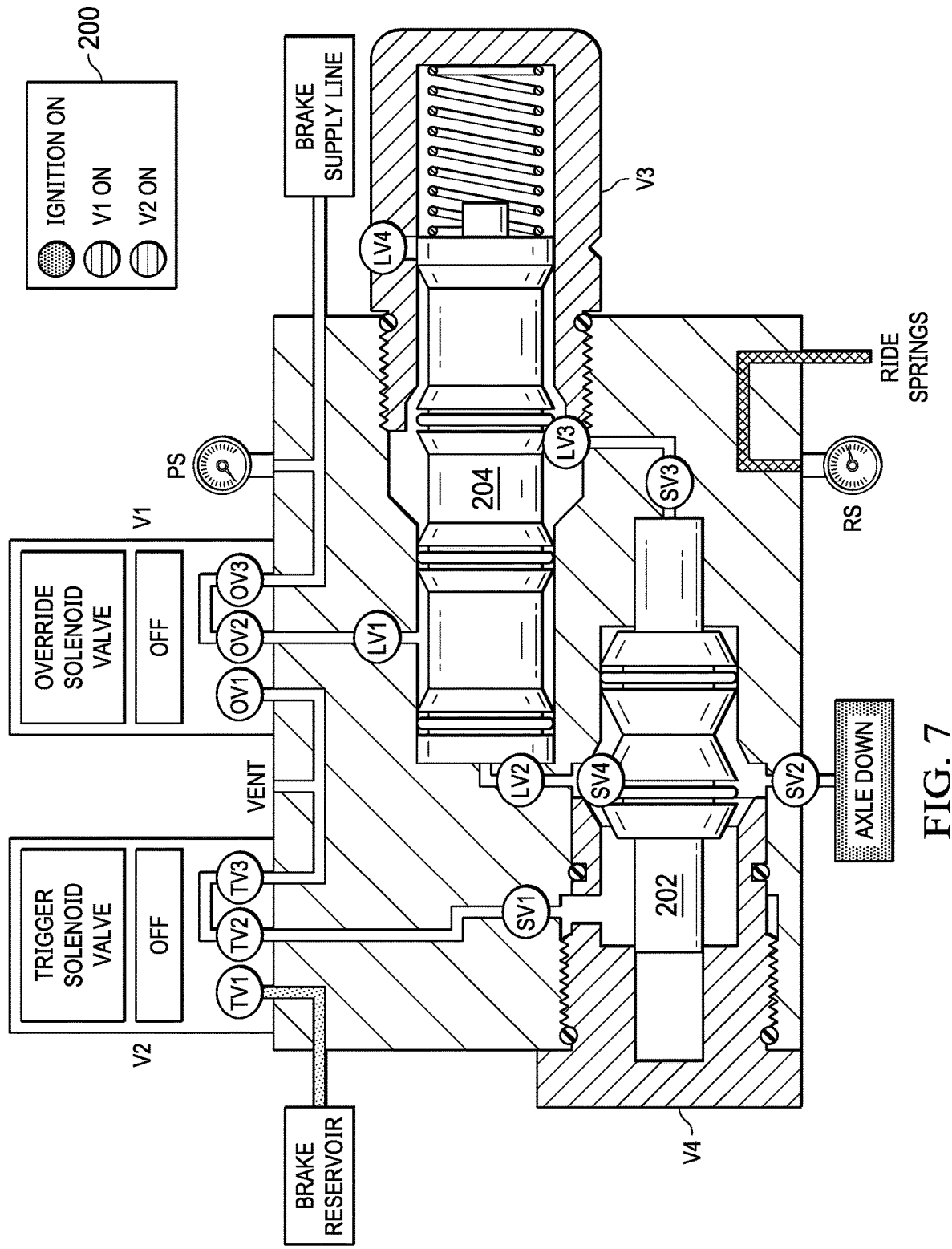
FIG. 7 is a partial section view illustrating the pneumatic lift axle control system of FIG. 4 in a third state.

If the ECU determines that upon turning on the vehicle ignition there is a heavy load condition, then the command valves V1 and V2 would remain in the OFF position (and the light panel 200 would so indicate), as shown in FIG. 7, so as that the axle would remain in the lowered position.

The trigger valve V2 may be turned on either manually by the vehicle operator, or automatically when the ECU determines that the vehicle load exceeds a weight threshold for deploying the lift axle. In some embodiments, the operator may have the ability to override the system and deploy the lift axle. In other embodiments, the ability of the operator to manually control or override the deployment of the lift axle may be limited by the ECU and only available in limited situations such as emergencies or maintenance operations. In yet other embodiments, there may be no method for the operator to override or manually control axle deployment.

Figure 8:
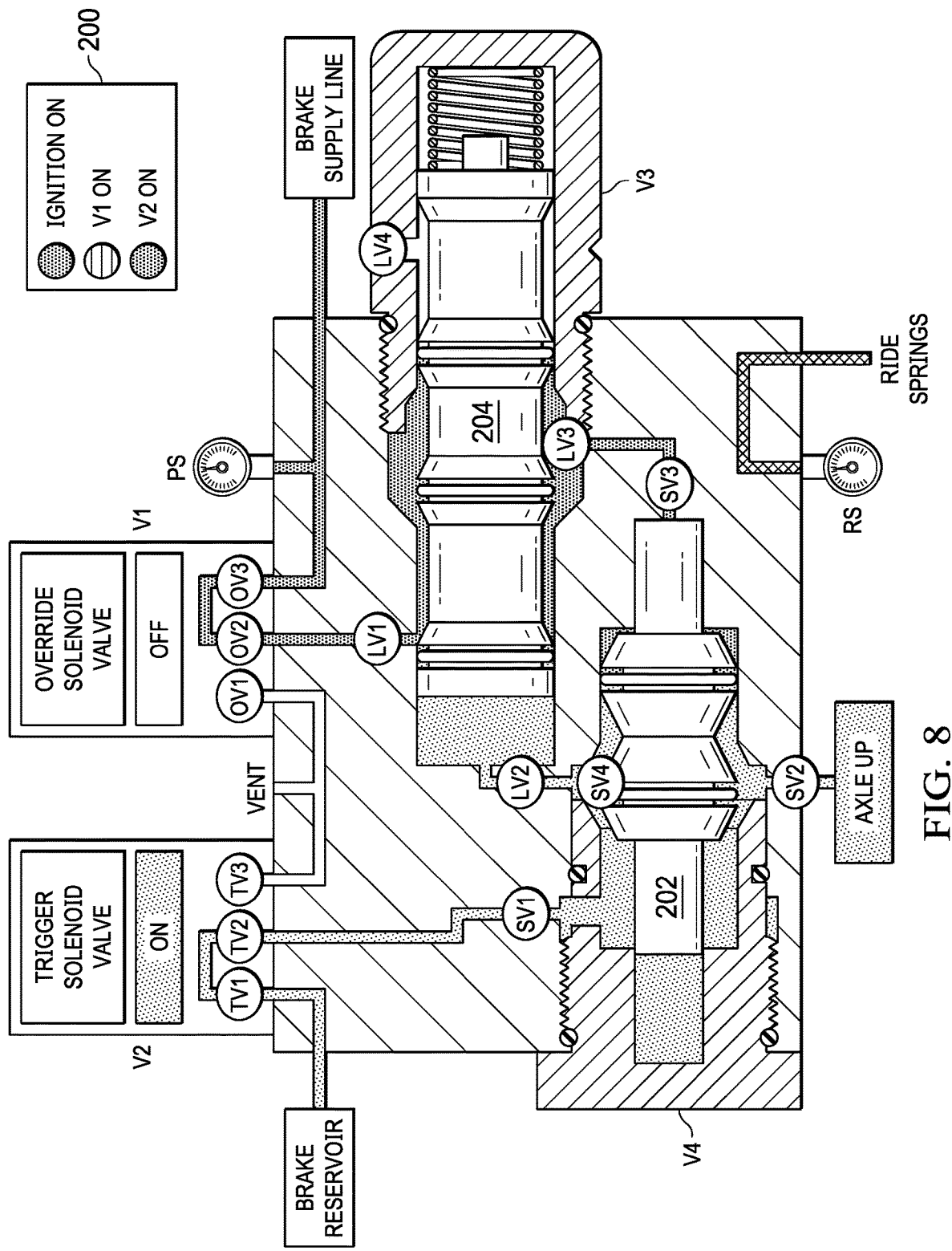
FIG. 8 is a partial section view illustrating the pneumatic lift axle control system of FIG. 4 in a fourth state.

Referring to FIG. 8, while carrying a light load and the parking brake has been released then the indicator light panel will show the Ignition ON and V2 ON lights illuminated. Fluid will flow through the brake supply line to Port OV3 of the override valve V1 and through the override valve V1 to port OV2 and from port OV2 to the latching valve V3 at port LV1. The fluid will flow through the shuttle valve from port LV1 to port LV3. Fluid will then flow from port LV3 of the latch valve V3 to port SV3 of the shuttle valve V4. In some embodiments, the fluid pressure on both ends of the shuttle 202 holds the shuttle in the second position, maintaining a pilot signal to the actuator valve. This represents a transitional state for park mode and drive mode, and in such states the axle will remain in the up position.

Figure 9:
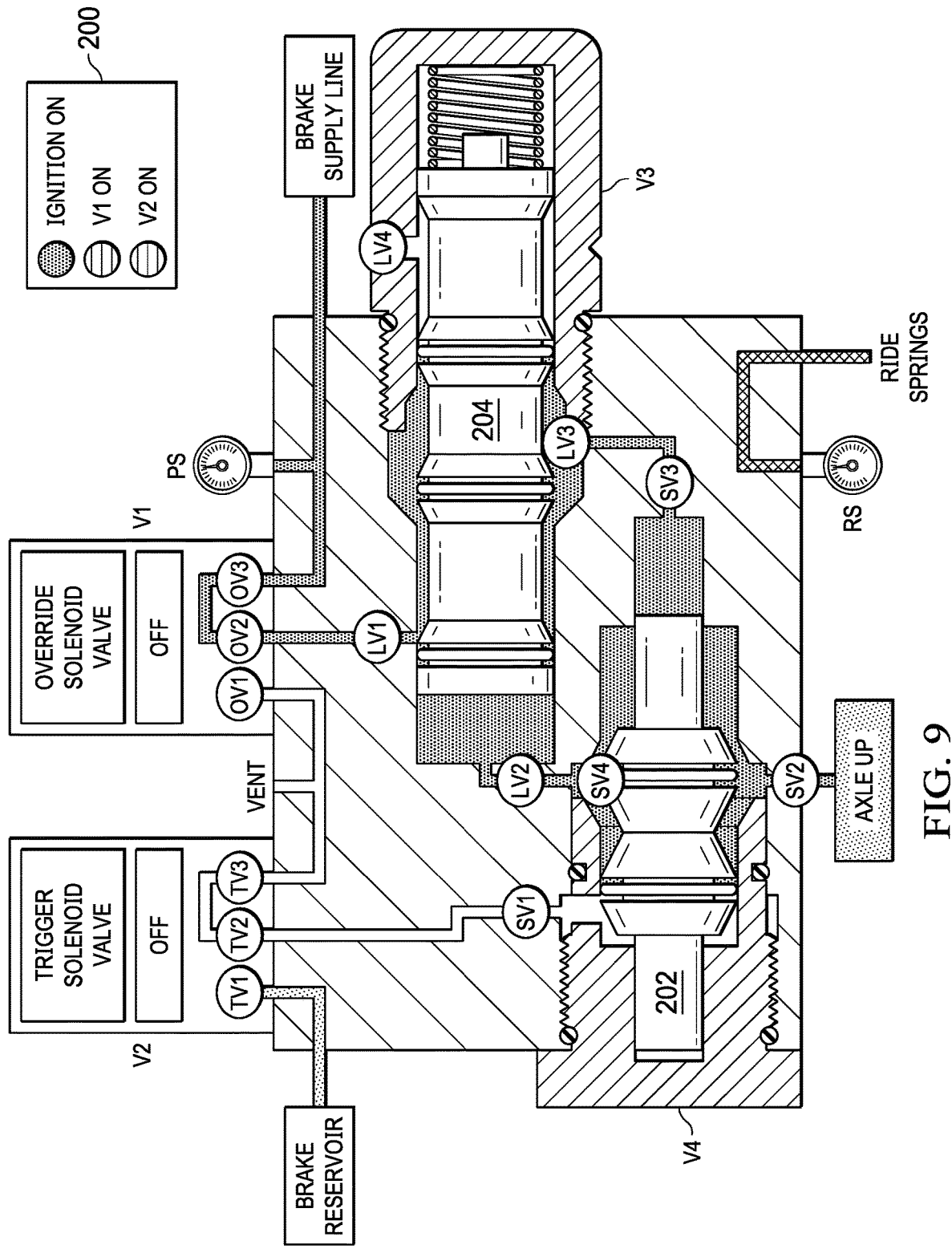
FIG. 9 is a partial section view illustrating the pneumatic lift axle control system of FIG. 4 in a fifth state.

As shown in FIG. 9, when the trigger valve V2 is deactivated, then the shuttle valve V4 will be de-pressurized when port TV2 is connected to exhaust vent at port TV3. Fluid will escape from shuttle valve V4 through port SV1. The shuttle 202 of the shuttle valve V4 will transition to the first shuttle position and the air flow through the latching valve V3 and into the shuttle valve V4 will keep the shuttle 202 in this position. With the shuttle in the first shuttle position, fluid flow will flow from port SV4 to port SV2 and onward to the pilot of the actuator valve. This will maintain the axle in the raised position. The indicator light panel will show only the Ignition ON light illuminated.

Figure 10:
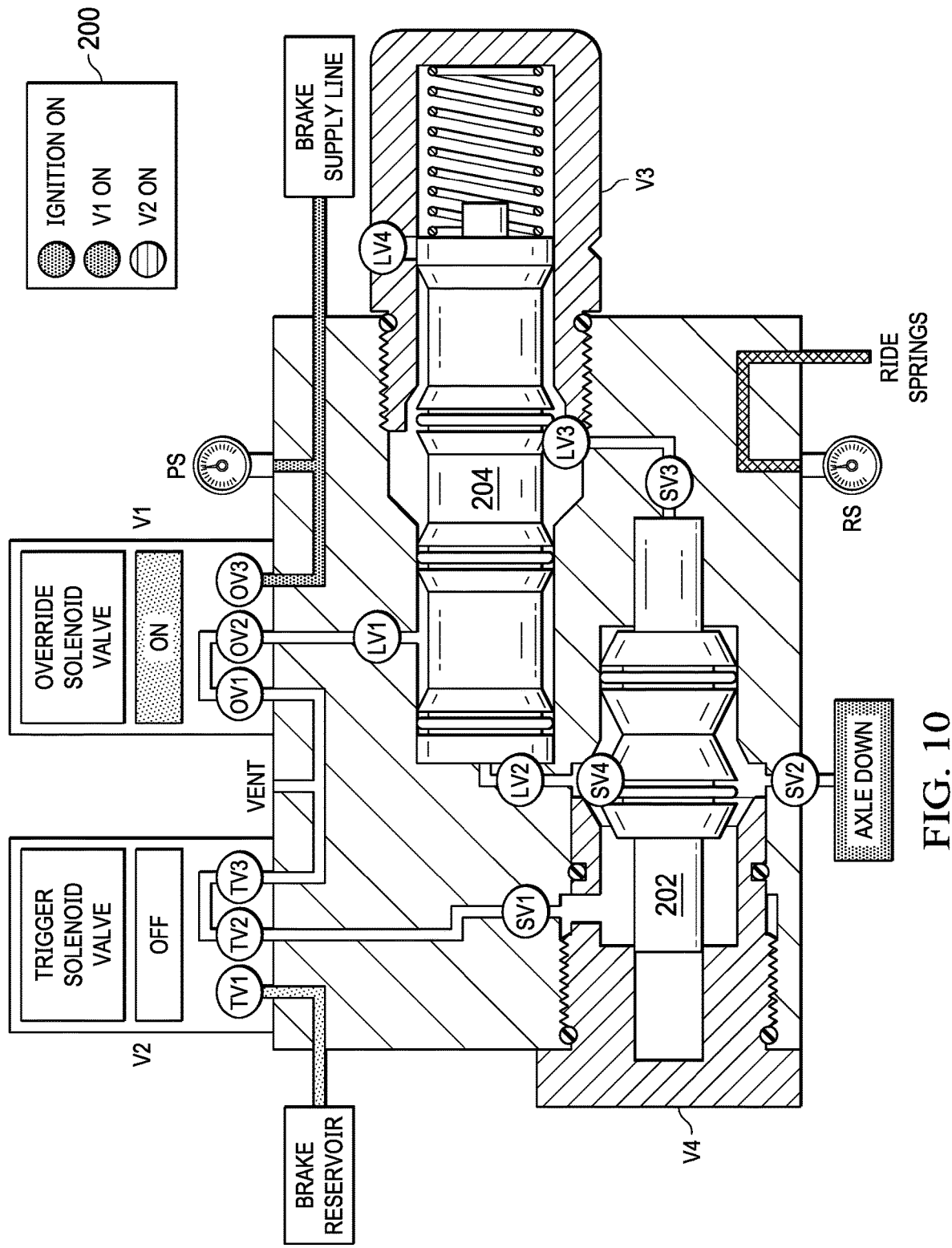
FIG. 10 is a partial section view illustrating the internal arrangement of the pneumatic lift axle control system of FIG. 4 in a sixth state.

If the vehicle is carrying a heavy load in drive mode, as in FIG. 10, then the ECU would engage a heavy load protocol for drive mode. Under such protocol, the override valve is transitioned to the ON state and the trigger valve remains in the OFF state, thus allowing the pilot valve system to exhaust pressurized fluid from both shuttle valve V4 and latch valve V3 to atmosphere. In this system state, the shuttle 202 is in the first position state while the latch shuttle 204 is in the second position state. The trigger valve has port TV2 connected to port TV3 so that the shuttle valve V4 will vent to atmosphere. Port OV2 of the override valve is connected to port OV1 so that the latching valve V3 also vents to atmosphere by placing port LV1 in communication with port OV2. The indicator light panel will show only the Ignition ON and V1 ON lights illuminated. As both valves of the pilot valve system are venting to atmosphere through the command valve system, no pressure signal is seen at the pilot 56 of the actuator valve 50 and thus, with reference to FIG. 2A, port P3 is connected to port P5 and enables flow from the ride supply 60 to pressurize the ride spring 62. Concurrently, port P4 is connected to exhaust port P2 and thus the lift spring 52 vents pressure to the atmosphere. Port P1 is closed and so the lift supply 58 is isolated from the system. The overall result of these conditions is that the lift axle deploys to the downward position.

Figure 11:
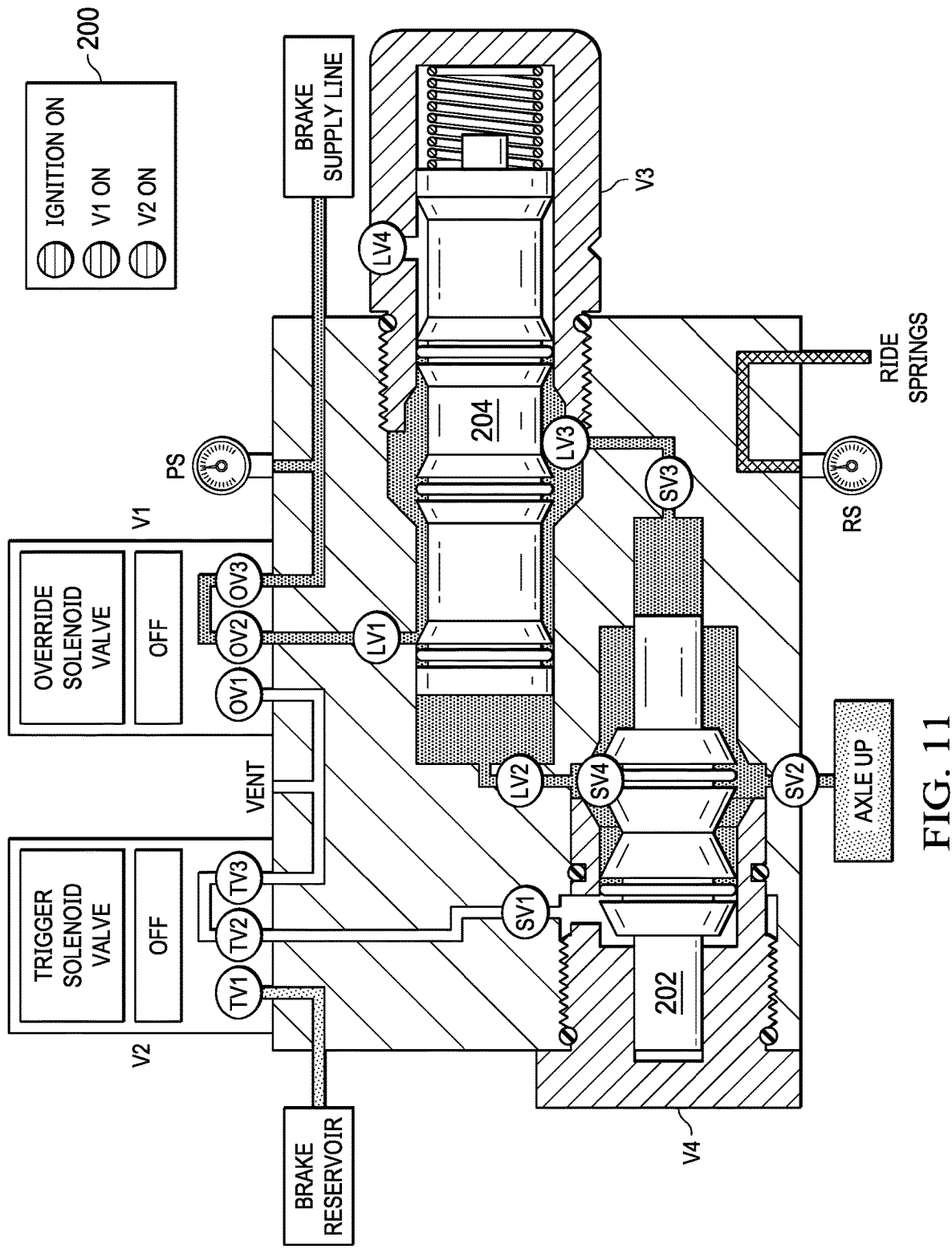
FIG. 11 is a partial section view illustrating the internal arrangement of the pneumatic lift axle control system of FIG. 4 in a seventh state.

As seen in FIG. 11, in the event of a low power event or complete loss of power when in drive mode, the system will maintain the axle in the raised position by pneumatic pressure when under a light load. The command valves V2 and V1 will be already in the OFF position while in light load drive mode and would require power to transition to another position at which the axle would be able to lower. The indicator light panel will show all of the lights as dark.

Figure 12:
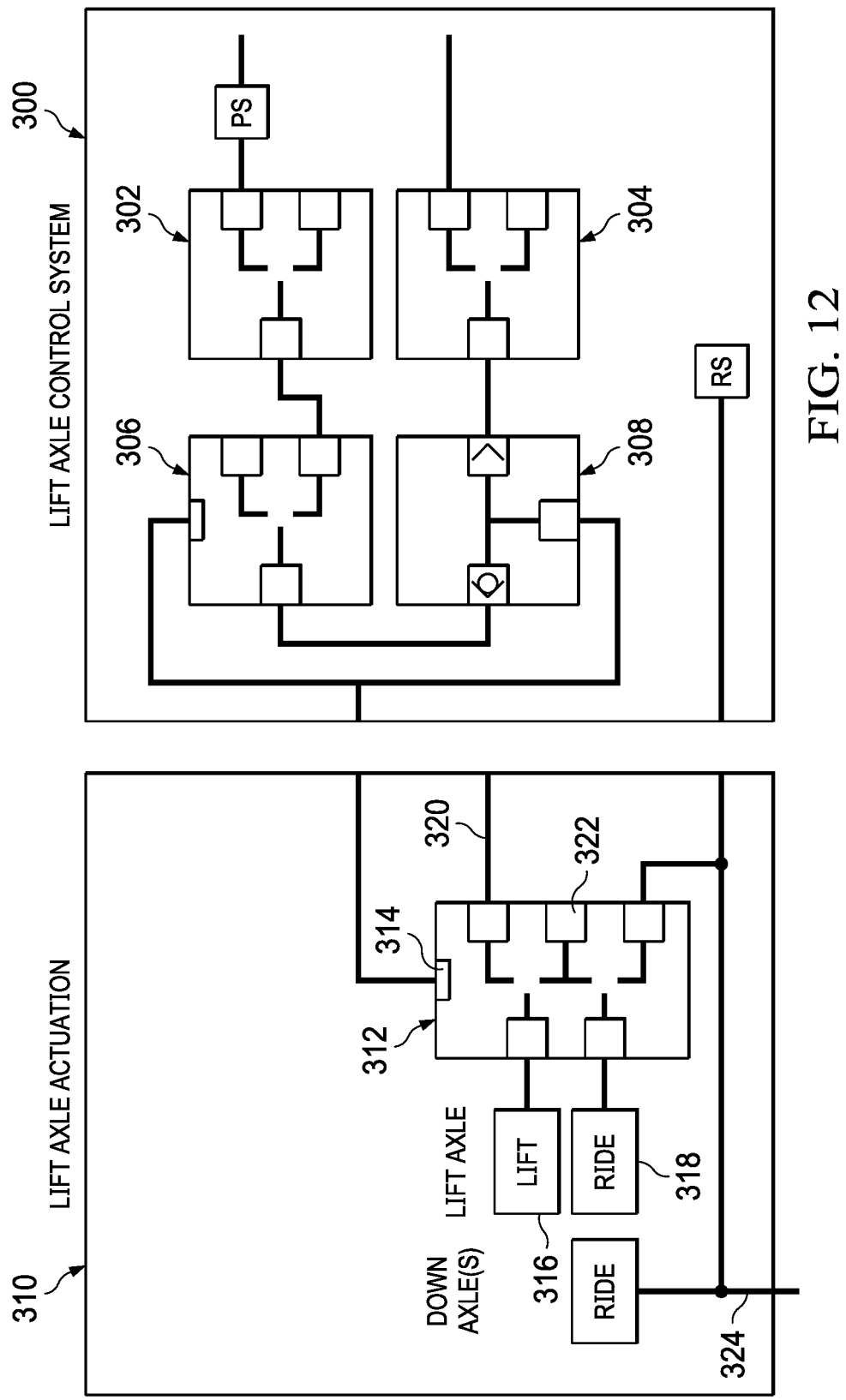
FIG. 12 is a simplified schematic drawing of one embodiment of a pneumatic lift axle deployment system.
Figure 12E:
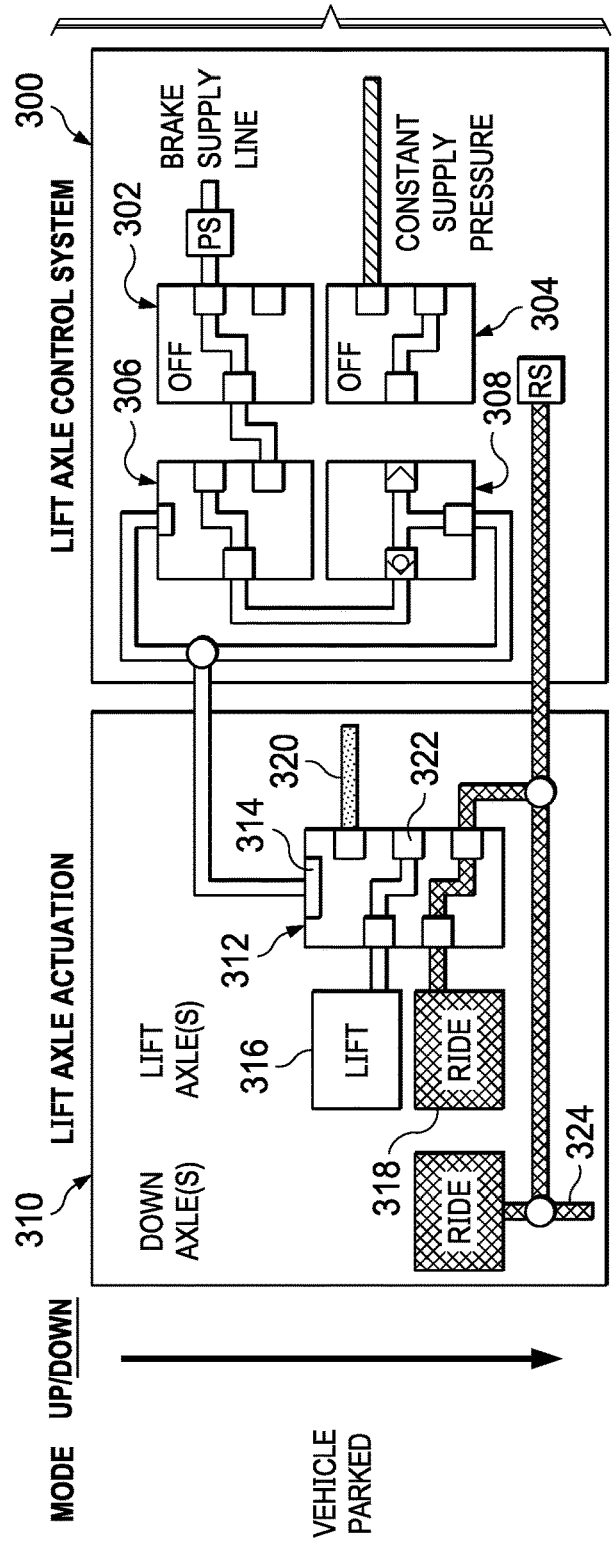

FIGS. 12 and 12A through 12E illustrate various lift axle deployment states in connection with vehicle mode, up/down lift axle position, lift axle actuation state and lift axle control system state. The constant supply fluid pressure may be provided by a brake air reservoir. FIG. 12 illustrates basic flow paths of lift axle actuation system and the lift axle control system embodiments in an indeterminate state for discussion purposes, and FIGS. 12A through 12E illustrate various lift axle deployment states of the lift axle actuation system and the lift axle control system based on possible flow paths of FIG. 12. The lift axle control system 300 includes an override valve 302, a trigger valve 304, a latching valve 306, and a shuttle valve 308. The lift axle actuation system 310 includes an actuator valve 312 connected so as to be capable of receiving a pilot signal from either the latching valve 306 or the shuttle valve 308. The actuator 312 is connected to the lift spring 316 and ride spring 318 of the lift axle. The actuator is also connected to a lift spring supply 320, an exhaust port 322 and a ride spring supply 324.

As shown in FIG. 12A, the default mode of the lift axle deployment system is for the lift axle to be deployed in the down position. This represents a parked vehicle state with no power to the trigger valve 304 and override valve 302. Both the constant supply pressure and the brake supply line are isolated from the system by the trigger valve 304 and override valve 302 to which each is respectively fluidly coupled. This results in no signal to the pilot 314 of the actuator valve 312 and so flow from the ride supply pressurizes any connected ride springs 318.

In FIG. 12B, a command signal has been sent to the system to raise the lift axle while in park mode. The trigger valve 304 connected to the constant supply pressure then opens to provide flow to the pilot 314 of the actuator valve 312. This results in a pilot signal being sent to the pilot 314 of the actuator valve 312 and the latch valve 306 of the pilot valve system. The actuator valve 312 then isolates the ride supply 324 from the ride spring 318 of the lift axle while opening flow to the lift axle lift spring 316 from the lift supply 320. As the lift spring 316 is pressurized, the ride spring 318 is depressurized through a vent 326 in the actuator valve 312.

As seen in FIG. 12C, the lift axle may be raised by command while in drive mode. While the vehicle is in drive mode, the parking brake is disengaged by air pressure from the brake supply line, which also supplies pressure to the latching valve 306 through the override valve 302. The ECU may receive a command signal from a vehicle operator to raise the lift axle, and thus activate the trigger valve 304 to an ON state. Switching the trigger valve 304 to an ON state will allow pressurized fluid from the brake air reservoir or other constant pressure fluid supply to flow through the trigger valve 304 to the shuttle valve 308. The pressurized fluid will move the shuttle of the shuttle valve 308 from a first position to a second position, thus allowing pressurized fluid to flow or signal to the pilot 314 of the actuator 312. When the actuator 312 receives the pneumatic pilot signal from the shuttle valve 304, the actuator 312 connects the lift axle lift spring 316 to the lift spring pressure supply 320, thus permitting the lift axle lift spring to inflate and raise the lift axle. The actuator 312 simultaneously disconnects the lift axle ride spring 318 from the ride spring pressure supply 324 and connects the lift axle ride spring 318 to exhaust port 322, thus permitting the lift axle ride spring 318 to deflate. Thus, supplying a pressure signal to the actuator valve 312 results in the lift spring 316 being pressurized by the lift supply 320 while the ride spring 318 is vented to atmosphere and also isolated from the ride supply 324. This results in the lift axle being in the raised position.

While drive mode is engaged, the lift axle may be held in the raised position by purely pneumatic means if power to the ECU is lost or the ignition turns off, as seen in FIG. 12D. This means even a loss of vehicle power will not result in the lowering of the lift axle when not intended. If the ECU loses power, then the trigger valve 304 will switch to an OFF state, thus disconnecting the shuttle valve 308 from the brake air reservoir or other constant pressure fluid supply, and exhausting the shuttle valve 308 pressure. Loss of pressure to the shuttle valve 308 will cause the fluid pressure from the latching valve 306 to move the shuttle of the shuttle valve 308 from the second position back to the first position. With the shuttle of the shuttle valve 308 in the first position, pressurized fluid will flow from the latching valve 306 to the pilot 314 of the actuator 312, thus maintaining lift pressure fluid supply to the lift spring 316.

When the vehicle is turned off and the parking brake is set, then the ECU may reset the lift axle deployment system such that the trigger valve 304 is off, the override valve 302 is off, the shuttle valve 308 is in the first shuttle position and the latching valve 306 is in the first latch position, thus resulting in the lift axle lowering to a deployed position.

The ECU may be programmed with a particular logic or method by which determinations as to axle deployment may be made. The ECU may iterate through a decision tree in which a set of interrogatives are posed, and sensor data is applied to answer said interrogatives. Each interrogative and answer set will result in either a change in axle deployment state or advancement to the next interrogative-answer set. In some embodiments, the decision tree may be a continuously running application. In other embodiments, the execution of the decision tree may be triggered by detection of a change in the monitored data set.

For example, an initial vehicle state may comprise of the axle in the lowered position, the ignition off, and the parking brake engaged. Beginning execution of the decision tree at said state, a first interrogative may be whether the parking brake is engaged (park mode) which would then result in a positive or negative answer return. A negative answer would result in the axle remaining down while a positive return would advance the decision tree to determine if the ignition is on. A negative answer would result in the axle remaining down while a positive return would advance the decision tree to determine if a heavy cargo weight is present. A positive answer would result in the axle remaining down while a negative return would advance the decision tree to determine if a low cargo weight is present. A negative answer would result in the axle remaining down while a positive return would indicate a vehicle state wherein the axle is raised, ignition is on, and the parking brake is engaged.

This second vehicle state would result in iteration through another set of interrogatives. The first interrogative in this set may check if the vehicle is drive mode. A negative answer would result in the axle remaining up while a positive return would advance the decision tree to determine if a heavy cargo load is present. A positive answer would result in the axle being lowered while a negative return would advance the decision tree to determine if the ignition is off. A positive answer would result in the axle being raised while a negative return would advance the decision tree to determine again whether the vehicle is in park mode. A positive answer would advance the decision tree to determine if the ignition state while a negative return would advance the decision tree to the drive mode interrogative.

Figure 13:
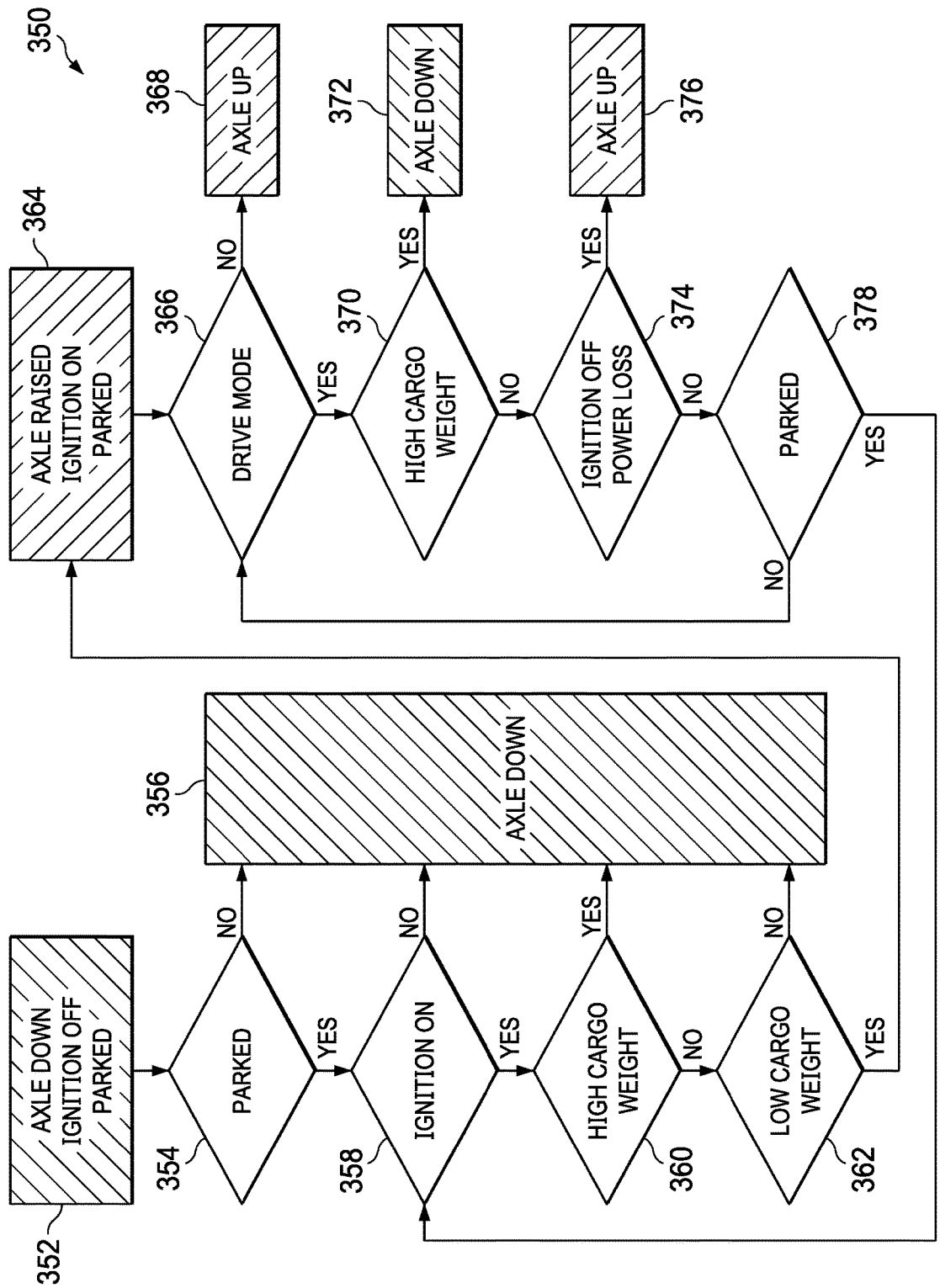
FIG. 13 is an embodiment of a method for deploying a lift axle.

As seen in the embodiment of logic states or steps 350 shown in FIG. 13, the vehicle may be in an initial state 352 in which the vehicle is in park mode (parking brake engaged) with the power or ignition off. In such a state, the lift axle is in a lowered position with the lift axle wheels resting on the ground. In step 354, if the parking brake is determined not to be engaged, then the lift axle will remain down (state 356). In step 358, if the parking brake is determined to be engaged but the vehicle ignition or power is off, then the lift axle will remain down (state 356). In step 360, if the parking brake is determined to be engaged and the vehicle ignition or power is on so as to provide power to the ECU, then the ECU will check for a vehicle load above a lift axle deployment threshold. The lift axle will remain down (state 356) if the ECU senses a vehicle load above the lift axle deployment threshold. If the ECU does not sense a vehicle load above the lift axle deployment threshold (such as a high or maximum deployment threshold above which the lift axle must be deployed), then the ECU will determine whether there is no vehicle load or determine if a vehicle load is below a lift axle deployment threshold (such as a low or minimum deployment threshold below which the lift axle should be raised) at step 362. If the vehicle load is between a high threshold and a low threshold, then the ECU will allow the lift axle to remain down (state 356). In such a state, a vehicle operator may send a command signal to the lift axle control system to override the ECU state and raise the lift axle. In step 362, if the vehicle load is below a lift axle deployment threshold (such as a low or minimum deployment threshold below which the lift axle should be raised), then the ECU will trigger the lift axle control system to send a pilot signal to the lift actuator to raise the lift axle (state 364).

In state 364, the vehicle is in an idle park mode with power on and the axle raised. The vehicle can thus be shut off and powered down (thus returning to state 352), or placed into drive mode and operated to haul a load. Or, the vehicle can remain in park mode. In step 366, if the vehicle is not placed in drive mode, then the lift axle will remain raised (state 368). In some cases, a vehicle may be loaded while in idle park mode. If the vehicle is thereafter placed in drive mode in step 366, then the ECU will once again determine the vehicle load. In step 370, the ECU will check for a vehicle load above the lift axle deployment threshold. The lift axle will remain down (state 372) if the ECU senses a vehicle load above the lift axle deployment threshold. If the ECU does not sense a vehicle load above the lift axle deployment threshold (such as a high or maximum deployment threshold above which the lift axle must be deployed), then the axle will remain up while the vehicle is driven.

In step 374, if the vehicle loses power while being driven with the axle up and the ECU powers down, then the trigger valve and override valve will both be in an OFF state. In the OFF state, the trigger valve will switch to exhaust pressure from the shuttle valve, and the override valve will continue to pass brake air pressure to the latching valve, which will in turn pass pressurized air to the shuttle valve to switch the shuttle valve so as to allow the pressurized air to flow through the shuttle valve to the pilot of the actuator so as to maintain the actuator state in which the lift axle is raised (state 376).

In step 374 if the vehicle does not lose power while being driven with the axle up, then the axle will remain up until the vehicle is stopped or the driver overrides the lift axle control system ECU state to force the lift axle to drop down to a deployed state. If the vehicle stops and is not placed into park mode (step 378), then the ECU will treat the vehicle as still being in drive mode state. If the vehicle is stopped and placed in park mode (step 378), then the ECU will continue to monitor the vehicle load if the ignition remains on (step 358). If the vehicle is stopped, placed in park mode (parking brake engaged) and the ignition turned off, then the parking brake supply will de-pressurize. Thus, the override valve will be in the OFF state but not passing pressurized fluid to the latching valve. The trigger valve will also be OFF, and not passing brake pressure fluid to the shuttle valve. Without pressure to shuttle valve or latching valve, the pilot valve system will not send a pilot signal to the actuator, which will result in the actuator switching to lower the lift axle to a down position (state 356). With the vehicle in park mode with the ignition off and lift axle down, the vehicle returns to state 352.

Shuttle Valve

Figure 14:
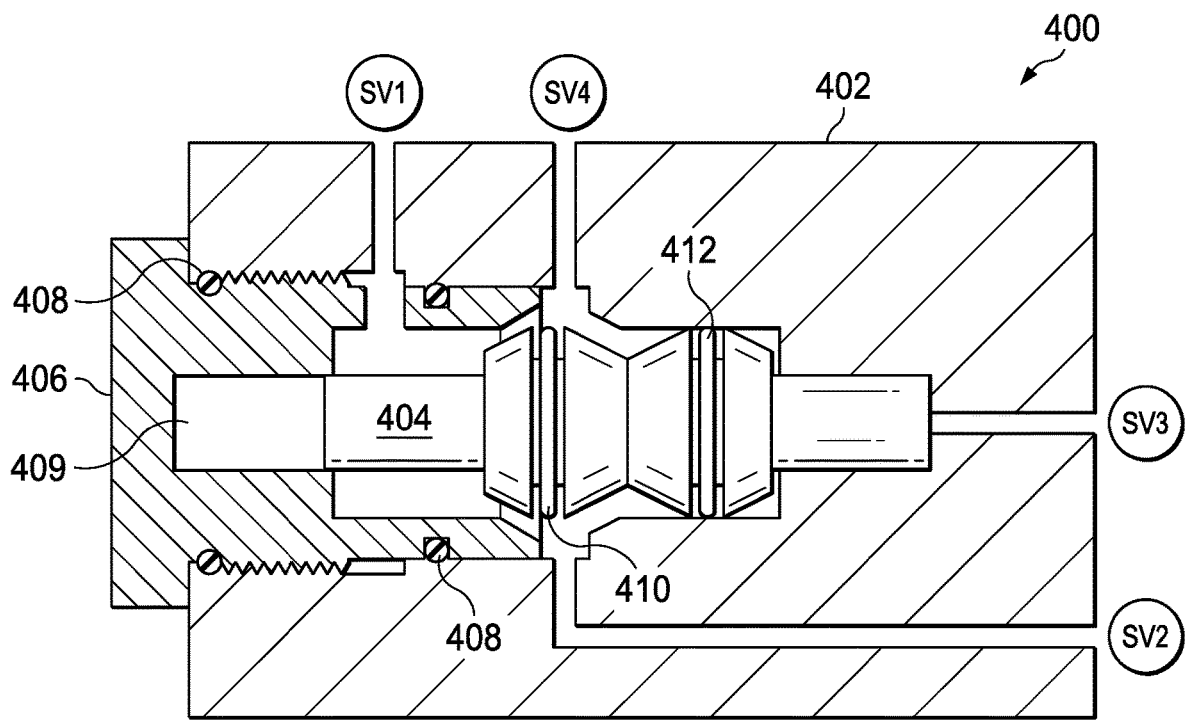
FIG. 14 is an embodiment of a shuttle valve having a shuttle in a first shuttle position.

A shuttle valve for use in a pilot valve system is described in more detail in connection with the embodiment of FIG. 14. Any suitable shuttle valve may be used. In the embodiment of FIG. 14, the shuttle valve 400 comprises a shuttle valve body 402 having a shuttle channel 409 formed therein. A shuttle 404 is translatably disposed in the shuttle channel 409. A shuttle cap 406 may retain the shuttle 404 in the shuttle channel 409. The shuttle 406 cap may be threadably coupled to the shuttle body 402, and sealed to the shuttle body 402 by one or more seals 408. The shuttle 404 includes a plurality of shuttle seals 410, including a first annular seal 410 and a second annular seal 412 disposed so as to form a sealing interface between the shuttle 404 and the shuttle channel 409, depending on shuttle 404 position in the shuttle channel 409. The annular seals 410, 412 may be o-rings or lip seals or any suitable seal.

Figure 15:
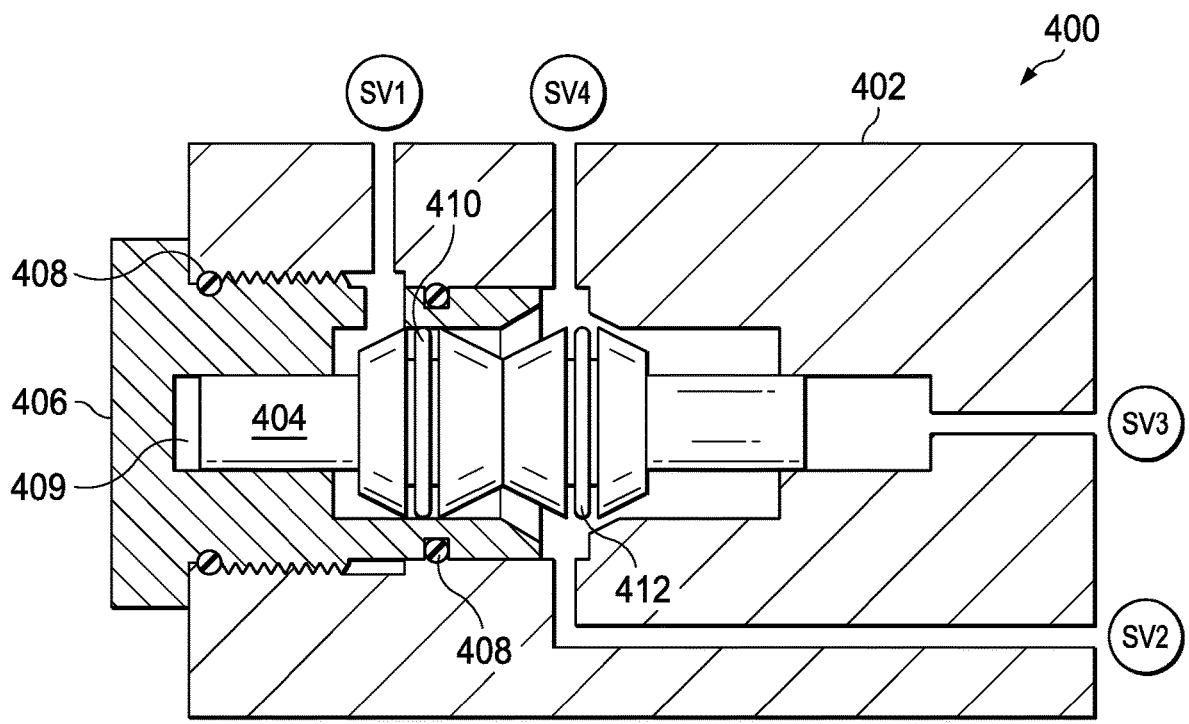
FIG. 15 is an embodiment of a shuttle valve having a shuttle in a second shuttle position.

The shuttle 404 may translate between a first shuttle position (as seen in FIG. 14) and a second shuttle position (as seen in FIG. 15). The shuttle valve body 402 may have four ports SV1, SV2, SV3 and SV4 formed therein. The ports SV1, SV2, SV3 and SV4 provide for fluid communication with the shuttle channel 409. When the shuttle 404 is in the first position, the second annular seal 412 seals the shuttle 404 to the shuttle channel 409, and the first annular seal 410 does not seal the shuttle to the shuttle channel 409. When the shuttle 404 is in the first position, fluid may flow between ports SV1 and SV2 and SV4. Thus, fluid introduced into the shuttle channel 409 through port SV1 will flow through the shuttle channel 409 to ports SV2 and SV4.

With reference to FIG. 15, when the shuttle 404 is in the second position, the first annular seal 410 seals the shuttle 404 to the shuttle channel 409, and the second annular seal 412 does not seal the shuttle 404 to the shuttle channel 409. The shuttle 404 may be moved from the first position to the second position if fluid is introduced at port SV3, thus forcing the shuttle 404 to translate to the second position. When the shuttle 404 is in the second position, fluid may flow between ports SV4 and SV2, as well as port SV3, depending on how tight the shuttle 404 fits in the shuttle channel 409. Port SV1 is sealed off.

The shuttle valve 400 may comprise a discrete valve assembly, or may be formed in a body common with a latching valve.

Latching Valve

Figure 16:
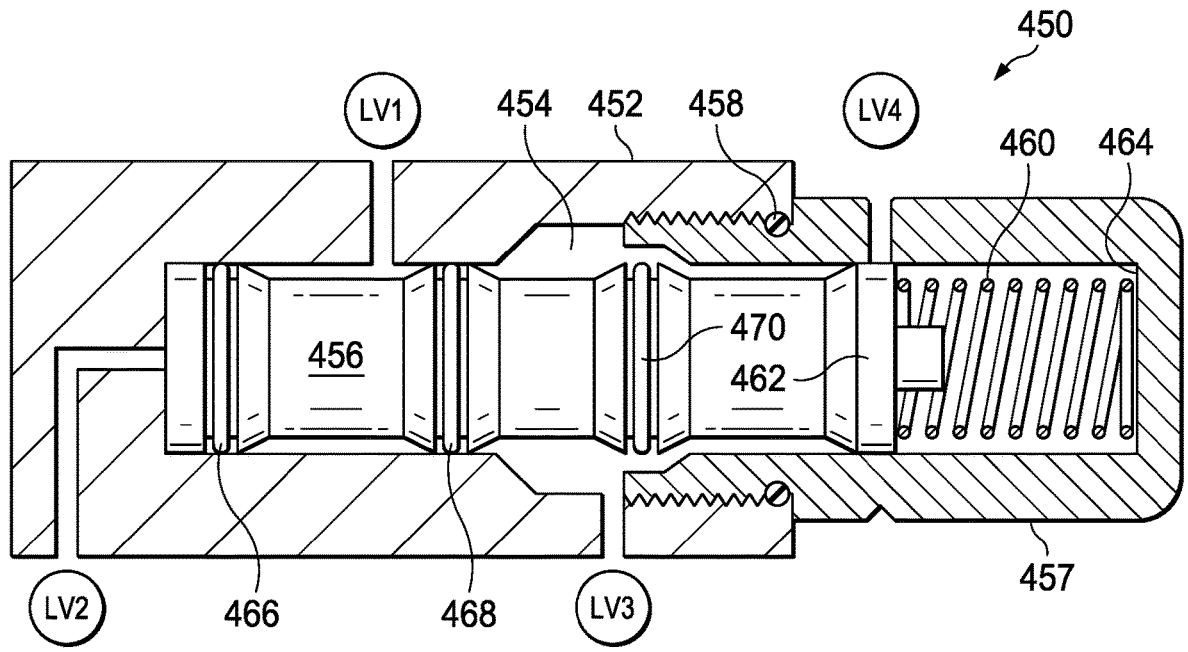
FIG. 16 is an embodiment of a latching valve having a shuttle in a first latch position.

A latching valve for use in a pilot valve system is described in more detail in connection with the embodiment of FIG. 16. Any suitable latching valve may be used. In the embodiment of FIG. 16, a latching valve 450 may comprise a latch body 452 having a latch shuttle channel 454 formed therein. A latch shuttle 456 is translatably disposed in the latch shuttle channel 454. A latching valve cap 457 may retain the latch shuttle 456 in the latch shuttle channel 454 and may form part of the latch channel 454. The latching valve cap 457 may be threadably coupled to the latch body 452, and may be sealed to the latch body by a seal 458. A spring 460 is disposed inside the latching valve cap 457 and disposed between an end 462 of the latch shuttle 456 and a wall 464 of the latching valve cap 457. The spring 460 biases the latch shuttle 456 to a first latch position as seen in FIG. 16.

The latch shuttle 456 comprises a first annular latch seal 466, a second annular latch seal 468 and a third annular latch seal 470, each configured to form a sealing interface between the latch shuttle 456 and the latch shuttle channel 454.

The latching valve 450 may have five ports LV1, LV2, LV3 and LV4 formed therein. Port LV4 provides fluid communication between the interior of the latching valve cap 457 and atmosphere. Port LV4 may be sealed by a gland, such as an o-ring disposed so as to prevent contaminants from entering port LV4 from the outside environment, but release pressure buildup from the latching valve cap 457.

Figure 17:
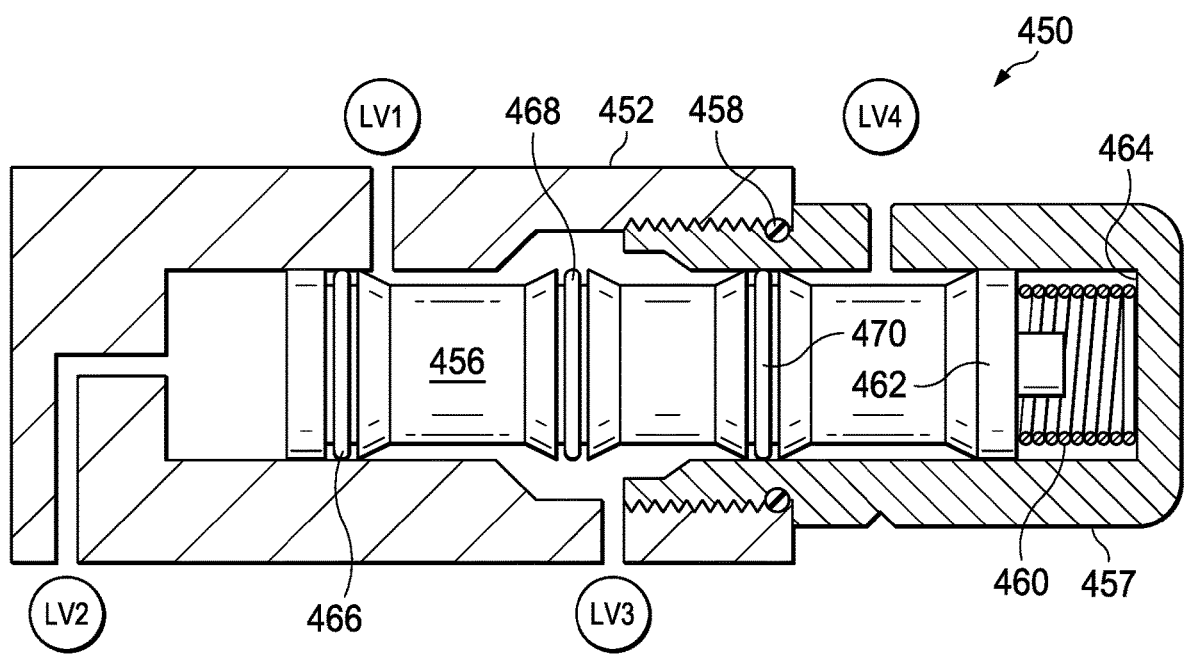
FIG. 17 is an embodiment of a latching valve having a shuttle in a second latch position.

The latch shuttle 456 may translate in the latch channel 454 between a first latch position (as seen in FIG. 16) and a second latch position (as seen in FIG. 17). In the first latch position, the first annular seal 466 and the second annular seal 468 seal the latch shuttle 456 to the latch channel 454, and thus seal ports LV1 and LV2 from each other and from ports LV3 and LV4. The first annular seal 466 seals port LV1 from port LV2. The second annular seal 468 seals port LV1 from port LV3. The third annular seal 470 does not form a sealing interface between the latch shuttle 456 and the latch channel 454. In the first latch position, fluid may flow through the latching shuttle 456 between ports LV3 and LV4 via the latch channel 454.

In the second latch position, the first annular seal 466 and the third annular seal 470 seal the latch shuttle 456 to the latch channel 454. The latch shuttle 456 may translate in the latch channel 454 from the first latch position to the second latch position when fluid pressure is applied at port LV2. If the fluid pressure at port LV2 is sufficient to overcome the biasing force of spring 460 and compress the spring 460, then the latch shuttle 456 will move from the first latch position to the second latch position. In the second latch position, port LV2 remains sealed from port LV1 by the first annular latch seal 466, and ports LV3 and LV4 are sealed from each other by the third annular latch seal 470. Second annular latch seal 468 does not form a sealing interface between the latch shuttle 456 and the latch channel 454, thus allowing fluid to flow through the latching valve 450 between ports LV1 and LV3 via the latch channel.

The latching valve 450 may comprise a discrete valve assembly, or may be formed in a body common with a shuttle valve.

Figure 18:
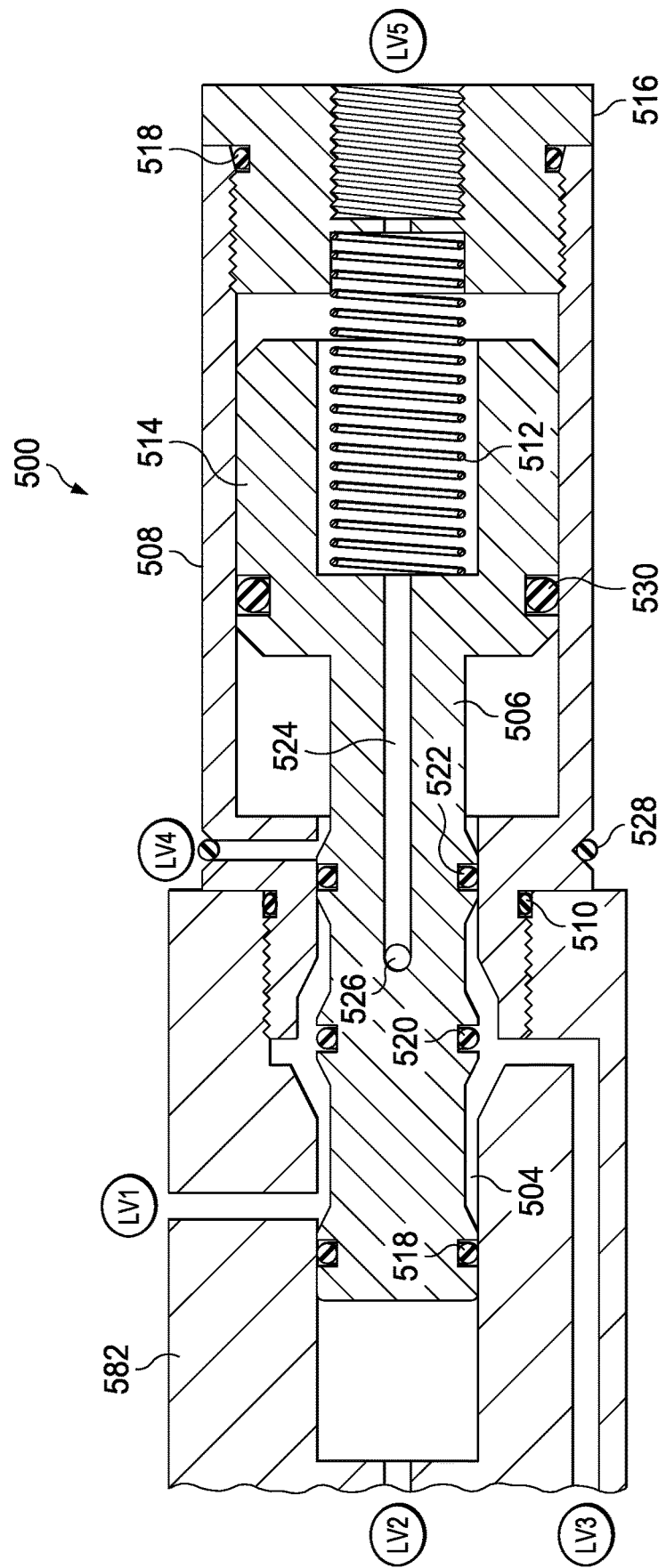
FIG. 18 is another embodiment of a latching valve having a shuttle in a second latching position.

In other embodiments, the latching valve may be configured with an optional or alternative override port LV5. As may be seen in the embodiment of FIG. 18, a latching valve 500 may comprise a latch body 502 having a latch shuttle channel 504 formed therein. A latch shuttle 506 is translatably disposed in the latch shuttle channel 504. A latching valve cap 508 may retain the latch shuttle 506 in the latch shuttle channel 504 and may form part of the latch shuttle channel 504. The latching valve cap 508 may be threadably coupled to the latch body 502, and may be sealed to the latch body 502 by a seal 510. A spring 512 is disposed inside the latching valve cap 508 and disposed between an end 514 of the latch shuttle 506 and a valve cap plug 516. The valve cap plug 516 may be threadably coupled to the latch valve cap 508, and may be sealed to the latch valve cap 508 by an annular cap seal 519. The port LV5 may be formed in the valve plug 516, which may be configured to couple to a fluid supply line. The spring 512 biases the latch shuttle 506 to a first latch position as seen in FIG. 18.

The latch shuttle 506 comprises a plurality of latch seals, including first annular latch seal 518, a second annular latch seal 520 and a third annular latch seal 522, each configured to form a sealing interface between the latch shuttle 506 and the latch channel 504. The latch shuttle 506 further includes a latch bore 524 extending through the latch shuttle 506 from the end 514 of the latch shuttle 506 to a one-way check valve 526 located in the latch shuttle 506 between the second annular seal 520 and the third annular seal 522. The normally-closed one-way check valve 526 is disposed in the latch bore 524 so as to prevent fluid from flowing from the latch channel 504 into the latch bore 524, but permit fluid to flow from the latch bore 524 into the latch channel 504. In some embodiments, the one-way check valve 526 may be configured to open at a pre-determined cracking pressure.

One end 514 of the latch shuttle 506 may be configured as a piston to slide within the latch valve cap 514. An annular latch seal 530 is disposed between the end 514 and the latch valve cap 508 so as to form a sealing interface therebetween.

The latching valve 500 may have four ports LV1, LV2, LV3 and LV4 formed therein. Port LV4 provides fluid communication between the interior of the latching valve cap 508 and atmosphere. Port LV4 may be sealed by a gland 528, such as an o-ring, disposed so as to prevent contaminants from entering port LV4 from the outside environment, but release pressure buildup from the latching valve cap 508.

The latch shuttle 506 may translate in the latch channel 504 between a first latch position (as in FIG. 16) and a second latch position (as seen in FIG. 18). In the first latch position, the first annular seal 518 and the second annular seal 520 seal the latch shuttle 506 to the latch channel, and thus seal ports LV1 and LV2 from each other and from ports LV3 and LV4. The first annular seal 518 seals port LV1 from port LV2. The second annular seal 520 seals port LV1 from port LV3. The third annular seal 522 does not form a sealing interface between the latch shuttle 506 and the latch channel 504. In the first latch position, fluid may flow through the latching shuttle between ports LV3 and LV4 via the latch channel. The check valve 526 will prevent fluid from flowing into the latch bore 524 from port LV3 or port LV4.

Figure 19:
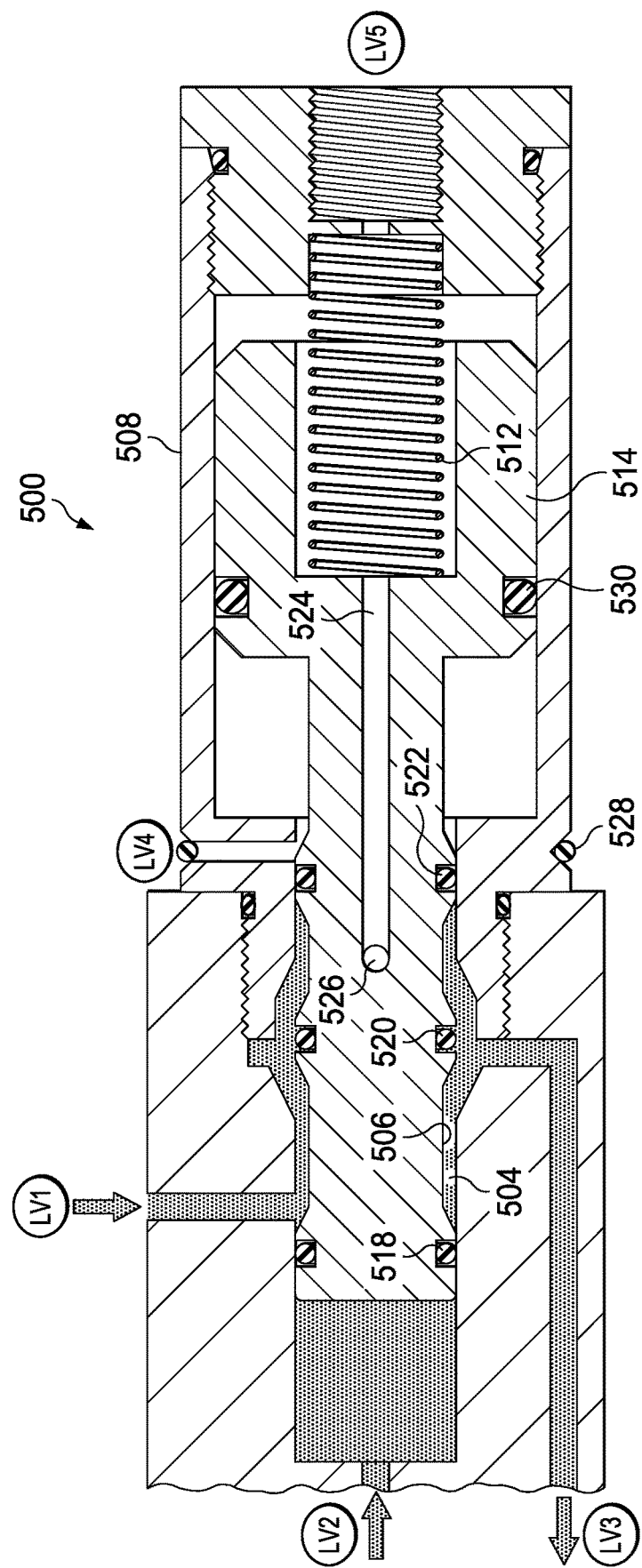
FIG. 19 shows fluid flow through the embodiment of FIG. 18.

In the second latch position, the first annular seal 518 and the third annular seal 522 seal the latch shuttle 506 to the latch channel 504. The latch shuttle 506 may translate in the latch channel 504 from the first latch position to the second latch position when fluid pressure is applied at port LV2. If the fluid pressure at port LV2 is sufficient to overcome the biasing force of spring 512 and compress the spring 512, then the latch shuttle 506 will move from the first latch position to the second latch position. In the second latch position, port LV2 remains sealed from port LV1 by the first annular latch seal 518, and ports LV3 and LV4 are sealed from each other by the third annular seal 522. Second annular latch seal 520 does not form a sealing interface between the latch shuttle 506 and the latch channel 504, thus allowing fluid to flow through the latching valve 500 between ports LV1 and LV3 via the latch channel 504, as shown in FIG. 19.

Figure 20:
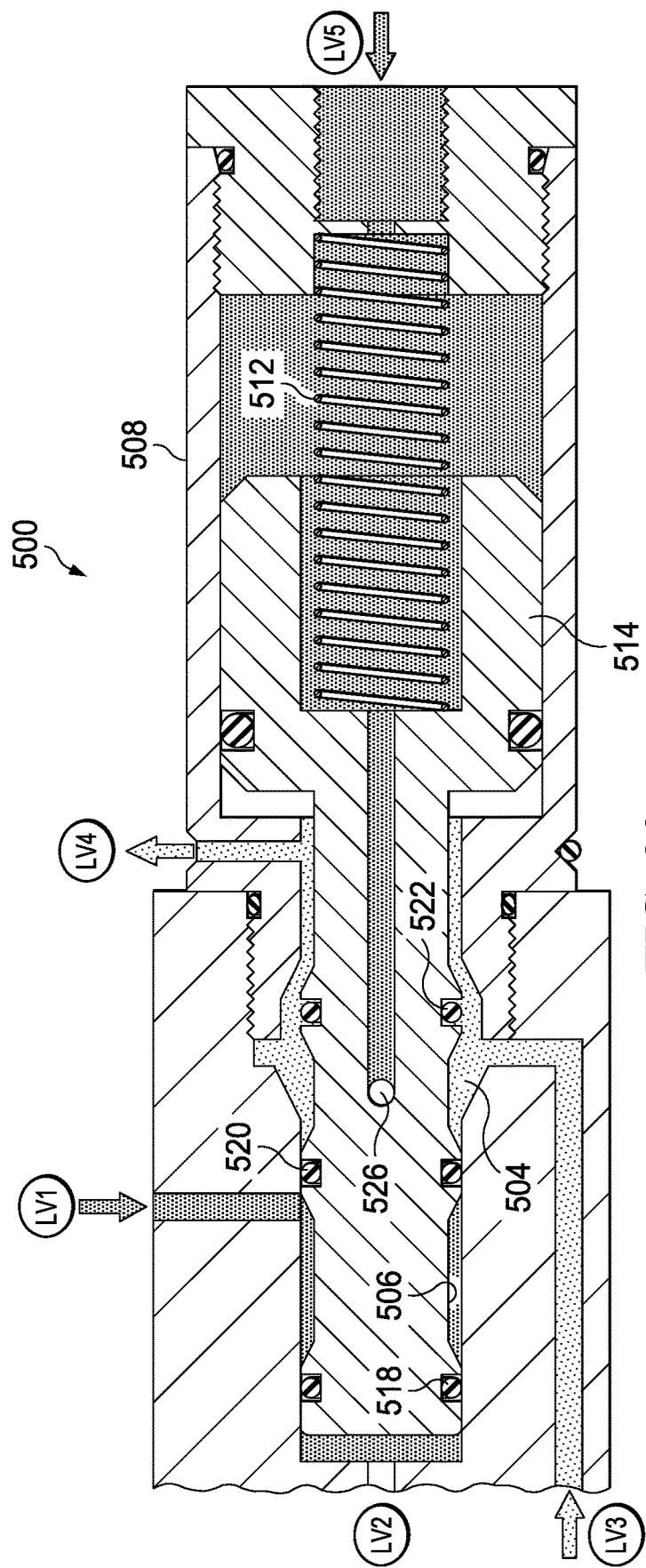
FIG. 20 shows the embodiment of FIG. 18 having the shuttle in a first latching position.

As shown in FIG. 20, when the latch shuttle 500 is in the second latch position, the override port LV5 may receive fluid pressure. The latch shuttle end 514 may be configured so as to receive fluid pressure through port LV5 and translate the latch shuttle 506 back to the first latch position. In some embodiments, if the fluid introduced at port LV5 is at the same pressure as the fluid introduced at port LV2, then the fluid pressure at end 514 of the latch shuttle 506 plus the biasing force of the spring 512 should be sufficient to overcome the fluid pressure at port LV2 and translate the latch shuttle 506 back to the first latch position. In such an embodiment, fluid for override port LV5 may be provided from the vehicle parking brake system. In other embodiments, a separate override fluid supply may be provided. The end 514 of the latch shuttle 506 may be configured such that fluid at port LV5 provided a pressure lower than the fluid provided at port LV2 may be sufficient to translate the latch shuttle 506 from the second latch position to the first latch position. In yet other embodiments, fluid provided at port LV5 may be at a pressure higher than the fluid provided at port LV2 and may be sufficient to translate the latch shuttle 506 from the second latch position to the first latch position.

When the latch shuttle 506 translates back to the first latch position, the first latch seal 518 and the second latch seal 520 seal the latch shuttle 506 to the latch channel 504 as described above. Fluid may flow between ports LV3 and LV4 as described above. Fluid may flow from port LV3 to exhaust port LV4, thus removing a pilot signal from the lift actuator as described above to cause the lift axle to rise.

Figure 21:
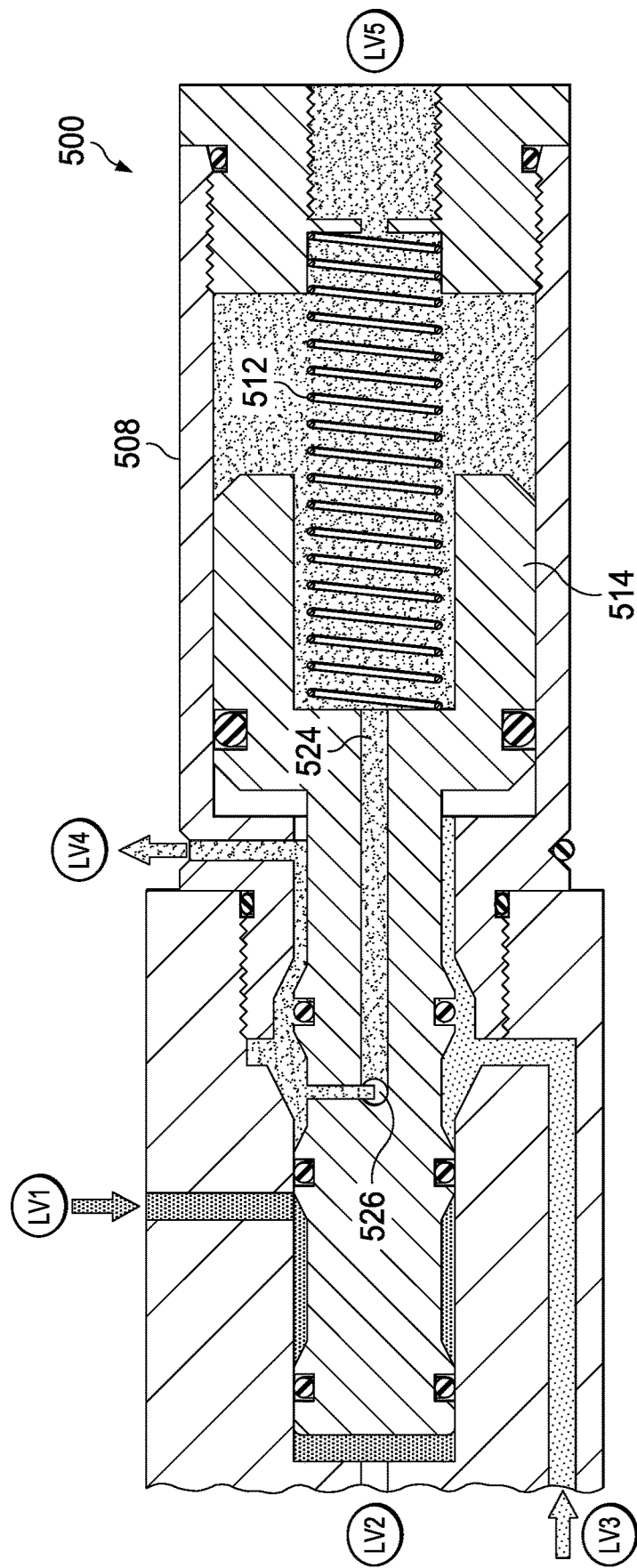
FIG. 21 shows fluid flow through the embodiment of FIG. 20.

As seen in FIG. 21, the fluid pressure at port LV5 may also be sufficient to crack open the check valve 525, and thus allow pressurized fluid to flow from the latch bore 524 to the latch channel 504, and from the latch channel 504 to exhaust port LV4. The gland 528 (FIG. 19) may lift away from the exhaust port LV4 and permit pressurized fluid to escape to atmosphere.

Figure 22:
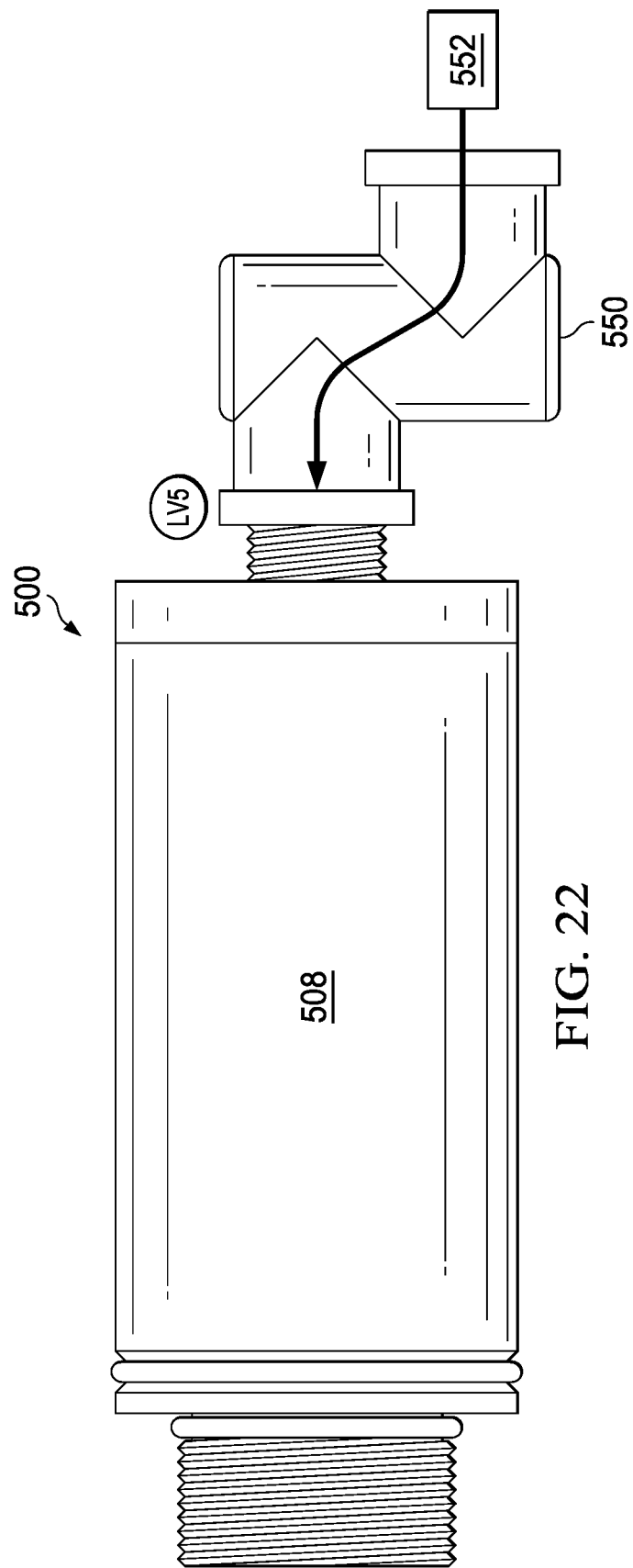
FIG. 22 illustrates an embodiment of a pressure-actuated valve coupled to the latching valve of FIG. 18.
Figure 23:
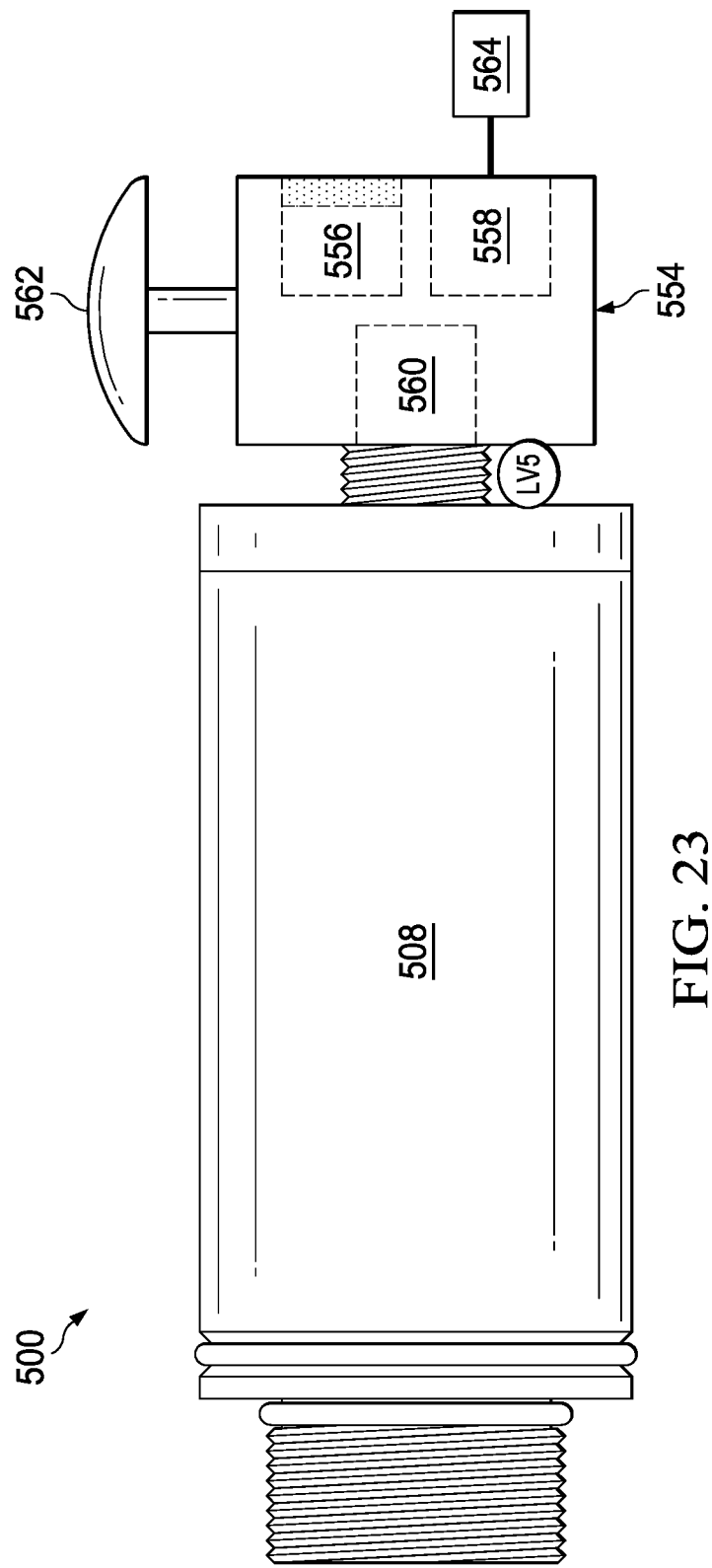
FIG. 23 illustrates an embodiment of a manual plunger valve coupled to the latching valve of FIG. 18.
Figure 24:
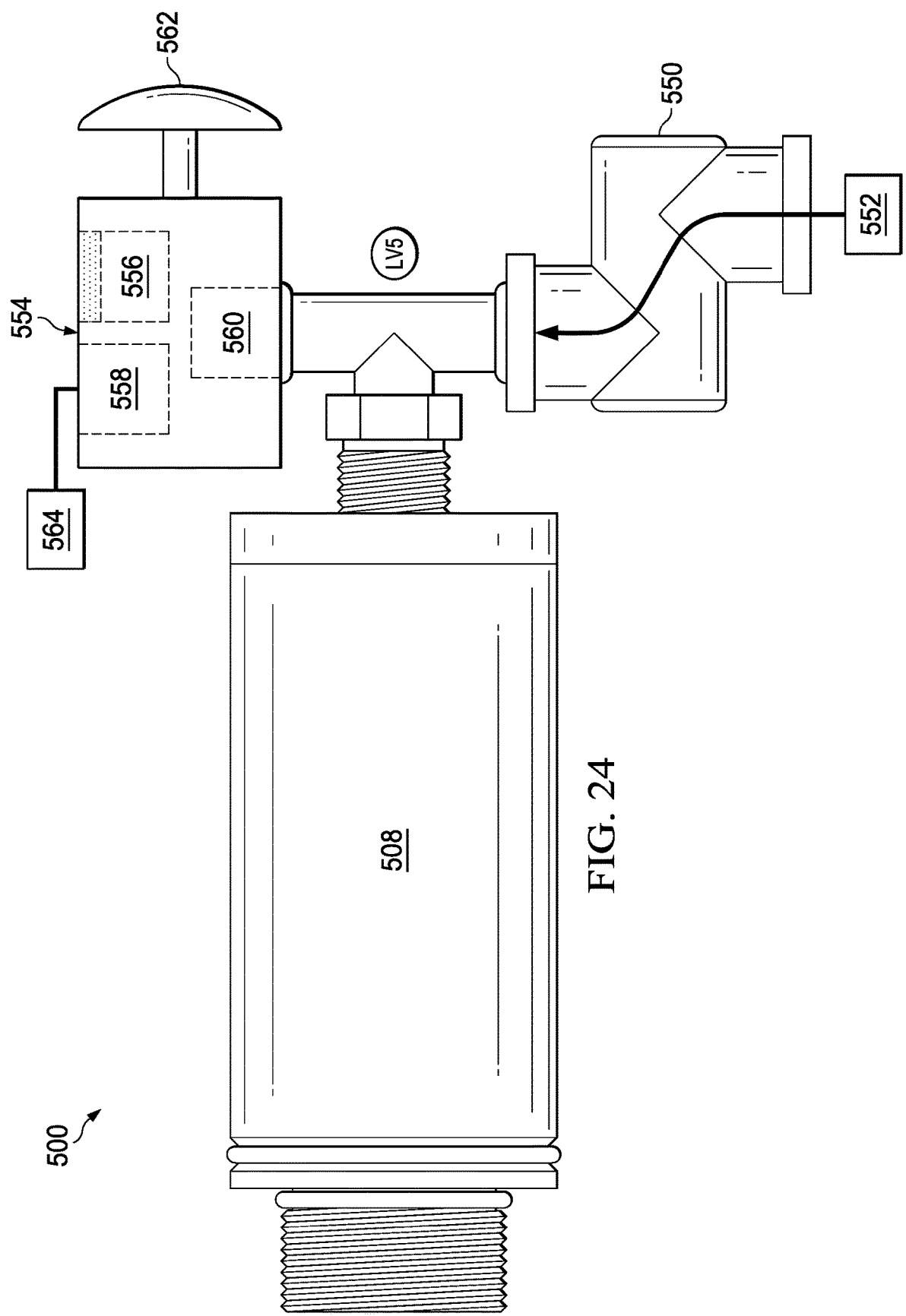
FIG. 24 illustrates an embodiment of a manual plunger valve and a pressure-actuated valve coupled to the latching valve of FIG. 18.

The override port LV5 may be coupled to an air suspension system. An increased vehicle load will increase pressure in an air suspension system, such as may be felt at ride air springs. If the vehicle load increases pressure in an air suspension system, such increased air pressure may be provided at override port LV5. As may be seen in FIG. 22, a pressure valve actuator 550 may be coupled to the latching valve 500 at override port LV5. The pressure valve actuator is configured to permit fluid to flow from the air suspension system 552 to the port LV5 when the pressure in the suspension system reaches a point at which the lift axle should be deployed. An override port LV5 may provide a way to force a lift axle to deploy if the command valve system fails. An override port LV5 may be used in addition to, or in place of an override valve of a command valve system.

In yet other embodiments, a normally-closed manually-operable override valve 554 may be provided at port LV5. A manually-operable valve override may have a vent port 556, a pressure line port 558 and a flow port 560. The flow port 560 may be coupled to port LV5 of the latching valve. Pressure line port 558 may be coupled to an air pressure source 564, such as a brake air pressure source or other source of constant fluid pressure. When the manual plunger 562 is in a first plunger position, the flow port 560 is fluidly connected to the vent port 556 so as to vent pressure from port LV5. When the manual plunger is moved to a second plunger position, the flow port 560 is fluidly connected to the pressure line port 558 so as to permit flow from a pressure source 564 to the port LV5 and thus translate the latch shuttle from a second latch position to a first latch position. In some embodiments, the manual plunger may be biased to the first plunger position by a spring (not shown). When the manual plunger is released, the manual plunger returns to the first plunger position.

In some embodiments, both a pressure valve actuator 550 and a manual override valve 554 may be coupled to port LV5 of the latching valve 500.

The lift axle deployment system may also have one or more visual communication devices disposed upon the housing so as to provide readily accessible information as to the status of the system. Indictor lamps, such as provided in an indicator light panel, may be one form of communication device utilized for this purpose. For example, a lamp may flash at the completion of any internal start up checks the system completes. A lamp may also maintain a constant illumination when the axle is in the raised position. Alternately, a constant illumination may be used to communicate that the axle is on the lowered position. A lamp may be utilized to communicate the weight of a load by identifying whether the load falls into the Level One, Level Two, or Level Three category. An indicator lamp may also illuminate to communicate a warning when the deployment status of the axle is imminent so as to prevent injury or damage to the system. The lamp may flash or otherwise illuminate for a period of time prior to the initiation of a change in deployment status and any load change may be required to remain constant during this period or otherwise said transition may not occur so as to prevent damage to the vehicle, axle, transition system, or other related components and systems. A lamp may also flash or otherwise illuminate in preset or user defined codes to communicate a variety of information concerning the system.

The lift axle deployment system may have power supplied through a constant power circuit, such as the blue wire circuit on trailer. The blue wire may supply power for communication components that are included in the deployment system. In addition to visual communication devices, the system may also include communication modules such as wireless communication devices and other components that may be desired to enable configurable variables for the axle deployment system. The deployment system may also have electronic components for the control of solenoids and the monitoring of signals from sensors.

Enhanced Inflation System

Figure 25:
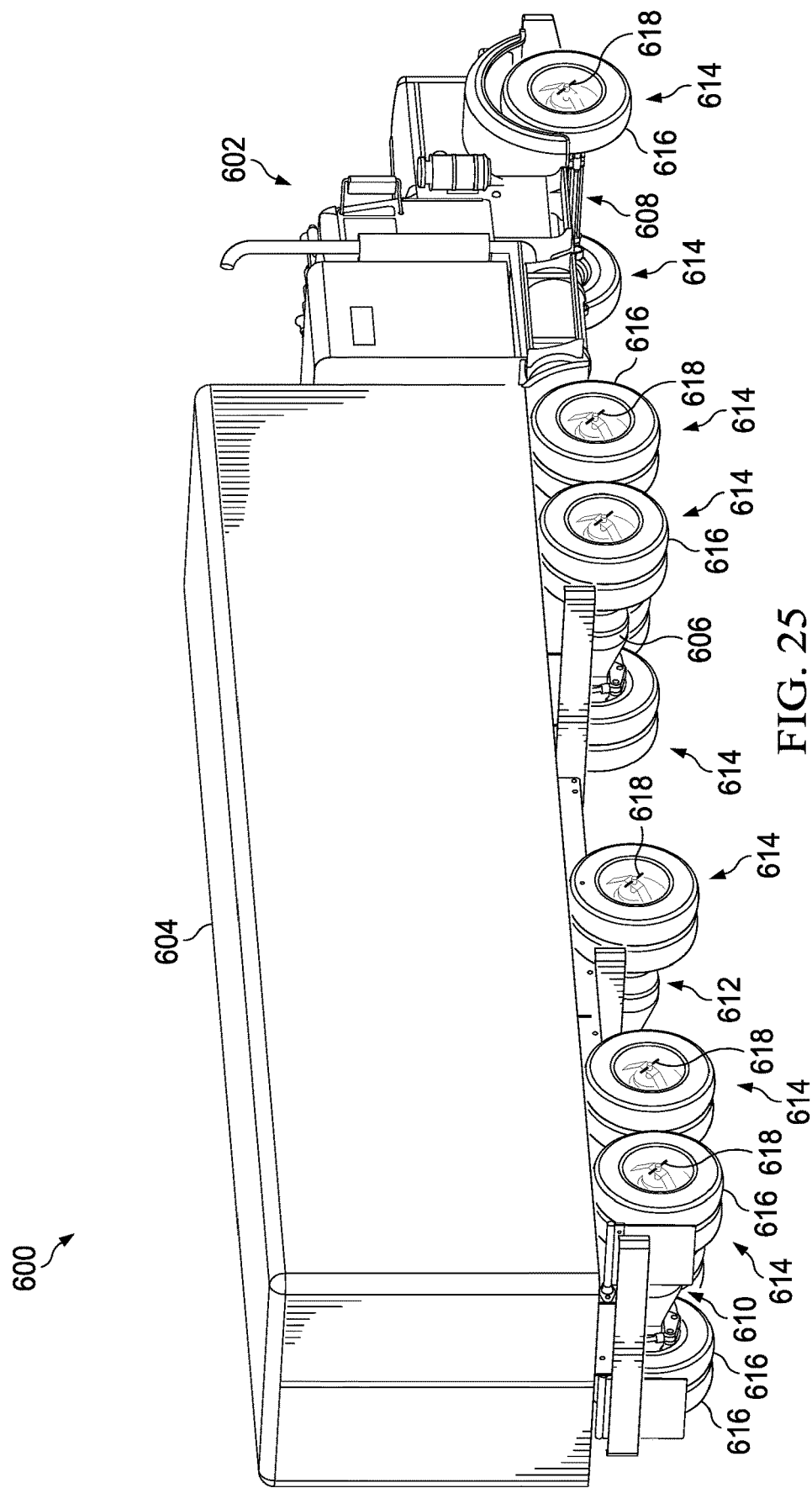
FIG. 25 illustrates an embodiment of a heavy vehicle having a lift axle and a tire inflation system.

As may be seen in FIG. 25, a vehicle 600 may comprise a truck 602 and a trailer 604. The truck 602 may include one or more drive axles 606 as part of the vehicle's powertrain. The truck 602 may further include a steer axle 608 having pivotable spindles that may provide steering capability for the vehicle 600. The trailer 604 may include one or more fixed axles 610. In the embodiment of FIG. 25, the trailer 604 further includes a lift axle 612. In other embodiments, the truck 602 may include a lift axle (not shown). Each axle may have one or more wheel assemblies 614 mounted thereto. One or more pneumatic tires 616 may be mounted to each wheel assembly 614.

The vehicle 600 may be provided with an automatic tire inflation system that may use pressurized air from the vehicle's air brake system or some other source of pressurized air to maintain the tires at a desired air pressure. The automatic tire inflation system may be used to control air pressure in one or more of the tires mounted to the steer axle 608, drive axle 606 and/or trailer axles. The automatic tire inflation system may include one or more air hoses 618 in fluid communication with each tire valve for communicating air from the air pressure source to and from one or more of the tires. Pressurized fluid may be provided externally from the wheel assemblies 614 and/or may be provided through the vehicle 600 axles to the wheel assemblies 614. A rotary air connection or rotary union provides for fluid communication from the vehicle 600 pressure source to the air hoses 618.

Figure 26:
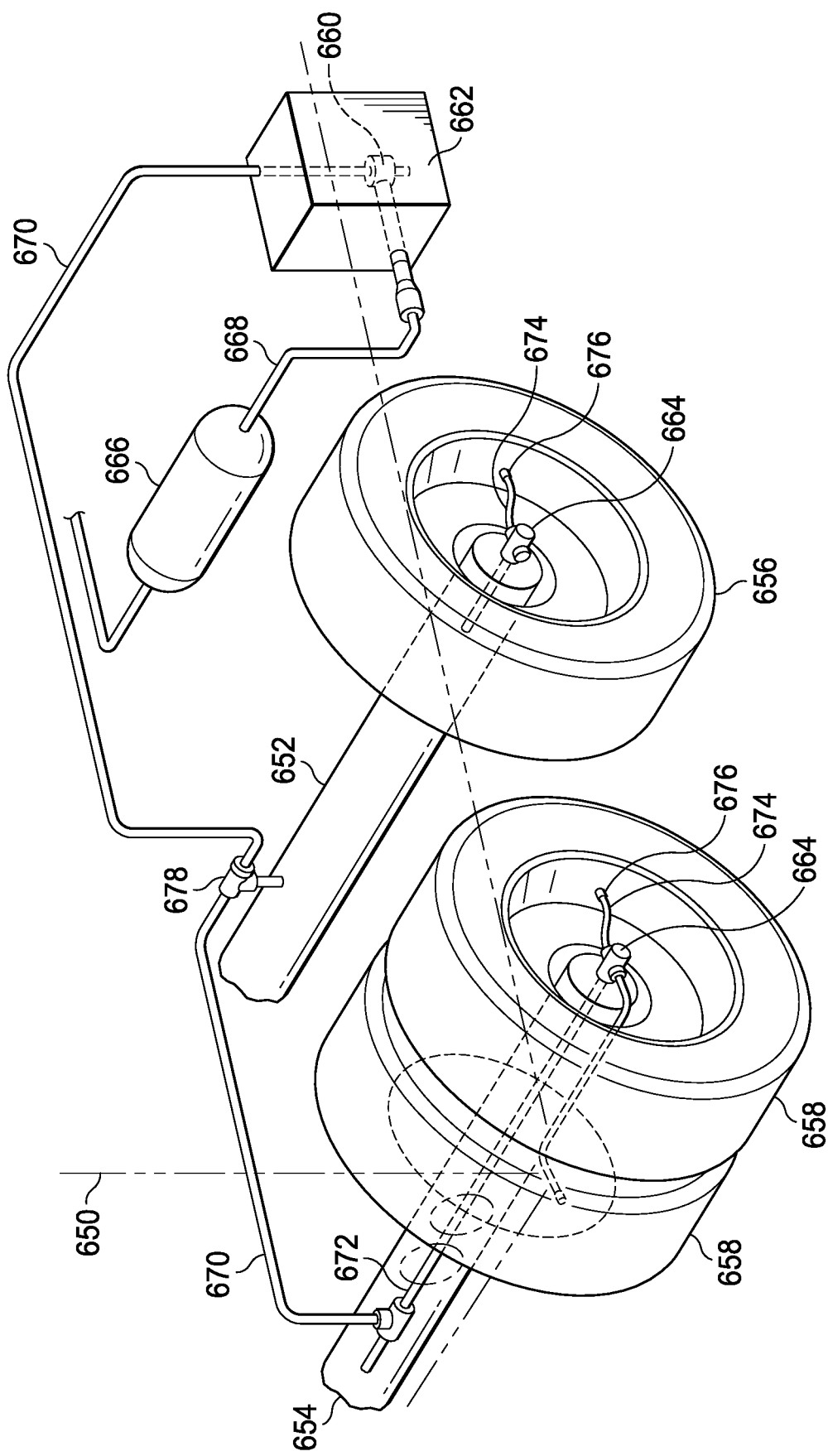
FIG. 26 illustrates an embodiment of a tire inflation system.

FIG. 26 illustrates in more detail one embodiment of an automatic tire inflation system that may be used in connection with both down and lift axles. A trailer 650 may include two axles 652, 654. In the disclosed embodiment, the front-most axle 652 is a lift axle and the axle 654 is a down axle. Some trailers 650 may have dual tires 658 or a single super-wide tire (not shown) mounted at each end of axles 652, 654. As seen in the embodiment of FIG. 26, lift axle 652 has a single tire 656 and down axle 654 has dual tires 658 mounted thereto.

The automatic tire inflation system may generally include a pressure regulator 660, which may be mounted in a control box 662, and one or more rotary air connections or rotary unions 664, 664 mounted in or near the axle ends as described in more detail below. The pressure regulator 660 may receive pressurized air from an air pressure source 666 through a conduit 668. The air pressure source 666 may comprise, for example, a vehicle 600 air brake system air supply or a step-up or booster pump. The pressure regulator 660 may control, increase, or reduce the air pressure from the air pressure source 666 to an air pressure level suitable for inflating the tires, such as, for example, 110 psi. If the tire inflation system routes pressurized air through the axles, then pressurized air may flow from the pressure regulator 660 through conduit 670 to the axles 652, 654. From there, the air may flow through a line 672 (for non-pressurized axle applications, as for axle 654), or through a sealed axle (as for sealed and pressurized hollow axle applications, as for axle 652) to rotary connections 664. Pressurized air may the flow from the rotary connections 664 to hoses 674 to tire valves 676 connected to the tires, as the case may be.

In some embodiments, the air conduits 668, 670 may comprise flexible tubing so as to prevent damage to the conduit when the lift axle 652 is raised or lowered. In some embodiments, the air conduits 668, 670 may comprise rigid tubing. In such an embodiment, a pivoting or rotating coupling 678 may be provided to permit lift axle 652 motion without damage to the conduit when the lift axle 652 is raised or lowered.

The axles may be wholly or partially solid or hollow, and may be configured in a variety of ways. For illustration purposes only, axles are hollow. For example, in some embodiments, an axle may comprise a solid beam having a spindle attached to each end (not shown). The axle spindles may be configured to allow mounting of wheel bearings upon which a hub may be rotatably mounted (not shown). In other embodiments, an axle may comprise a hollow tube having a spindle attached to each end. The spindles may be hollow, resulting in a hollow axle that is open at each end. Alternatively, the spindles may be wholly or partially solid, resulting in a hollow axle that is closed at each end (as with axle). In some embodiments, the axle tube may be sealed to provide a conduit for pressurized air, as with axle. In other embodiments, a conduit may be disposed in a hollow axle and connected the rotary union at the wheel end, as with axle.

Enhanced Inflation System

Figure 27:
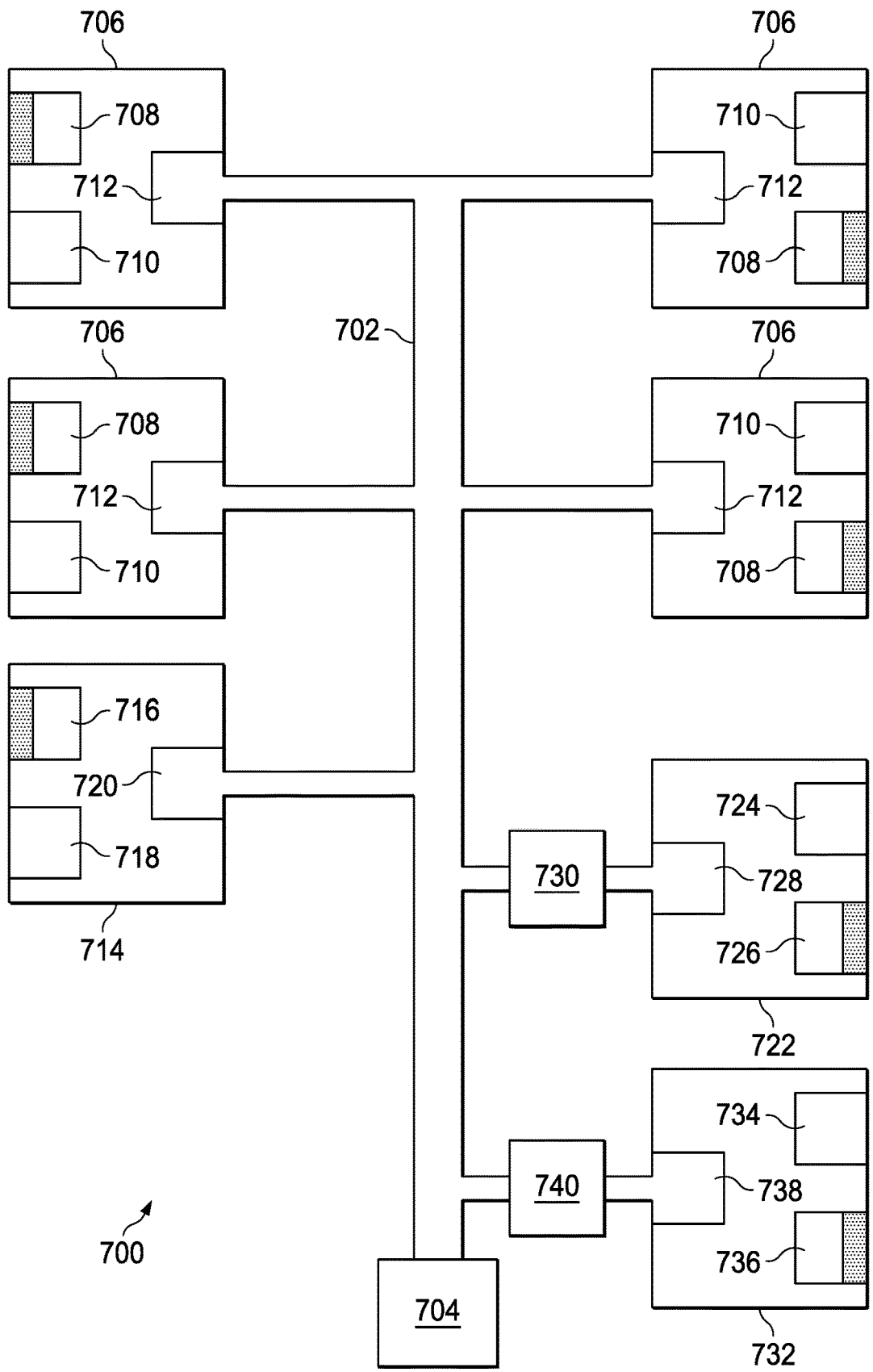
FIG. 27 illustrates an embodiment of an enhanced tire inflation system.

As seen in the embodiment of FIG. 27, an enhanced inflation system 700 may comprise a main pressurized fluid trunk line 702 to supply pressurized fluid for both tire inflation and lift axle deployment. One or more inflation pressure sensors 704 may be in fluid communication with the trunk line so as to provide air pressure data for the control of tire inflation operations. The trunk line may also be in fluid communication with one or more tire inflation valves 706 having an open state in which fluid may flow from the trunk line through port 712 to a tire through port 710, and having a closed state in which the inflation valve 706 is closed 708. Each valve may be associated with a one or more tires at the end of a vehicle axle. These axles may be fixed axles or lift axles according to the configuration of the vehicle.

The trunk line may also be in fluid communication with one or more control valves, such as vent valve 714 and a supply valve 722. The vent valve 714 may allow for the depressurization of the entire tire inflation system or an individual component of such system, such as a tire or lift axle. The vent valve 714 includes an open state in which fluid may flow from the trunk line through port 720 to atmosphere or exhaust vent through port 718, and having a closed state in which the vent valve 714 is closed 716.

The supply valve 722 may control pressurization of the trunk line from a source such as a compressor or fluid reservoir. The supply valve 722 includes an open state in which fluid may flow to the trunk line through port 728 from a fluid supply through port 724, and having a closed state in which the supply valve 722 is closed 726. The trunk line may also have a supply sensor 730 in fluid communication with the fluid supply to monitor the fluid supply pressure. Some embodiments may utilize a single pressure sensor at the trunk line so as to monitor all inflation-related supply and delivery lines, thus providing a simpler and more cost effective configuration than inflation systems that require supply and delivery sensors at each axle. In further embodiments, a single pressure sensor disposed at a trunk line may monitor all inflation and lift axle system pressures and provide corresponding pressure data.

The trunk line 702 may also be in fluid communication with a lift axle deployment valve 732 for the control system for a lift axle. The lift axle control system may have a fluid feed from the air brake system and from a constant pressure source which in this embodiment may be pressurized fluid from the main trunk line 702. The deployment valve 732 includes an open state in which fluid may flow from the trunk line through port 738 to a lift axle control system through port 734, and having a closed state in which the supply valve 732 is closed 736. Additionally, a lift axle sensor 740 in fluid communication with the lift axle system so as to provide data regarding the inflation state of the lift axle spring.

Figure 28:
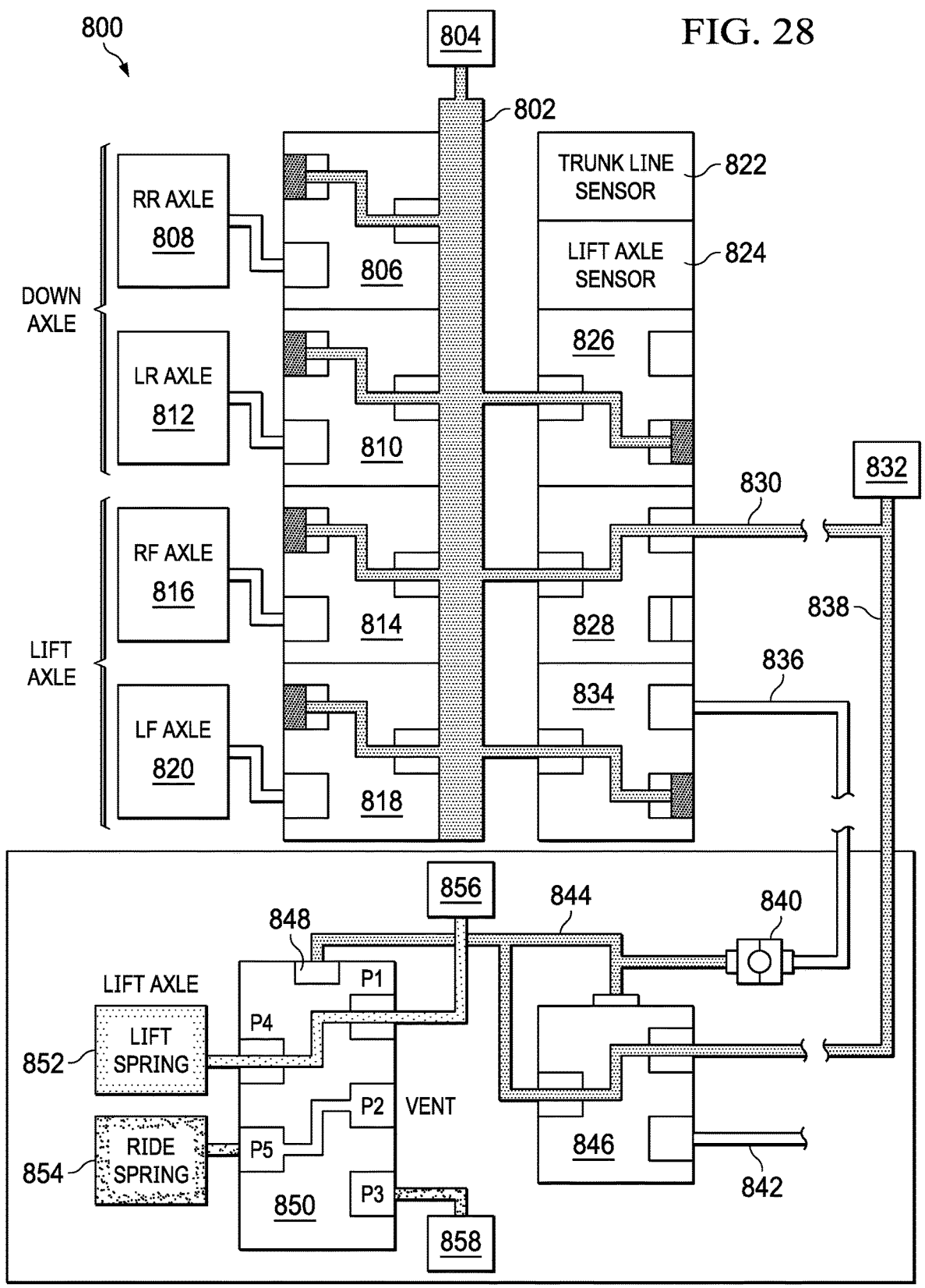
FIG. 28 illustrates an embodiment of an enhanced tire inflation system coupled to a lift axle deployment system.

FIG. 28 illustrates an enhanced inflation system 800 coupled to a pneumatic lift axle deployment system, such as the lift axle deployment system disclosed herein. The lift axle comprises a lift spring 852 and a ride spring 854 that may be selectively coupled to a lift spring fluid supply 856 and ride spring fluid supply 858, respectively. The lift spring 852 and ride spring 854 may also be selectively coupled to an exhaust vent port P2. In some embodiments, the lift spring fluid supply 856 and ride spring fluid supply 858 may be separate, or may be provided from a common pressure source, such as the trunk line supplying tire inflation fluid to the down axles.

In the embodiment of FIG. 28, the trunk line may supply pressurized fluid to a tire inflation system 802 and to the lift axle control system, which may operate as described further below. One or more inflation valves 806, 810, 814 and 818 may control fluid communication between the trunk line 802 and the tires 808, 812, 816 and 820, respectively. For example, inflation valves 806 and 810 may control inflation fluid between the trunk line and the tires 808 and 810, respectively, of a down axle. Inflation valves 814 and 818 may control inflation fluid between the trunk line and the tires 816 and 820, respectively, of a lift axle. One or more inflation pressure sensors 804 may be disposed in fluid communication with each inflation valve, and may sense inflation pressure or lack of pressure, and may send one or more inflation pressure signals to an electronic control unit. In some embodiments, each inflation valve may have an inflation pressure sensor coupled thereto or made part thereof so as to permit tire pressure data to be captured for each vehicle tire.

A vent valve 826 may be coupled to the trunk line to depressurize the trunk line by exhausting fluid pressure to atmosphere. The inflation valves may be closed to isolate the tires, and the trunk line may be depressurized. In some embodiments, one or more of the inflation valves may be open while the trunk line is depressurizing so as to release excess tire pressure, and the close when the desired tire pressure is achieved.

One or more trunk line pressure sensors 822 may be disposed in fluid communication with the trunk line, and may sense trunk line pressure or lack of pressure, and may send one or more trunk line pressure signals to an electronic control unit.

A lift axle deployment valve 834 may control fluid communication between the trunk line and a pneumatic lift axle control system. If the deployment valve 834 is open, then pressurized fluid from the trunk line may flow through the conduit 836 to the lift axle deployment system.

One or more lift axle sensors 824 may be disposed in fluid communication with the lift axle deployment valve 834, and may sense lift axle line pressure or lack of pressure, and may send one or more lift axle pressure signals to an electronic control unit.

In some embodiments, a lift axle deployment system may simply comprise a pilot activated actuator valve as described above. The deployment valve 834 may open to send a pneumatic signal to the actuator, thus activating the valve to raise the lift axle. Closing the deployment valve 834 may stop the pneumatic signal, thus de-activating the actuator valve so as to lower the lift axle. Of course, an actuator valve may be configured such that activation by a pilot signal will result in the lift axle being lowered, and de-activation will result in the lift axle being raised.

In other embodiments, such as the embodiment of FIG. 28, a brake air supply 832 may supply pressurized fluid to the trunk line 802 through supply line 830 and supply valve 828, and may supply pressurized fluid to a lift axle deployment system through supply line 838. The deployment valve 834 may open to send pressurized fluid as a pneumatic signal to the actuator valve 850 pilot 848, and a normally-closed check valve 840 will open under pressure to permit pressurized fluid to flow to the actuator pilot through conduit 844, but not from the actuator pilot to the trunk line. Thus, depressurizing the conduit 836 may not change the actuator valve 850 activation state. The lift axle deployment system may comprise a trigger valve 846 disposed so as to control fluid communication from the supply line 838 to the pilot of the actuator valve. Thus, an electronic control unit may send a trigger signal to the trigger valve 846 as described above to open the trigger valve so as to allow pressurized fluid to flow from the conduit 838 to the pilot of the actuator valve. If the trigger signal is removed and the trigger valve 846 switches to vent 842 pressure from the conduit 844, then the pilot signal will be stopped and the actuator valve 850 de-activated.

In yet other embodiments, the deployment valve 834 may be configured for use as the override valve V1 of the lift axle deployment system described above or may control fluid flow to such an override valve V1.

Figure 29:
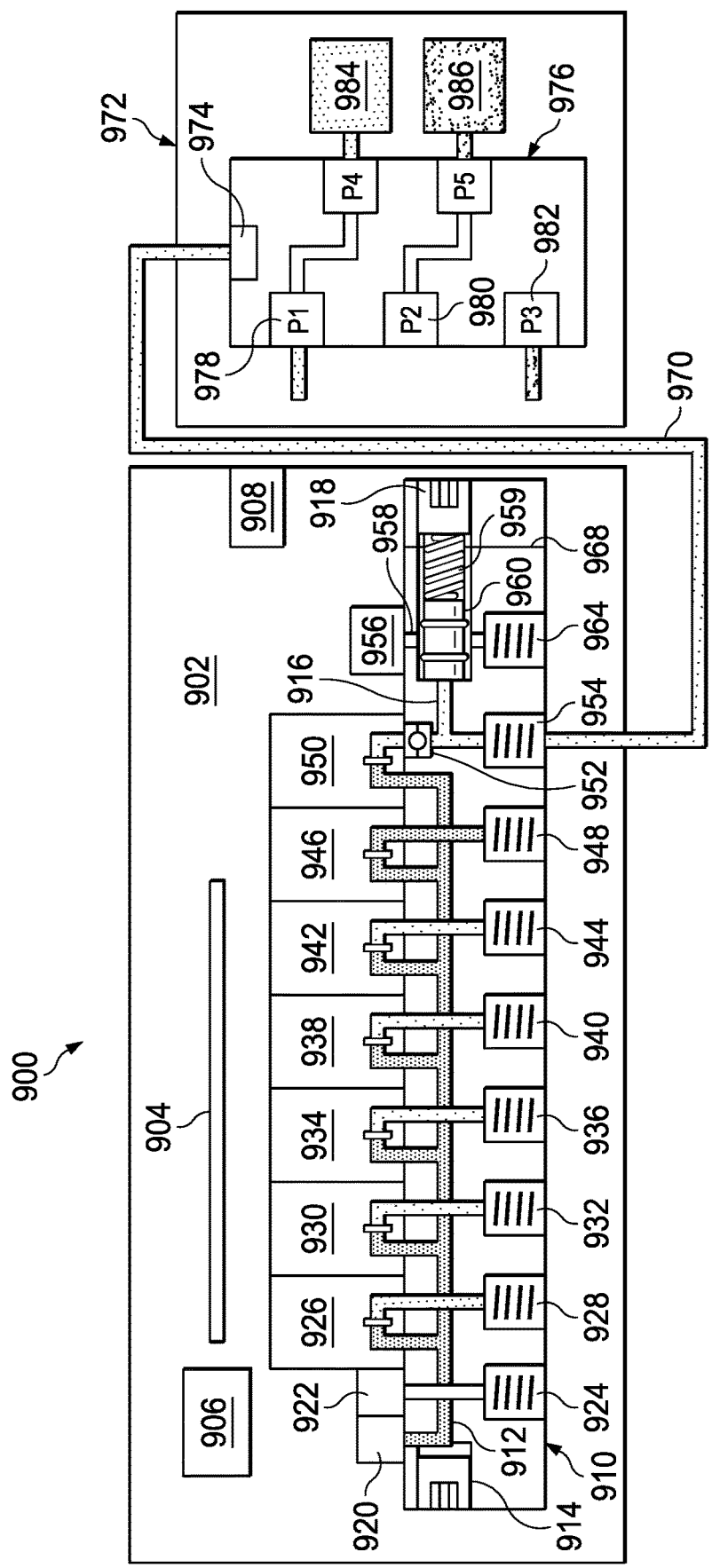
FIG. 29 illustrates an embodiment of an electronic control unit with integrated enhanced tire inflation system valves.

As may be seen in the embodiment of FIG. 29, an enhanced inflation system may be integrated with an ECU 900. The ECU may comprise a printed circuit board 904 housed in an enclosure 902, and coupled to one or more inflation valves 930, 934, 938 and 942, to a vent valve 926, to a supply valve 946 and to a deployment valve 950. The ECU may include a power/communication bus 906 for communication with a vehicle control system and power supply. In some embodiments, the ECU may communicate with an in-cab user control interface configured to display system information to a driver, and to receive commands from the driver. An indicator light 908 may indicate the status of the ECU, such as the presence of power. The light 908 may change color or brightness, or flicker or pulse, to indicate which valves are open, valve state, and/or the state of the various pressure supplies and lift axle deployment system.

The circuit board may be coupled to a flow manifold 910, which may comprise a trunk line channel 912 and a plurality of ports. The trunk line channel may be sealed at one end by a plug 914, and at the other end by a plug 918. A trunk line sensor 920 may be coupled to the trunk line channel so as to sense the pressure of fluid in the trunk line channel and communicate trunk line pressure data to the ECU.

The manifold may include a suspension port 924 in fluid communication with a pneumatic suspension system, and a suspension pressure sensor 922 may be coupled to the suspension port 924 so as to sense pressure in the suspension system and communicate suspension pressure data to the ECU.

The manifold is in fluid communication with a fluid supply through a fluid supply port 948. The trunk line channel may be pressurized by opening a supply valve 946 to permit pressurized fluid to flow from the supply port 948 to the trunk line channel. Fluid may flow from the trunk line channel to one or more tires through the one or more inflation valves 930, 934, 938 and 942 at ports 932, 936, 940, and 944, respectively. Fluid may be vented from the trunk line channel to vent port 928 through vent valve 926. Fluid may be passed at deployment port 916 to a lift axle deployment system via deployment valve 950. In some embodiments, a check valve 952 may be disposed between the deployment valve 952 and pilot of a lift axle deployment system 972 connected at port 954 to the deployment valve 952.

The manifold may include a deployment system sensor 956. When the deployment valve opens to deliver pressurized fluid to the lift axle deployment system through conduit 970, the pressurized fluid also moves shuttle 960 against spring 959 so that fluid may flow from the port 964 past the shuttle through channel 958 to the sensor 956. The channel portion between the shuttle 960 and the plug 918 may be vented 968. The deployment sensor may send deployment data to the ECU so that the ECU can determine the activation state of the lift axle deployment system. The channel 958 may extend to port 964, which may be plugged (not shown).

In other embodiments, the port 964 may comprise a brake fluid supply port in fluid communication with an air brake fluid system (which may comprise the same fluid supply connected at port 948) coupled to a trigger valve (not shown), and the deployment system sensor 956 may instead comprise a brake supply sensor may be coupled to the brake fluid supply port so as to sense pressure in the air brake fluid system and communicate brake system pressure data to the ECU. The brake supply sensor may be selectively coupled to the brake fluid supply port through channel 958. When the deployment valve opens to deliver pressurized fluid to the lift axle deployment system, the pressurized fluid also moves shuttle 960 against spring 959 so that fluid may flow from the port 964 past the shuttle through channel 958 to the sensor.

When the deployment valve opens, then fluid may flow through the conduit 970 to a lift axle deployment system. As noted above, the lift axle deployment system may simply comprise a pilot-activated actuator valve 976, as disclosed in the embodiment of FIG. 29. Pressurized fluid may flow through the conduit 970 to the actuator valve pilot 974, which may switch to place the lift axle supply 978 in fluid communication with the lift axle springs 984 through ports P1 and P4, and disconnect the ride spring supply 982 at port P2 from the lift axle ride springs 986, and place the ride springs 986 in fluid communication with the exhaust 980 through ports P3 and P5.

In yet other embodiments, the deployment valve 950 may be configured for use as the override valve V1 of the lift axle deployment system described above or may control fluid flow to such an override valve V1.

Figure 30:
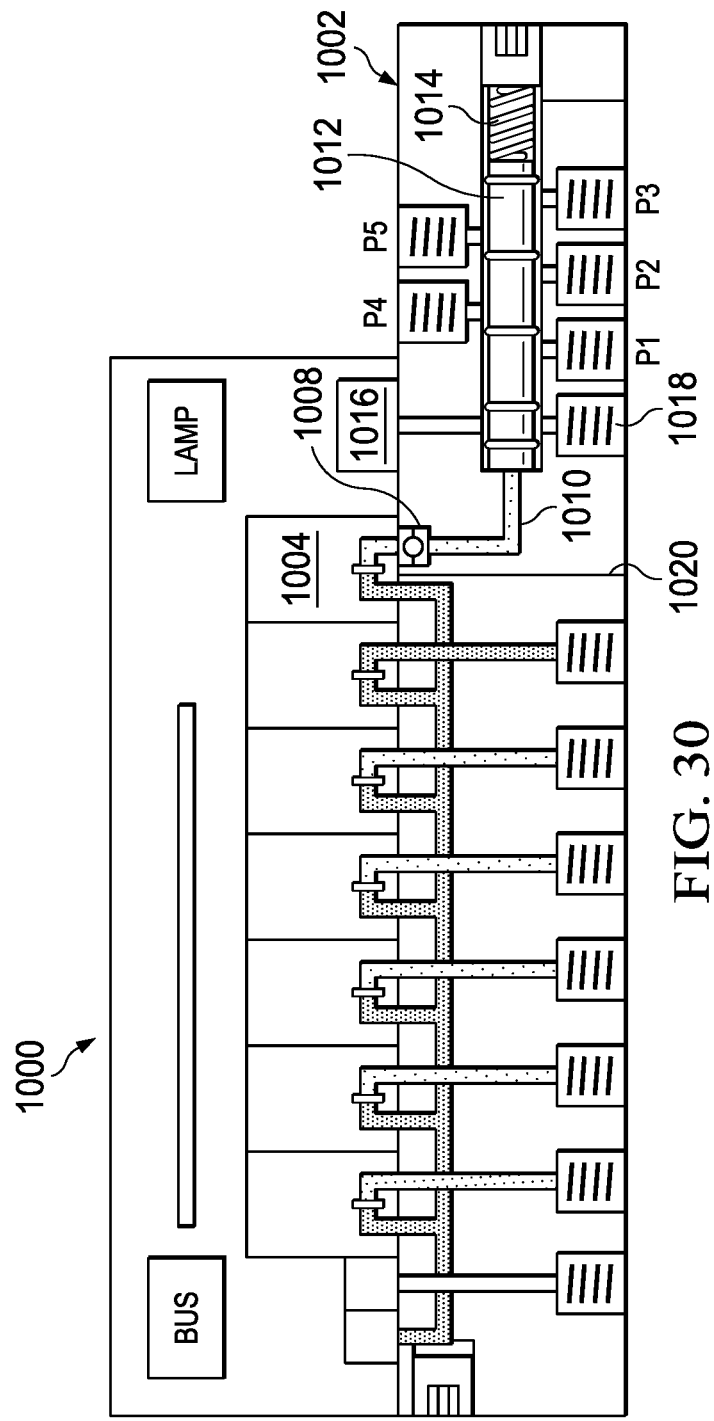
FIG. 30 illustrates an embodiment of an electronic control unit with integrated enhanced tire inflation system valves and lift axle actuator valve.

As may be seen in the embodiment of FIG. 30, a lift axle deployment system actuator may also be integrated with the ECU 1000. The actuator may comprise a shuttle 1012 disposed in the flow manifold 1002, and configured to slide from one position to another when the deployment valve 1004 opens to permit fluid to flow through a check valve 1008 through channel 1010 to a pilot connected at port 1018. When actuated, the actuator may move the shuttle against the spring 1014 from one shuttle position to a second shuttle position, which results in a switch from one shuttle position allowing fluid communication between ports P4 and P2, and between P5 and P3, to a second shuttle position allowing fluid communication between ports P1 and P4, and between ports P2 and P5. Moving the shuttle from one position to a second position will permit fluid flow to the pressure sensor 1016, which will send deployment state pressure data to the ECU. The deployment valve 1004 may, in some embodiments, vent fluid from the deployment system via vent 1020.

Figure 31:
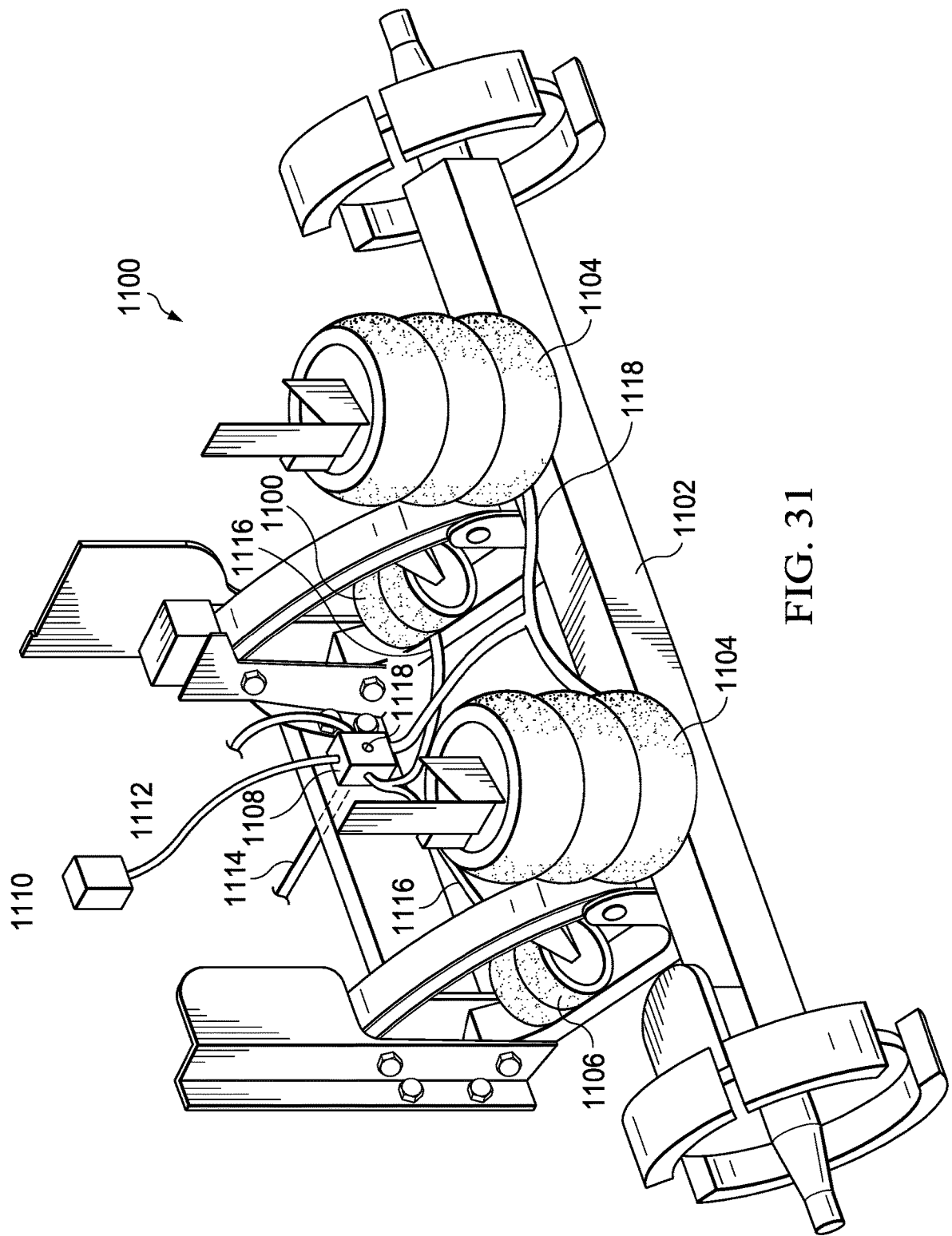
FIG. 31 illustrates a lift axle having installed an enhanced tire inflation system and lift axle deployment system.

As seen in the embodiment of FIG. 31, an enhanced tire inflation system may integrate with a lift axle 1102 deployment system 1100. Lift axle deployment system elements may include a control unit 1110 (such as an ECU), actuator valve 1108, and various fluid transfer conduits. The control unit 1110 may be mounted at any location on the vehicle that allows convenient access. The actuator valve 1108 may be preferably mounted at or near the lift axle 1100. A pilot conduit 1112 may provide a pneumatic pilot signal from the control unit 1110. A ride spring supply conduit 1114 may convey fluid from a pressure source (not shown) to the actuator valve. A lift spring supply conduit 1115 may convey fluid from a pressure source (not shown) to the actuator valve. Ride spring delivery conduits 1118 may convey fluid from the actuator valve 1108 to the ride springs 1104. Lift spring delivery conduit 1116 may convey fluid from the actuator valve 1108 to the lift springs 1106. The actuator valve may also have a vent 1118.

The ECU or control box may contain an electronic circuit board as described above, and other electronic components so to facilitate the capture, processing, and sending of electronic data. The circuit board may also receive and transmit commands to and from other components of the inflation system. This data may be captured from locally connected or remote sensors. The data may also be applied so as to allow the system to make control decisions for the inflation system. Some such decisions and commands may include adjusting inflation pressure based on at what elevation at vehicle is operating, adjusting tire pressure based on the load the vehicles is carrying, preventing tire inflation if the supply pressure is below a determined threshold, preventing inflation to axles not in use (such as a lift axle), or turning off inflation supply to a particular axle should the axle or hub require isolation from the system. Other data that may be captured may include the time periods during which the vehicle is in motion.

The control box may also house units to enable wired or wireless communication between the inflation system and other device or systems. Such communication may encompass items such as linking to a telemetrics system, linking to dispatch networks and services, maintenance yard systems, and other communication networks that may be of use to the user, owner, operator, or maintenance personnel. Other systems that may be supported by the control box can include global positioning data.

Additionally, the control box may house one or more indicator lights or lamps to allow the system to communicate information to the user. Such information may include warnings and system status, load weight, and system test data. Other information that may be of use to anyone interacting with the system may also be communicated through such a set of lights and lamps.

Some such data that may captured and communicated by the control module may concern the pressure required to maintain the target tire pressure over an interval of time.

Said collected data is translated into a value, known as a Fill Event Value or FEV, wherein said FEV indicates how often a tire received fill events. Thus, a low FEV score may indicate a tire in good operating condition whereas a high FEV may indicate a tire issue that requires attention so as to prevent a hazard.

Said FEV score may be accessed through a Wi-Fi interface and may also displayed in a software application related to the system, but may also trigger a warning that is communicated through an indicator lamp. For example, if a high FEV is detected then a blinking or fluttering pattern may be transmitted to said lamp for immediately alerting a driver to a potentially hazardous condition. The FEV to trigger lamp illumination may be programmable as may be the specifics of the transmitted lamp illumination pattern. Such specifics may include illumination intensity, the cycle period for the illumination sequence, and the overall duration the pattern.

For example, a moderate FEV may cause a cycle with a long period wherein long illuminations are broken by long non-illuminations. As the FEV increases, the period may shorten with short illuminations broken by short non-illuminations. Additionally, as the FEV increases so may the intensity of the illumination events.

Another example of data collected and utilized by the control module may pertain to the monitoring of supply pressure. The system may monitor the supply pressure and translate available supply pressure into a single value known as the Supply Event Value or SEV. Such a value may represent a score on consistent and adequate supply pressure availability. A low score may indicate no or few interruptions of adequate supply pressure availability whereas a high score may represent a repeated or sustained interruption of adequate supply pressure. The SEV may be communicated through a Wi-Fi interface and may also displayed in a software application related to the system.

Figure 32:
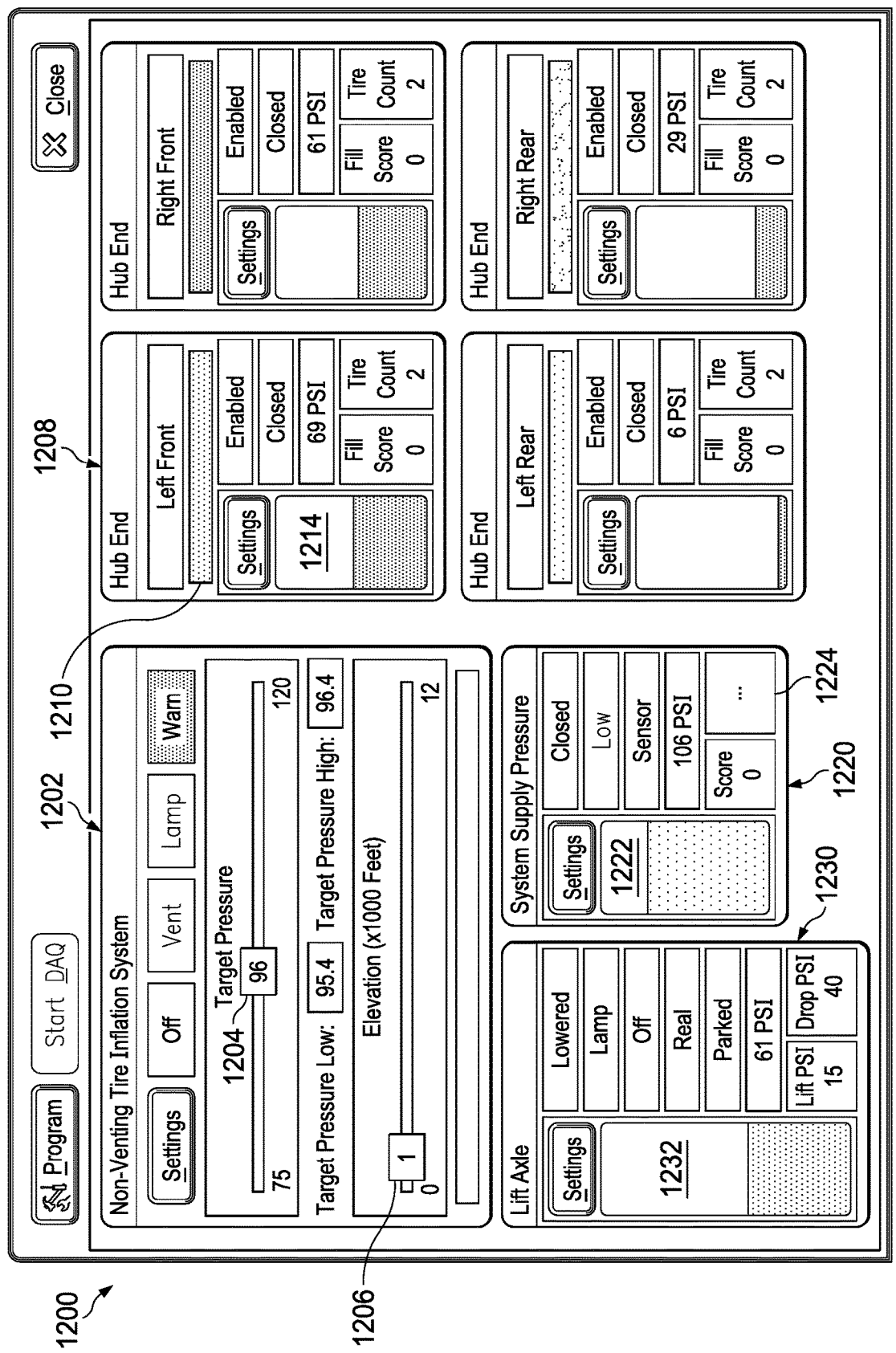
FIG. 32 illustrates an example of a user interface for an enhanced tire inflation system.

FIG. 32 illustrates an embodiment of a screen 1200 for monitoring and controlling the ECU of an enhanced ATIS with integrated lift axle controls. The screen may comprise a touch-sensitive surface to permit user input. The screen may represent a software application that is executable on a computer, tablet, smart device, or the application may be web based so that the application may be accessed from any internet connected device. The application may have a plurality of interactive widgets wherein each widget is associated with the control and monitoring of a particular subsection of the system in question. One widget 1202 may allow the input of parameters related to the inflation under a settings tab wherein said settings may include target tire pressure and at what elevation the vehicle is operating. These parameters may be entered through interaction with a set of slider bars 1204, 1206. Other parameters may include a lower and upper bound for the target tire pressure wherein said bounds may be entered numerically by a user.

Another set of widgets 1208 on the screen may be dedicated to displaying information related to each tire set attached to the inflation system. For example, widgets may be provided for the left front tires, right front tires, left rear tires, and right rear tires. Each of these widgets may display information such as a graphical visualization of the current tire pressure, a numeric visualization of the current tire pressure, the position of the associated inflation valve, the fill score for the tire set, and the quantity of tires mounted at the position. A settings button may be provided to allow access to any system settings that are specific to the associated tire set. The widget may include various color bars 1210 to indicate tire status, and visual gauges 1214 to indicate fill status.

A widget may be dedicated to the system supply pressure 1220. Said supply pressure may refer to the pressure maintained in the trunk line. The widget may contain a graphical 1222 and numeric visualization of the current supply pressure, the status of the valve controlling supply to the trunk line, a low pressure alert, a sensor alert, and a numeric representation of the fill score for the trunk line. The widget may also contain a settings button 1224 to allow access to any system settings that are specific to the supply pressure section.

Yet another widget 1230 may be dedicated to the lift axle. Said widget may contain an axle position indicator, a visual pressure indicator 1232, a warning lamp indicator, OFF/ON indicator, and park/drive mode indicator. There may also be a settings button to allow adjustment of parameters pertaining to the lift axle subsystem.

Various embodiments of an enhanced tire inflation system, components, vehicles thereof, and lift axle deployment systems are further disclosed in the following numbered clauses.

1. A vehicle fluid supply system comprising a fluid supply valve configured to control fluid flow from a vehicle fluid supply to a trunk conduit in fluid communication with a vehicle tire inflation system; and a lift axle valve configured to control fluid flow from the trunk conduit to a lift axle deployment system.

2. The vehicle fluid supply system of clause 1, further comprising a vent valve configured to vent fluid from the trunk conduit.

3. The vehicle fluid supply system of clause 2, the vent valve comprising a pressure protection valve configured to open at a predetermined fluid pressure.

4. The vehicle fluid supply system of clause 1, further comprising a trunk pressure sensor disposed so as to sense fluid pressure in the trunk conduit.

5. The vehicle fluid supply system of clause 4, further comprising an inflation fluid conduit configured to provide sealed fluid communication between the trunk conduit and a first tire of the vehicle and between the trunk conduit and a second tire of the vehicle.

6. The vehicle fluid supply system of clause 5, the inflation fluid conduit comprising a first rotary union disposed at the first tire and configured to convey fluid between the trunk conduit and the first tire while the first tire is rotating; and a second rotary union disposed at the second tire and configured to convey fluid between the trunk conduit and the second tire while the second tire is rotating.

7. The vehicle fluid supply system of clause 6, the inflation fluid conduit further comprising an inflation valve configured to control fluid flow between the trunk conduit and the first and second tires.

8. The vehicle fluid supply system of clause 7, the inflation valve configured to open to permit fluid flow between the trunk conduit and the first and second tires, and to close to prevent fluid flow between the trunk conduit and the first and second tires.

9. The vehicle fluid supply system of clause 8, the inflation valve configured to open upon receipt of an inflation signal from an electronic control unit, and to close upon discontinuance of the open signal from the electronic control unit.

10. The vehicle fluid supply system of clause 9, the inflation valve comprising a normally-closed one-way check valve configured to open to permit fluid flow from the trunk conduit to the first and second tires, and to prevent fluid flow to the trunk conduit from the first and second tires.

11. The vehicle fluid supply system of clause 7, further comprising a first tire valve configured to control fluid flow between the inflation valve and the first tire; and a second tire valve configured to control fluid flow between the inflation valve and the second tire.

12. The vehicle fluid supply system of clause 11, the first tire valve configured to open to permit fluid flow between the inflation valve and the first tire, and to close to prevent fluid flow between the inflation valve and the first tire; and the second tire valve configured to open to permit fluid flow between the inflation valve and the second tire, and to close to prevent fluid flow between the inflation valve and the second tire.

13. The vehicle fluid supply system of clause 12, the first tire valve configured to open upon receipt of a first open signal from the electronic control unit, and to close upon discontinuance of the first open signal from the electronic control unit; the second tire valve configured to open upon receipt of a second open signal from the electronic control unit, and to close upon discontinuance of the second open signal from the electronic control unit.

14. The vehicle fluid supply system of clause 13, further comprising a first tire pressure sensor configured to sense fluid pressure in the first tire, and send a first tire pressure signal to the electronic control unit; and a second tire pressure sensor configured to sense fluid pressure in the second tire, and send a second tire pressure signal to the electronic control unit.

15. The vehicle fluid supply system of clause 14, wherein the first tire comprises a first set of dual tires mounted at a first end of an axle having a first end and a second end; and the second tire comprises a second set of dual tires mounted at the second end of the axle.

16. The vehicle fluid supply system of clause 13, the first and second tire valves each comprising a normally-closed one-way check valve configured to open to permit fluid flow from the inflation valve to the first and second tire valves, respectively, and to prevent fluid flow to the inflation valve from the first and second tire valves, respectively.

17. The vehicle fluid supply system of clause 1, further comprising a lift axle pressure sensor disposed so as to sense fluid pressure to the lift axle deployment system.

18. The vehicle fluid supply system of clause 1, further comprising an electronic control unit configured to display tire inflation system settings, supply system pressure and lift axle deployment status.

19. The vehicle fluid supply system of clause 11, the second tire being mounted to a lift axle controlled by the lift axle deployment system.

20. The vehicle fluid supply system of clause 1, the lift axle deployment system comprising a pilot-activated lift axle actuator valve configured to control fluid communication between a vehicle lift spring air supply and a lift axle lift spring and between a vehicle ride spring air supply and a lift axle ride spring, the lift axle valve configured to control fluid flow from the trunk conduit to a pilot of the pilot-activated lift axle actuator valve.

21. The vehicle fluid supply system of clause 1, further comprising an electronic control unit having a circuit board and flow manifold, the electronic control unit integrating the fluid supply valve and the lift axle valve.

22. The vehicle fluid supply system of clause 2, further comprising an electronic control unit having a circuit board and flow manifold, the electronic control unit integrating the fluid supply valve, the lift axle valve and the pilot-activated lift axle actuator valve.

23. The vehicle fluid supply system of clause 2, the lift axle deployment system comprising a plurality of valves configured to receive first fluid pressure from a first fluid supply and to receive second fluid pressure from a second fluid supply, and to selectively communicate the first fluid pressure or the second fluid pressure as a pilot signal to a lift axle actuator valve.

24. The pneumatic lift axle control system of clause 23, further comprising a command valve system configured to receive first fluid pressure from the first fluid supply and to receive second fluid pressure from the second fluid supply, the command valve system configured to selectively communicate the first fluid pressure and the second fluid pressure to a pilot valve system; and the pilot valve system configured to receive the first fluid pressure and the second fluid pressure from the command valve system, and to selectively communicate the first fluid pressure or the second fluid pressure as a pilot signal to the lift axle actuator valve.

25. The pneumatic lift axle control system of clause 24, wherein when the pilot valve system communicates neither the first fluid pressure nor the second fluid pressure as a pilot signal to the lift axle actuator valve, the lift axle actuator valve deploys or maintains a lift axle in a lowered position.

26. The pneumatic lift axle control system of clause 25, wherein when the pilot valve system communicates either the first fluid pressure or the second fluid pressure as a pilot signal to the lift axle actuator valve, the lift axle actuator valve deploys or maintains a lift axle in a raised position.

27. The pneumatic lift axle control system of clause 26, wherein the first fluid supply comprises a brake air supply or a brake air reservoir, and the second fluid supply comprises the brake air supply or the brake air reservoir.

28. The pneumatic lift axle control system of clause 27, wherein the first fluid supply comprises the brake air supply and the second fluid supply comprises the brake air reservoir.

29. The pneumatic lift axle control system of clause 24, the command valve system further comprising an override valve configured to receive the first fluid pressure and to selectively communicate the first fluid pressure to the pilot valve system; and a trigger valve configured to receive the second fluid pressure and to selectively communicate the second fluid pressure to the pilot valve system.

30. The pneumatic lift axle control system of clause 29, the override valve and the trigger valve each comprising a solenoid valve.

31. The pneumatic lift axle control system of clause 24, the pilot valve system further comprising a latching valve configured to receive the first fluid pressure from the command valve system and to selectively communicate the first fluid pressure to a shuttle valve; and the shuttle valve configured to receive the second fluid pressure from the command valve system and the first fluid pressure from the latching valve, and to selectively communicate either the first fluid pressure or the second fluid pressure as a pilot signal to the lift axle actuator valve.

32. The pneumatic lift axle control system of clause 29, the pilot valve system further comprising a latching valve configured to receive the first fluid pressure from the override valve and to selectively communicate the first fluid pressure to a shuttle valve; and the shuttle valve configured to receive the second fluid pressure from the trigger valve and the first fluid pressure from the latching valve, and to selectively communicate either the first fluid pressure or the second fluid pressure as a pilot signal to the lift axle actuator valve.

32. The pneumatic lift axle control system of clause 31, the override valve further configured to vent fluid pressure from the latching valve; and the trigger valve further configured to vent fluid pressure from the shuttle valve.

33. A heavy vehicle comprising a lift axle having a pneumatic lift spring configured for fluid communication with a lift spring air supply and a pneumatic ride spring configured for fluid communication with a ride spring air supply; an air brake system comprising a first fluid supply and a second fluid supply; a fluid supply valve configured to control fluid flow from the air brake system to a trunk conduit in fluid communication with a vehicle tire inflation system; and a lift axle valve configured to control fluid flow from the trunk conduit to a lift axle deployment system.

34. The heavy vehicle of clause 33, the lift axle deployment system comprising a pilot-activated lift axle actuator valve configured to control communication between a vehicle lift spring air supply and a lift axle lift spring and between a vehicle ride spring air supply and a lift axle ride spring; and a pneumatic lift axle control system configured to selectively communicate the first fluid pressure or the second fluid pressure as a pilot signal to the pilot-activated lift axle actuator valve.

Although the disclosed subject matter and its advantages have been described in detail, it should be understood that various changes, substitutions and alterations can be made herein without departing from the subject matter as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. For example, although the disclosed apparatus, systems and methods may be described with reference to a manual or manually-activated pressure reduction valve, an electric valve or other automatic electronic or mechanical valve may be used to accomplish relatively rapid reduction of air pressure. Accordingly, the appended claims are intended to include within their scope such processes, machines, manufacture, compositions of matter, means, methods, systems or steps.

What is claimed is:

1. A vehicle fluid supply system comprising:
    a trunk conduit configured to supply pressurized fluid from a vehicle fluid supply to each of a first vehicle tire and a second vehicle tire, and to a lift axle control system;
    a fluid supply valve configured to control fluid flow to the trunk conduit;
    a lift axle deployment valve configured to control fluid flow from the trunk conduit to said lift axle control system, the lift axle control system being configured to control lift axle deployment;
    a trunk pressure sensor disposed so as to sense fluid pressure in said trunk conduit;
    a first tire inflation valve for controlling fluid flow from the trunk conduit to the first vehicle tire; and
    a second tire inflation valve for controlling fluid flow from the trunk conduit to the second vehicle tire.

2. The vehicle fluid supply system of claim 1, further comprising a lift axle pressure sensor disposed so as to sense fluid pressure for lift axle deployment.

3. The vehicle fluid supply system of claim 1, further comprising an electronic control unit configured to display tire inflation system settings, supply system pressure and lift axle deployment status.

4. The vehicle fluid supply system of claim 1, further comprising an electronic control unit having a circuit board and flow manifold, the electronic control unit integrating the fluid supply valve and the lift axle deployment valve.

5. The vehicle fluid supply system of claim 1 further comprising:
    the lift axle control system, the lift axle control system including a plurality of valves configured to receive first fluid pressure from a first fluid supply and to receive second fluid pressure from the trunk conduit, and to selectively communicate the first fluid pressure or the second fluid pressure as a pilot signal to a lift axle actuator valve.

6. The vehicle fluid supply system of claim 5, said first fluid supply comprising an air brake system.

7. The vehicle fluid supply system of claim 1, the lift axle control system comprising:
    a command valve system configured to receive first fluid pressure from a first fluid supply and to receive second fluid pressure from the trunk conduit, the command valve system configured to selectively communicate the first fluid pressure and the second fluid pressure to a pilot valve system; and
    the pilot valve system configured to receive the first fluid pressure and the second fluid pressure from the command valve system, and to selectively communicate the first fluid pressure or the second fluid pressure as a pilot signal to a lift axle actuator valve.

8. The vehicle fluid supply system of claim 7, wherein when the pilot valve system communicates neither the first fluid pressure nor the second fluid pressure as a pilot signal to the lift axle actuator valve, the lift axle actuator valve deploys or maintains a lift axle in a lowered position.

9. The vehicle fluid supply system of claim 8, wherein when the pilot valve system communicates either the first fluid pressure or the second fluid pressure as a pilot signal to the lift axle actuator valve, the lift axle actuator valve deploys or maintains a lift axle in a raised position.

10. The vehicle fluid supply system of claim 7, the command valve system further comprising:
    an override valve configured to receive the first fluid pressure and to selectively communicate the first fluid pressure to the pilot valve system; and
    a trigger valve configured to receive the second fluid pressure and to selectively communicate the second fluid pressure to the pilot valve system.

11. The pneumatic lift axle control system of claim 10, the pilot valve system further comprising:
    a latching valve configured to receive the first fluid pressure from the override valve and to selectively communicate the first fluid pressure to a shuttle valve; and
    the shuttle valve configured to receive the second fluid pressure from the trigger valve and the first fluid pressure from the latching valve, and to selectively communicate either the first fluid pressure or the second fluid pressure as a pilot signal to the lift axle actuator valve.

12. The vehicle fluid supply system of claim 7, the pilot valve system further comprising:
- a latching valve configured to receive the first fluid pressure from the command valve system and to selectively communicate the first fluid pressure to a shuttle valve; and
- the shuttle valve configured to receive the second fluid pressure from the command valve system and the first fluid pressure from the latching valve, and to selectively communicate either the first fluid pressure or the second fluid pressure as a pilot signal to the lift axle actuator valve.

13. The pneumatic lift axle control system of claim 12, the override valve further configured to vent fluid pressure from the latching valve; and the trigger valve further configured to vent fluid pressure from the shuttle valve.

14. The vehicle fluid supply system of claim 1 further comprising the lift axle control system, the lift axle control system comprising:
- a normally closed check valve disposed on a fluid pathway between the lift axle deployment valve and a lift axle actuator valve; and
- a trigger valve disposed so as to control fluid communication from a supply line to said lift axle actuator valve.

15. The vehicle fluid supply system of claim 14, the supply line being in fluid communication with a brake air supply.

16. The vehicle fluid supply system of claim 1 further comprising a vent valve, the vent valve being coupled to the trunk conduit to depressurize the trunk conduit;
- the first tire inflation valve and the second tire inflation valve being configured so that they may be closed when the trunk conduit is depressurized.

17. The vehicle fluid supply system of claim 16 further comprising an electronic control unit;
- the electronic control unit being configured for selectively opening either of the first tire inflation valve or the second tire inflation valve so as to selectively reduce pressure in either of the first tire or the second tire when the trunk conduit is depressurized.

18. A vehicle fluid supply system comprising:
- a fluid supply valve configured to control fluid flow from a vehicle fluid supply to a trunk conduit in fluid communication with a vehicle tire inflation system; and
- a lift axle deployment valve configured to control fluid flow from the trunk conduit to a lift axle deployment system;
- the lift axle deployment system comprising a pilot-activated lift axle actuator valve configured to control fluid communication between a vehicle lift spring air supply and a lift axle lift spring and between a vehicle ride spring air supply and a lift axle ride spring, the lift axle deployment valve configured to control fluid flow from the trunk conduit to a pilot of the pilot-activated lift axle actuator valve.

19. A heavy vehicle comprising:
- a lift axle having a pneumatic lift spring configured for fluid communication with a lift spring air supply and a pneumatic ride spring configured for fluid communication with a ride spring air supply;
- an air brake system comprising a first fluid supply and a second fluid supply;
- a fluid supply valve configured to control fluid flow from the air brake system to a trunk conduit in fluid communication with a vehicle tire inflation system; and
- a lift axle deployment valve configured to control fluid flow from the trunk conduit to a lift axle deployment system.

20. The heavy vehicle of claim 19, the lift axle deployment system comprising:
- a pilot-activated lift axle actuator valve configured to control communication between a vehicle lift spring air supply and a lift axle lift spring and between a vehicle ride spring air supply and a lift axle ride spring; and
- a pneumatic lift axle control system configured to selectively communicate a first fluid pressure provided by said first fluid supply or a second fluid pressure provided by said second fluid supply as a pilot signal to the pilot-activated lift axle actuator valve.

* * * * *